(12) United States Patent
Nishikawa et al.

(10) Patent No.: US 8,279,470 B2
(45) Date of Patent: Oct. 2, 2012

(54) IMAGE FORMING APPARATUS CONFIGURATION IMAGE SIMULATING AN OVERALL CONFIGURATION OF A COMBINATION OF A MAIN BODY AND AN ATTACHMENT

(75) Inventors: Yoshiteru Nishikawa, Osaka (JP); Makoto Ochi, Osaka (JP)

(73) Assignee: Kyocera Mita Corporation (JP)

( * ) Notice: Subject to any disclaimer, the term of this patent is extended or adjusted under 35 U.S.C. 154(b) by 1098 days.

(21) Appl. No.: 12/101,495

(22) Filed: Apr. 11, 2008

(65) Prior Publication Data

US 2008/0259405 A1  Oct. 23, 2008

(30) Foreign Application Priority Data

Apr. 17, 2007  (JP) .................... 2007-108216
Apr. 17, 2007  (JP) .................... 2007-108217
Apr. 17, 2007  (JP) .................... 2007-108218
Apr. 17, 2007  (JP) .................... 2007-108219

(51) Int. Cl.
*G06F 3/12* (2006.01)
*G06K 15/00* (2006.01)
*H04N 1/00* (2006.01)
*H04N 1/60* (2006.01)
*G09G 5/00* (2006.01)

(52) U.S. Cl. ........ 358/1.15; 358/1.16; 358/1.6; 358/1.9; 345/626; 345/630; 345/665; 345/686

(58) Field of Classification Search .............. 358/401, 358/1.15, 1.16, 1.6, 1.9, 183; 345/441, 494, 345/619, 419, 626, 621, 628, 630, 665, 680, 345/686, 536; 703/6, 7, 13, 1, 2, 20; 715/866, 715/767, 762, 761, 764, 771, 273, 240

See application file for complete search history.

(56) References Cited

U.S. PATENT DOCUMENTS 4,816,812 A * 3/1989 Iida .................... 345/635
5,043,714 A * 8/1991 Perlman .................... 345/560

FOREIGN PATENT DOCUMENTS

| JP | 2002016749 | 1/2002 |
| JP | 3483151 | 1/2004 |
| JP | 2007036997 | 2/2007 |

OTHER PUBLICATIONS

Sumuru, Printer Display Controller, Oct. 25, 1994, Machine translation of Japanese Patent Publication, JP6297818.*

* cited by examiner

*Primary Examiner* — Benny Q Tieu
*Assistant Examiner* — Ngon Nguyen
(74) *Attorney, Agent, or Firm* — Gerald E. Hespos; Michael J. Porco

(57) ABSTRACT

To reduce a load required for data transfer and data processing to improve processing speed of those. A display data memory stores as display data a configuration image simulating an overall configuration of a combination of a main body and an attachment. An image display device provided on either one of the main body and the attachment includes a display screen having a display area divided into a plurality of divisional areas for displaying the configuration image. A CPU determines displaying and non-displaying on each of the plurality of divisional areas, and controls the image display device to allow a part of the configuration image to be displayed on a divisional area which is determined to be displayed in accordance with display data, and to allow an other part of the configuration image not to be displayed to on a divisional area which is determined not to be displayed.

4 Claims, 40 Drawing Sheets

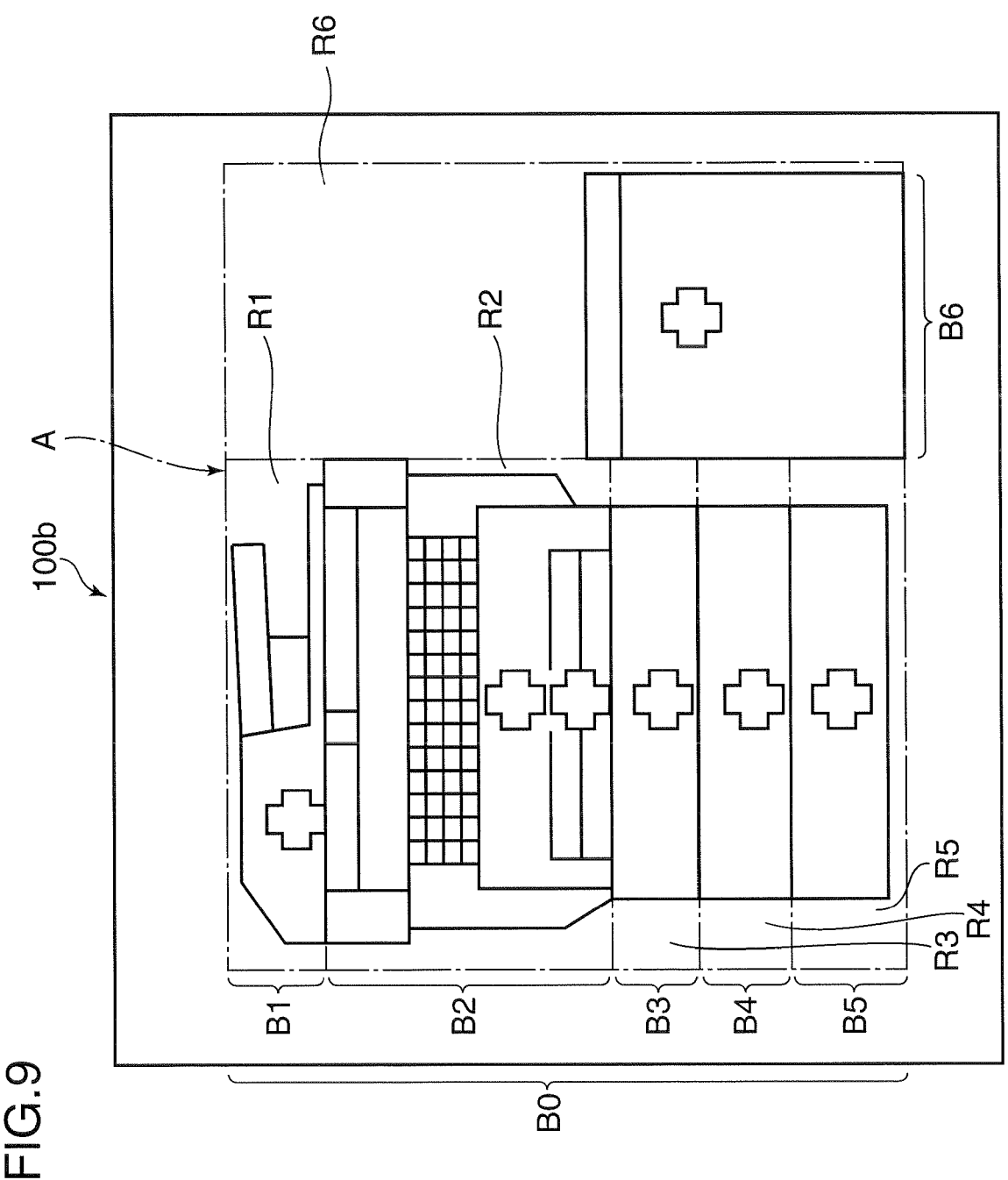

FIG.31

| | A | B | C | D |
|---|---|---|---|---|
| DIVISIONAL AREA R1 | NONE | BITMAP a | | |
| DIVISIONAL AREA R2 | NONE | BITMAP a | | |
| DIVISIONAL AREA R3 | NONE | BITMAP a | | |
| DIVISIONAL AREA R4 | NONE | BITMAP a | | |
| DIVISIONAL AREA R5 | NONE | BITMAP a | | |
| DIVISIONAL AREA R6 | NONE | BITMAP a | | |
| DIVISIONAL AREA R7 | NONE | BITMAP a | | |
| DIVISIONAL AREA R8 | NONE | BITMAP a | | |
| DIVISIONAL AREA R9 | NONE | BITMAP a | | |
| DIVISIONAL AREA R10 | NONE | BITMAP a | | |
| DIVISIONAL AREA R11 | NONE | BITMAP a | | |
| DIVISIONAL AREA R12 | NONE | BITMAP a | | |
| DIVISIONAL AREA R13 | NONE | BITMAP a | BITMAP b | |
| DIVISIONAL AREA R14 | NONE | BITMAP a | BITMAP b | |
| DIVISIONAL AREA R15 | NONE | BITMAP a | BITMAP b | |
| DIVISIONAL AREA R16 | NONE | BITMAP a | BITMAP b | |

FIG.35

| | A | B | C | D |
|---|---|---|---|---|
| DIVISIONAL AREA R1 | NONE | BITMAP a | | |
| DIVISIONAL AREA R2 | NONE | BITMAP a | | |
| DIVISIONAL AREA R3 | NONE | BITMAP a | | |
| DIVISIONAL AREA R4 | NONE | BITMAP a | | |
| DIVISIONAL AREA R5 | NONE | BITMAP a | | |
| DIVISIONAL AREA R6 | NONE | BITMAP a | | |
| DIVISIONAL AREA R7 | NONE | BITMAP a | | |
| DIVISIONAL AREA R8 | NONE | BITMAP a | | |
| DIVISIONAL AREA R9 | NONE | BITMAP a | | |
| DIVISIONAL AREA R10 | NONE | BITMAP a | | |
| DIVISIONAL AREA R11 | NONE | BITMAP a | | |
| DIVISIONAL AREA R12 | NONE | BITMAP a | | |
| DIVISIONAL AREA R13 | NONE | BITMAP a | BITMAP b | |
| DIVISIONAL AREA R14 | NONE | BITMAP a | BITMAP b | |
| DIVISIONAL AREA R15 | NONE | BITMAP a | BITMAP b | |
| DIVISIONAL AREA R16 | NONE | BITMAP a | BITMAP b | |

FIG.37

| | A | B | C | D |
|---|---|---|---|---|
| DIVISIONAL AREA R1 | NONE | BITMAP a | | |
| DIVISIONAL AREA R2 | NONE | BITMAP a | | |
| DIVISIONAL AREA R3 | NONE | BITMAP a | | |
| DIVISIONAL AREA R4 | NONE | BITMAP a | | |
| DIVISIONAL AREA R5 | NONE | BITMAP a | | |
| DIVISIONAL AREA R6 | NONE | BITMAP a | | |
| DIVISIONAL AREA R7 | NONE | BITMAP a | | |
| DIVISIONAL AREA R8 | NONE | BITMAP a | | |
| DIVISIONAL AREA R9 | NONE | BITMAP a | | |
| DIVISIONAL AREA R10 | NONE | BITMAP a | | |
| DIVISIONAL AREA R11 | NONE | BITMAP a | | |
| DIVISIONAL AREA R12 | NONE | BITMAP a | | |
| DIVISIONAL AREA R13 | NONE | BITMAP a | BITMAP b | |
| DIVISIONAL AREA R14 | NONE | BITMAP a | BITMAP b | |
| DIVISIONAL AREA R15 | NONE | BITMAP a | BITMAP b | |
| DIVISIONAL AREA R16 | NONE | BITMAP a | BITMAP b | |

FIG.39

| | A | B | C | D |
|---|---|---|---|---|
| DIVISIONAL AREA R1 | NONE | BITMAP a | | |
| DIVISIONAL AREA R2 | NONE | BITMAP a | | |
| DIVISIONAL AREA R3 | NONE | BITMAP a | | |
| DIVISIONAL AREA R4 | NONE | BITMAP a | | |
| DIVISIONAL AREA R5 | NONE | BITMAP a | | |
| DIVISIONAL AREA R6 | NONE | BITMAP a | | |
| DIVISIONAL AREA R7 | NONE | BITMAP a | | |
| DIVISIONAL AREA R8 | NONE | BITMAP a | | |
| DIVISIONAL AREA R9 | NONE | BITMAP a | | |
| DIVISIONAL AREA R10 | NONE | BITMAP a | | |
| DIVISIONAL AREA R11 | NONE | BITMAP a | | |
| DIVISIONAL AREA R12 | NONE | BITMAP a | | |
| DIVISIONAL AREA R13 | NONE | BITMAP a | BITMAP b | |
| DIVISIONAL AREA R14 | NONE | BITMAP a | BITMAP b | |
| DIVISIONAL AREA R15 | NONE | BITMAP a | BITMAP b | |
| DIVISIONAL AREA R16 | NONE | BITMAP a | BITMAP b | | he present invention has been made to solve the above-described problems, and its object is to provide an image
IMAGE FORMING APPARATUS CONFIGURATION IMAGE SIMULATING AN OVERALL CONFIGURATION OF A COMBINATION OF A MAIN BODY AND AN ATTACHMENT

BACKGROUND OF THE INVENTION

1. Field of the Invention

The present invention relates to an image forming apparatus such as a printer, a copying machine, a facsimile transmitter/receiver, and a complex machine having functions of those. More particularly, it relates to an image forming apparatus having a display screen for displaying information for a user.

2. Description of the Related Art

As a conventional technology related to this kind of image forming apparatus, there has been a display control device composed of a plurality of components. In this conventional technology, a plurality of display data for respective kinds of components is stored in a plurality of storage areas of a storage device. Further, one kind of combination information of components is stored in advance in the storage device.

According to the above-described conventional technology, in a case where more than ten kinds of components such as a sheet-supplying device, a print control device, a sheet-discharging device, and the like constitute one printer, display data are stored for respective kinds of components, and the display data can be desirably combined and displayed in accordance with combination information of an actual device configuration of the printer. Therefore, in the conventional technology, it would not be necessary to store all of display data for the respective kinds of device configurations of the printer, so that the capacity of the storage device can be suppressed.

However, in a case like the conventional technology where display data for respective kinds of components such as a sheet-supplying device, a print control device, and a sheet-discharging device like are stored, it would be necessary to reconstruct the display data at each time when an overall configuration (combination) of the apparatus changes. Therefore, this causes a problem that load on data processing becomes greater.

Further, in the case of the conventional technology, it would be necessary to perform complicated processing of collecting display data fragmented and stored for respective kinds, constructing (mapping) one display data from these collected display data, and transferring the constructed display data every time and outputting the same on a screen until the display data is actually displayed on the screen. Therefore, the method according the conventional technology is not efficient on a processing speed.

Further, each of the display data used in the conventional technology needs to be constructed exclusively for a respective unit of component of a kind such as a sheet-supplying device, a print control device, and a sheet-discharging device. Furthermore, since the display data have different sizes one another according to their kinds, a storage area must be reserved in accordance with a size of display data and allocated individually when all of these display data are stored in the storage device. Therefore, in the conventional technology, there is a problem that operations of constructing, maintaining, and managing the display data become complicated.

SUMMARY OF THE INVENTION

The present invention has been made to solve the above-described problems, and its object is to provide an image forming apparatus capable of reducing a load required for data transfer and data processing and improving processing speed of those.

Further, another object of the present invention is to provide an image forming apparatus capable of making construction, maintenance, and management of data be easier.

An image forming apparatus according to one aspect of the present invention comprises: a main body for printing an image formed in accordance with image data onto a medium; an attachment coupled to the main body; a data storage portion for storing as display data a configuration image simulating an overall configuration of a combination of the main body and the attachment; an image display device including a display screen having a display area divided into a plurality of divisional areas for displaying the configuration image, the image display device being provided on either one of the main body and the attachment; and a controller for determining displaying and non-displaying on each of the plurality of divisional areas, and controlling the display device to allow a part of the configuration image to be displayed in accordance with the display data on a divisional area which is determined to display, and to allow an other part of the configuration image not to be displayed on a divisional area which is determined not to be displayed.

An image forming apparatus according to another aspect of the present invention comprises: a main body for printing an image formed in accordance with image data onto a medium; an attachment coupled to the main body; a data storage portion for defining a plurality of configuration patterns of the main body and the attachment, and storing as a plurality of display data configuration images simulating overall configurations of combinations of the main body and the attachment arranged in a plurality of configuration patterns; an image display device including a display screen having a display area divided into a plurality of divisional areas for displaying the configuration image, the image display device being provided on either one of the main body and the attachment; a data accumulating portion for accumulating display data for allowing the image display device to display an image on the display screen; a display content determining portion for determining a display content displayed on each of the plurality of divisional areas; a data transferring portion for selecting display data including a display content to be displayed on each of the divisional areas from among a plurality of display data stored in the data storage portion in accordance with a determination result provided by the display content determining portion, and transferring the display data of each of the divisional areas to the data accumulating portion, and allowing the data accumulating portion to accumulate the display data; and a display controller for allowing the configuration image to be displayed on the display screen in accordance with the display data accumulated in the data accumulating portion.

An image forming apparatus according to yet another aspect of the present invention comprises: a main body for printing an image formed in accordance with image data onto a medium; an image display device including a display screen having a display area divided into a plurality of divisional areas, the image display device being provided on the main body; a data storage portion for storing a plurality of individual display data corresponding respectively to the plurality of the divisional areas; and a display controller for allowing an image to be displayed on each of the divisional areas in accordance with the plurality of individual display data stored in the data storage portion to allow a configuration image simulating a configuration of the main body to be displayed on the display screen in a state such that the plurality of divisional areas are synthesized.

These and other objects, features and advantages of the present invention will become more apparent upon reading of the following detailed description along with the accompanied drawings.

BRIEF DESCRIPTION OF THE DRAWINGS

FIG. 9 shows a display screen of the liquid crystal display device in accordance with the second embodiment.

FIG. 31 shows table data in accordance with a fourth embodiment.

FIG. 35 shows table data of the second example of the display operation in accordance with the fourth embodiment.

FIG. 37 shows table data used in a third example of the display operation in accordance with the fourth embodiment.

FIG. 39 shows table data used in the fourth example of the display operation in accordance with the fourth embodiment.

DETAILED DESCRIPTION OF THE PREFERRED EMBODIMENTS

Hereinafter, embodiments of the present invention will be described with reference to the attached drawings. It should be understood that the embodiments described herebelow are embodiments in accordance with the present invention, and do not have characteristics of limiting the technical scope of the present invention.

First Embodiment

Figure 1:
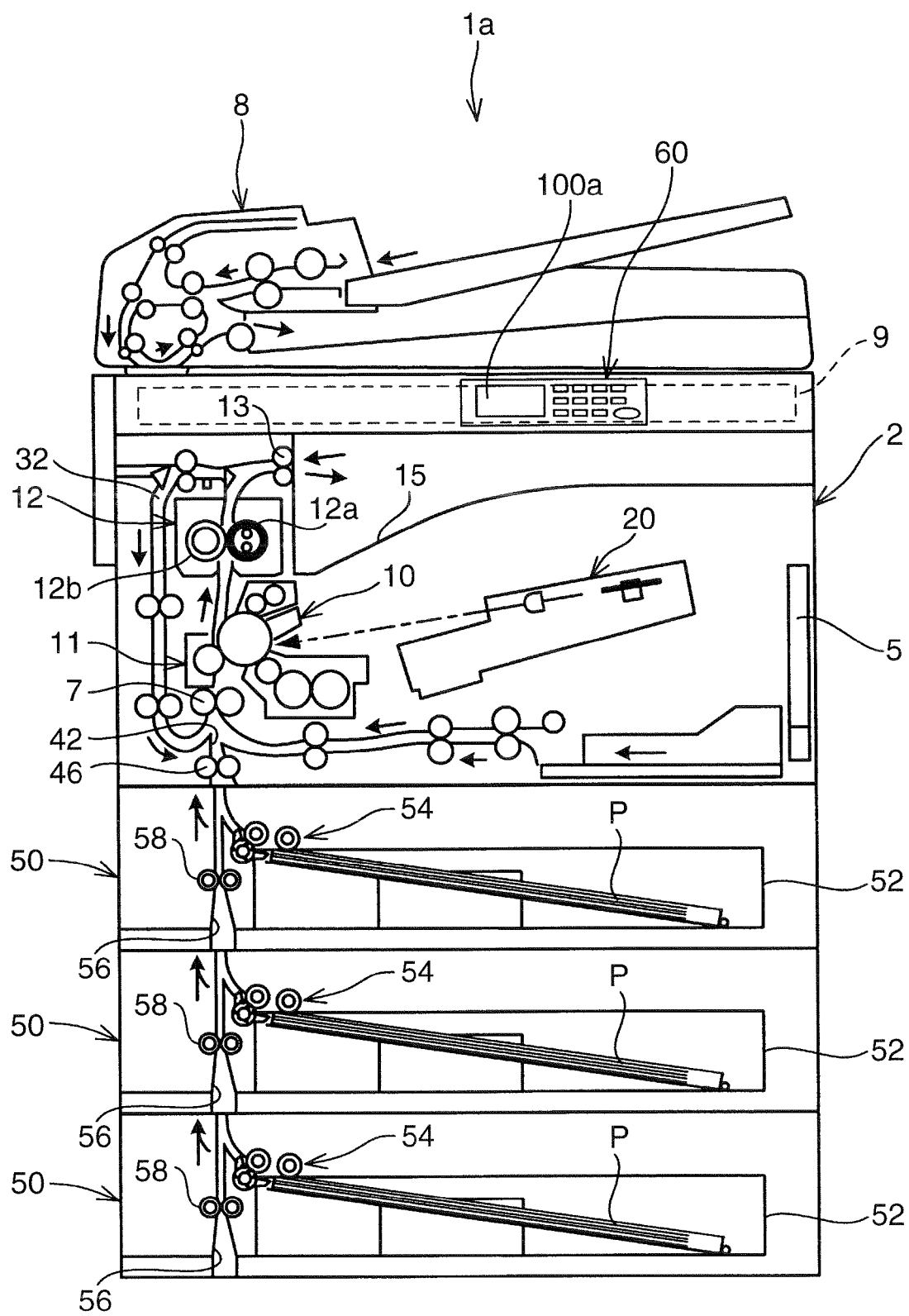
FIG. 1 is a front vertical sectional view schematically showing an overall configuration of an image forming apparatus in accordance with a first embodiment.

Firstly, a first embodiment of the present invention will be described with reference to the drawings. FIG. 1 is a front vertical sectional view schematically showing an overall configuration of an image forming apparatus 1a in accordance with the first embodiment. A front side of FIG. 1 corresponds to a front side of the image forming apparatus 1a facing a user. Further, a right hand side of FIG. 1 corresponds to a right side of the image forming apparatus 1a, and a left hand side corresponds to a left side of the image forming apparatus 1a. Solid line arrows of FIG. 1 show conveying paths and conveying directions of sheets in the image forming apparatus 1a.

The image forming apparatus 1a includes, for example, a copying machine, a complex machine, and a multifunction peripheral (MFP: Multifunction Peripheral) for network use. The image forming apparatus 1a has a box-shaped main body 2 of so-called an in-body sheet discharging type. Therefore, the main body 2 is provided with an in-body type sheet-discharging tray 15 formed therein. The sheet-discharging tray 15 is adapted to discharge a sheet printed in the image forming apparatus 1a from the left side to the right side of the main body 2. A user can take out the sheet discharged to the sheet-discharging tray 15 from the front side or the right side of the main body 2. It should be understood that the image forming apparatus 1a may be provided with a sheet-discharging tray which is not of an in-body sheet-discharging type, or may be coupled with a post-processing apparatus (not illustrated) for performing a post-processing such as a punching processing and a stapling processing.

On the top of the main body 2, a document feeding device 8 is provided. When the image forming apparatus 1a is used as a copying machine, a facsimile machine, and a network scanner, the document feeding device 8 can read a document set thereon. In an upper portion of the main body 2, there is provided an optical image reading device 9. The image reading device 9 has an unillustrated contact glass and reads out an image side of a document placed on an upper surface of the contact glass or a document conveyed by the document feeding device 8.

Further, the document feeding device 8 is coupled to the main body 2 through an unillustrated hinge structure. The hinge structure is positioned at a rear end portion of the main body 2, and the document feeding device 8 is operated to move up pivotally about the hinge structure to open the upper surface of the image reading device 9.

In the image forming apparatus 1a according to the present embodiment, a sheet-supplying section (attachment) 50 can be coupled standardly or optionally to the lower side of the main body 2 for use. For example, provided that a configuration in which the document feeding device 8 and one sheet-supplying section 50 is coupled to the main body 2 is a standard configuration of the image forming apparatus 1a, the example shown in FIG. 1 is an optional configuration in which two sheet-supplying sections 50 are coupled successively in layers in addition to the standard configuration.

Each sheet-supplying section 50 has a sheet-supplying cassette 52, a sheet-supplying unit 54, a sheet passage 56, and a conveying roller 58. The sheet-supplying cassette 52 accommodates a stack of sheets P. The sheet-supplying unit 54 sends out an uppermost sheet P one after another in an upper left direction. The sheet P sent out by the sheet-supplying unit 54 is conveyed vertically upward through the sheet passage 56. The sheet P conveyed upward is taken by the conveying roller 46 of the main body 2 and sent to a sheet conveying passage 42.

Further, the respective sheet passages 56 of the vertically arranged sheet-supplying sections 50 are connected to each other at their respective upper end and lower end. Therefore, a sheet P sent out from a sheet-supplying section 50 which is positioned at a second stage from the uppermost or at a stage lower than the second stage among three stages of sheet-supplying sections 50 is taken by the conveying rollers 58 in the sheet passages 56 of upper stages and conveyed vertically upward.

On the right side of the main body 2, there is provided a retractable manual feeding tray 5. The manual feeding tray 5 is used in a case of supplying a sheet having a size not accommodatable in the sheet-supplying cassette 52, an OHP sheet, and the like one after another. The manual feeding tray 5 is folded to be accommodated in the right side of the main body 2 when it is not used.

A sheet P sent out from the sheet-supplying section 50 passes through the sheet conveying passage 42 and is taken by a registration roller 7. Further, a sheet P sent out from the manual feeding tray 5 is conveyed horizontally leftward in the main body 2 from the right side, and enters the sheet conveying passage 42, and then is taken by the registration roller 7.

In the image forming apparatus 1a, an image forming is performed in such a manner as described herebelow. In the main body 2, there are provided a print engine 10 and a transferring section 11 at positions downstream of the sheet conveying passage 42 in a sheet-conveying direction. The print engine 10 forms an electrostatic latent image in accordance with image data of a read image to which a predetermined image processing is applied or image data transmitted from an external equipment, and forms (develops) a toner image with the electrostatic latent image.

In the main body 2, there is provided a laser scanning unit 20 being adjacent on the right side of the print engine 10 to form an electrostatic latent image on the print engine 10. As indicated by one-dotted chain line arrow in FIG. 1, the laser scanning unit 20 irradiates a scanning beam to a surface of a photoconductive drum provided in the print engine 10.

The registration roller 7 adjusts an oblique transfer of a sheet P and sends out the sheet P to the transferring section 11 in synchronization with a toner image formed in the print engine 10. The transferring section 11 transfers a toner image to a sheet P which is conveyed by the registration roller 7 while being synchronized.

The fixing device 12 is provided on downstream of the transferring section 11 in the sheet conveying direction. The sheet P onto which an unfixed toner image is transferred in the transferring section 11 is sent to the fixing device 12. The fixing device 12 has a heating roller 12a and a pressing roller 12b. The toner image is heated and pressed when the sheet P passes through a nip portion between the heating roller 12a and the pressing roller 12b, so that the toner image is fixed on the sheet P.

When a both side printing is not performed, in other words, when a one side printing is performed, the sheet P discharged from the fixing device 12 is discharged to the sheet-discharging tray by a sheet-discharging roller 13. When the both side printing is performed, the sheet P is temporarily conveyed toward the sheet-discharging tray 15 until a certain point by the sheet-discharging roller 13, and a conveying direction is switched so that the sheet P is taken into a sheet-reversing passage 32. After being taken into the sheet-reversing passage 32, the sheet P is conveyed downward in the sheet-reversing passage 32 along the left side of the main body 2, and thereafter reversed upward at an upper position of the sheet-supplying section 50 and sent to the registration roller 7.

On an exterior cover of the image forming apparatus 1a, there is provided an operation display device 60. The operation display device 60 includes various operation buttons and a liquid crystal display device. Among those, the operation buttons receive a user's input operation. Further, the liquid crystal display device displays on its display screen various textual information for a user (such as a status and operation menus) and a configuration image simulating configurations of the image forming apparatus 1a and its attachments. Such configuration image is used for visually presenting to a user a position where a sheet jam occurs during an operation of the image forming apparatus 1a and a state of running out of sheets in the sheet-supplying section 50. Hereinafter, a display control of a configuration image in accordance with the present embodiment will be described in detail.

Figure 2:
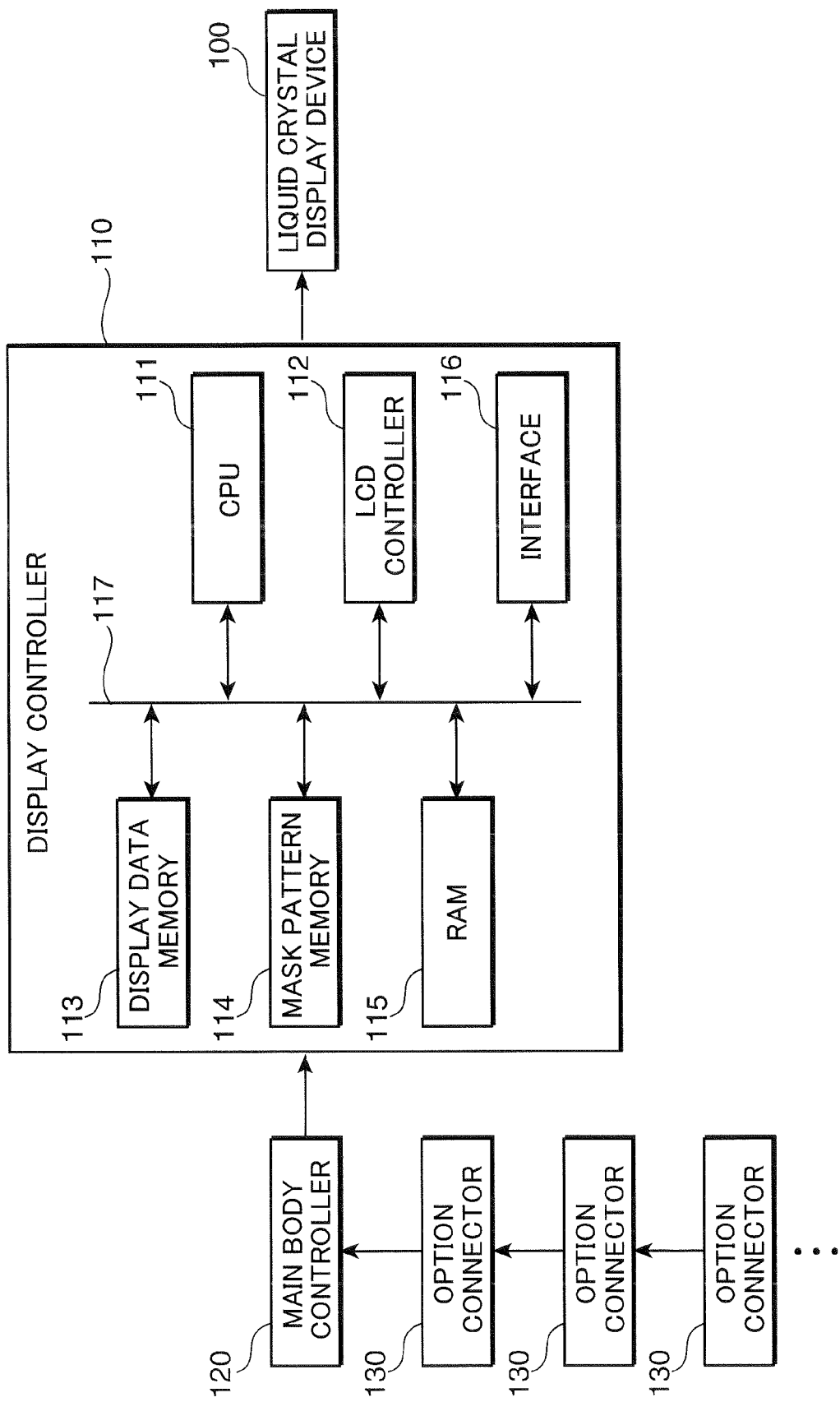
FIG. 2 is a block diagram showing a configuration of a display controller of a liquid crystal display device provided in an operation display portion shown in FIG. 1.

FIG. 2 is a block diagram showing a configuration of a display controller 110 of a liquid crystal display device 100 provided in the operation display device 60 shown in FIG. 1. A control of the liquid crystal display device 100 is performed, for example, in the display controller 110. The display controller 110 includes a CPU (Central Processing Unit) 111, an LCD (Liquid Crystal Display) controller 112, a display data memory 113, a mask pattern memory 114, a RAM (Random Access Memory) 115, and an interface 116.

In the liquid crystal display device 100, a display area necessary for displaying a configuration image on a display screen is divided into a plurality of divisional areas. It should be understood that the liquid crystal display device 100 is provided on the main body 2 in the present embodiment, but the present invention is not especially limited to this. The liquid crystal display device 100 may be provided on an attachment such as the sheet-supplying section 50.

The display controller 110 may be configured as a single circuit board provided in the main body 2 of the image forming apparatus 1a. On the circuit board, the above-described components are mounted. The components are connected to each other through an unillustrated wiring pattern and a bus 117. The CPU 111, the LCD controller 112, and the RAM 115 may be of a widely used type. It should be understood that the CPU 111 may be an ASIC (Application Specific Integrated Circuit) in which an application is installed for exclusive use, or may be a package including the display data memory 113, the mask pattern memory 114, and the RAM 115. Further, operation signals outputted from the above-described operation buttons is inputted to the display controller 110 through the interface 116.

The display data memory 113 includes a storage device such as a ROM (Read Only Memory) and an EEPROM (Electronically Erasable and Programmable Read Only Memory) and stores as display data a configuration image simulating an overall configuration of the image forming apparatus i.e. a combination of the main body 2 and the sheet-supplying section 50. In a memory area (memory block) of the display data memory 113, display data as a material of an image to be displayed by the liquid crystal display device 100 is stored. Details of the display data will be described hereinafter.

The mask pattern memory 114 also includes a storage device such as a ROM and an EEPROM and stores a plurality of mask patterns presenting displaying and non-displaying on each of the divisional areas in accordance a configuration pattern of the main body 2 and the sheet-supplying section 50 of the image forming apparatus. The mask pattern memory 114 stores mask patterns which are used when the CPU 111 transfers the display data to the LCD controller 112. Details of the mask pattern will also be described hereinafter.

The main body controller 120 inputs a system configuration information to the display controller 110. This system configuration information is adapted to identify an overall system configuration when the sheet-supplying section 50 is standardly or optionally coupled to the main body 2 of the image forming apparatus 1a. In particular, the system configuration information is adapted to identify if the system of the image forming apparatus 1a includes a configuration having only the main body 2, or a configuration in which one sheet-supplying section 50 is coupled to the main body 2, or a configuration having two sheet-supplying sections 50 coupled to the main body 2, or a configuration having three or more sheet-supplying sections 50 coupled to the main body 2.

The main body controller 120 is provided in the main body 2 as a unit having a function of controlling an image forming operation of the image forming apparatus 1a. The above-described system configuration information is created in the main body controller 120. Though it is not illustrated, the main body controller 120 also includes an arithmetic processing unit such as a CPU, a storage device, and an interface, and each of the components is mounted on the circuit board. Each sheet-supplying section 50 has an option connector 130 of a drawer type. When the sheet-supplying section 50 is coupled to the main body 2, the option connector 130 is connected simultaneously.

Further, when a plurality of sheet-supplying sections 50 are coupled in layers, the option connectors 130 are connected to the main body 2 in cascade. Each option connector 130 is grounded at the ground level which is in common with the main body controller 120. The main body controller 120 can detect the number of stages of the sheet-supplying sections 50 in accordance with a connection signal (ON or OFF) of each option connector 130. When there are a plurality of kinds of sheet-supplying section 50, the above-described connection signal further includes information (about 4 bits) for identifying the kind.

The CPU 111 determines displaying and non-displaying on each of the plurality of divisional areas. Specifically, the CPU 111 selects from among a plurality of mask patterns stored in the mask pattern memory 114 a mask pattern corresponding to a configuration pattern which is determined in accordance with a detection result of the sheet-supplying section 50 provided by the main body controller 120, and determines displaying and non-displaying on each of the divisional areas in accordance with the selected mask pattern.

The LCD controller 112 controls the liquid crystal display device 100 to allow a part of the configuration image to be displayed in accordance with the display data on a divisional area which is determined by the CPU 111 to display among the plurality of divisional areas, and to allow an other part of the configuration image not to be displayed on a divisional area which is determined not to be displayed.

In the present embodiment, the main body 2 corresponds to an example of a main body, and the sheet-supplying section 50 corresponds to an example of an attachment, and the display data memory 113 corresponds to an example of a data storage portion, and the liquid crystal display device 100 corresponds to an example of an image display device, and the CPU 111 corresponds to an example of a display determining portion, and the LCD controller 112 corresponds to an example of a display controller, and the main body controller 120 and the option connector 130 correspond to an example of the configuration detecting portion, and the mask pattern memory 114 corresponds to an example of a mask pattern storage portion.

Figure 3:
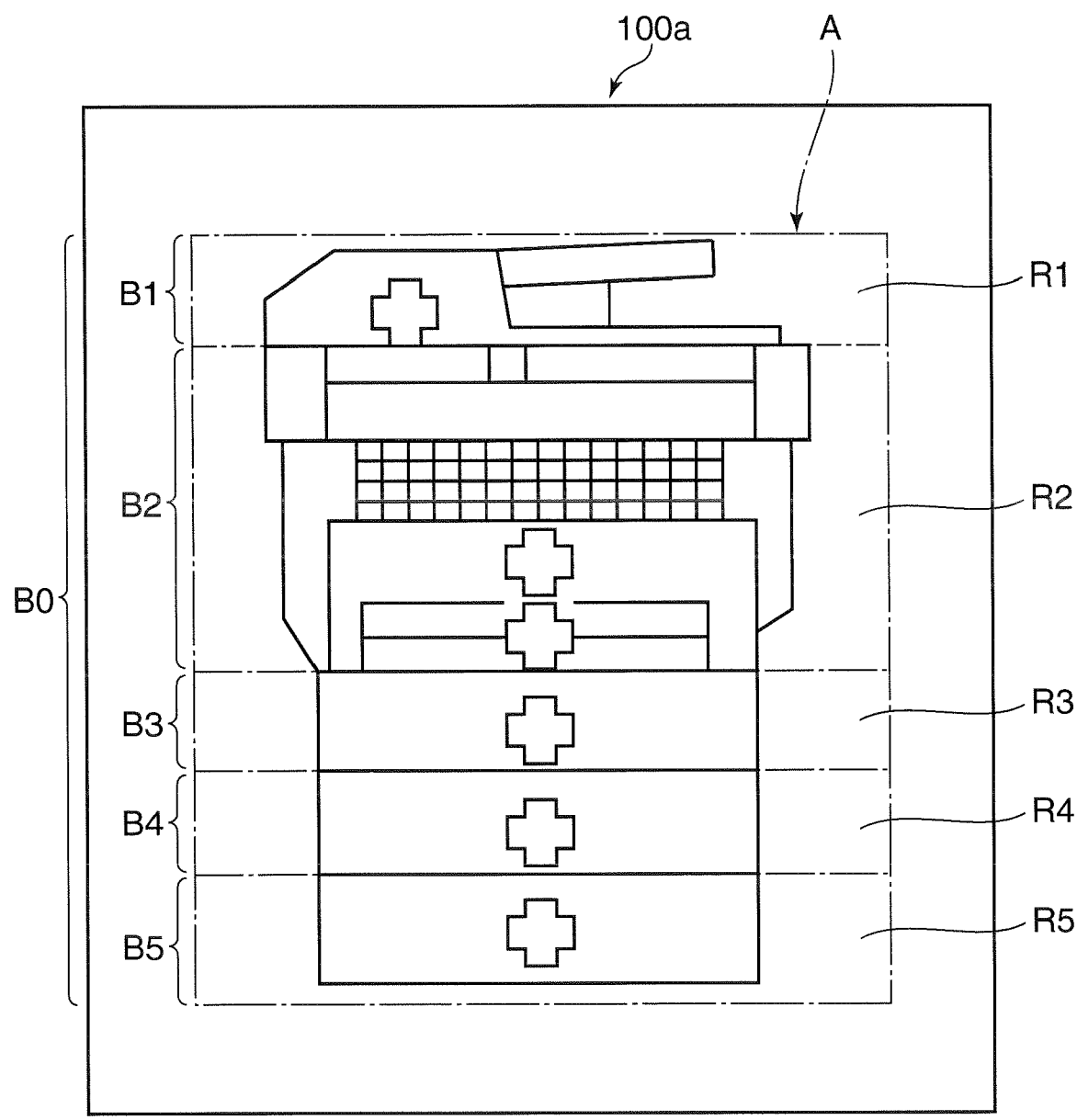
FIG. 3 shows a display screen of the liquid display device in accordance with the first embodiment.

FIG. 3 shows a display screen 100a of the liquid crystal display device 100 in accordance with the first embodiment. In the present embodiment, a display area A indicated by one-dotted chain lines is defined on the display screen 100a. On the display area A, a bitmap image (configuration image) B0 showing an overall configuration of the image forming apparatus 1a is displayed. The bitmap image B0 of FIG. 3 simulates an overall system configuration in which a maximum number (here, it is three) of the sheet-supplying sections 50 are coupled together to the main body 2.

Further, the display area A is divided into a plurality of divisional areas R1 through R5 in the display screen 100a. The rectangular areas defined by one-dotted lines in FIG. 3 correspond respectively to the divisional areas R1 through R5. These divisional areas R1 through R5 are arranged vertically adjacent to each other on the display screen 100a. In the example shown in FIG. 3, five divisional areas R1 through R5 are arranged in a vertical direction. It should be understood that the contour of the display area A and the one-dotted lines defining the divisional areas R1 through R5 are not actually displayed on the display screen 100a.

Figure 4A:
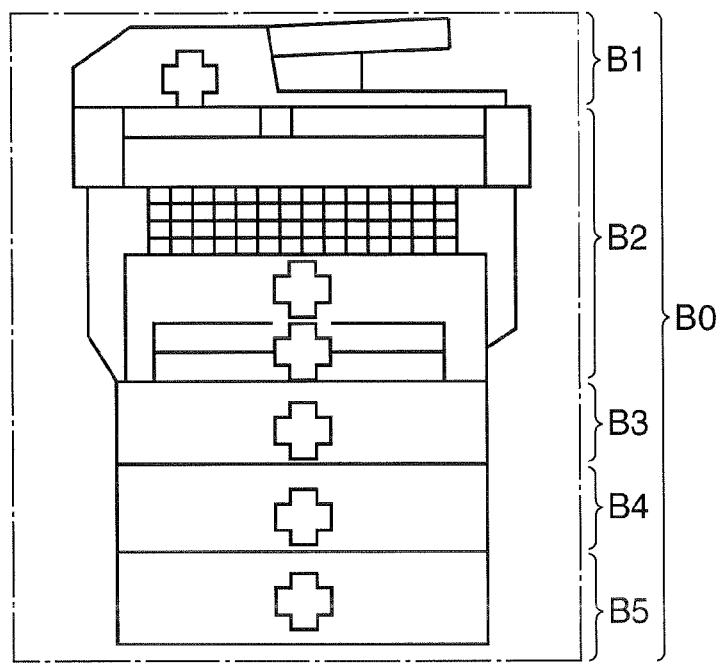
FIG. 4A shows a bitmap image in accordance with the first embodiment.
Figure 4B:
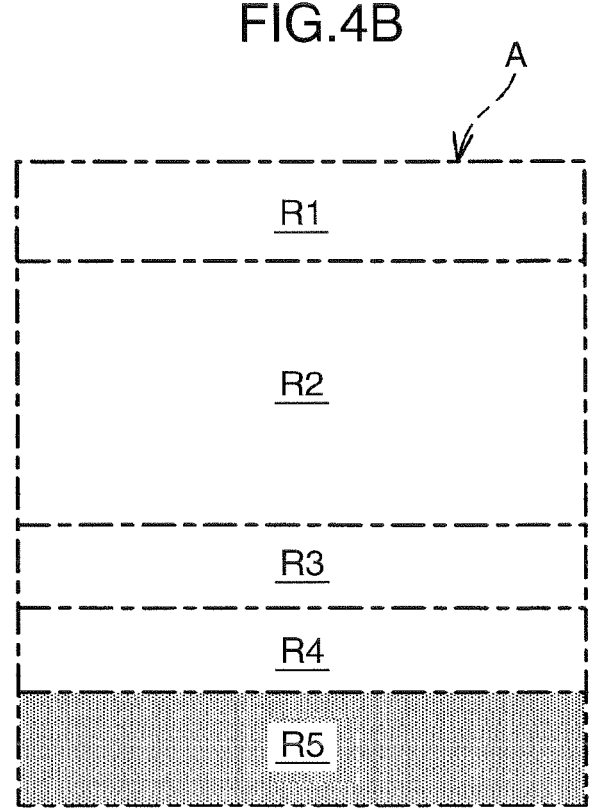
FIG. 4B shows a visualized mask pattern in accordance with the first embodiment.

FIG. 4 shows the bitmap image B0 and a mask pattern in accordance with the first embodiment. FIG. 4A generally shows a whole bitmap image B0 in accordance with the first embodiment. FIG. 4B shows a visualized mask pattern in accordance with the first embodiment.

In FIG. 4A, the bitmap image B0 is stored as one display data as a whole in the display data memory 113. The display data is constructed by monochromatic binary data in a bitmap form and 4 bit data having 16 shades.

The bitmap image B0 includes five individual images B1 through B5 corresponding respectively to the divisional areas R1 through R5. Among those, the individual image B1 corresponds to a configuration image simulating a configuration of the document feeding device 8 shown in FIG. 1. Further, the individual image B2 corresponds to a configuration image simulating a configuration of the main body 2. Similarly, the individual images B3, B4, B5 correspond to configuration images of the sheet-supplying sections 50 of respective stages. A combination of these five individual images B1 through B5 constitutes the single bitmap image B0 simulating an overall system configuration of the image forming apparatus 1a. It should be understood that the separation of the individual images B1 through B5 is made just for showing visible images of those, and the bitmap display data is not divided into five parts.

In FIG. 4B, the mask pattern is visibly shown, but it is stored just as data in the mask pattern memory 114. The mask pattern is control data which is used for determining displaying and non-displaying on each of the divisional areas R1 through R5 defined in the display area A. In FIG. 4B, a mask (non-display) area of the mask pattern at which the display is not allowed is shaded. The example shown in FIG. 4B indicates that displaying is allowed on the upper four divisional areas R1 through R4, and displaying is not allowed on the divisional area R5 at the lowermost layer. It should be understood that a mere example is shown here, and a plurality of different mask patterns are stored in the mask pattern memory 114.

Figure 5:
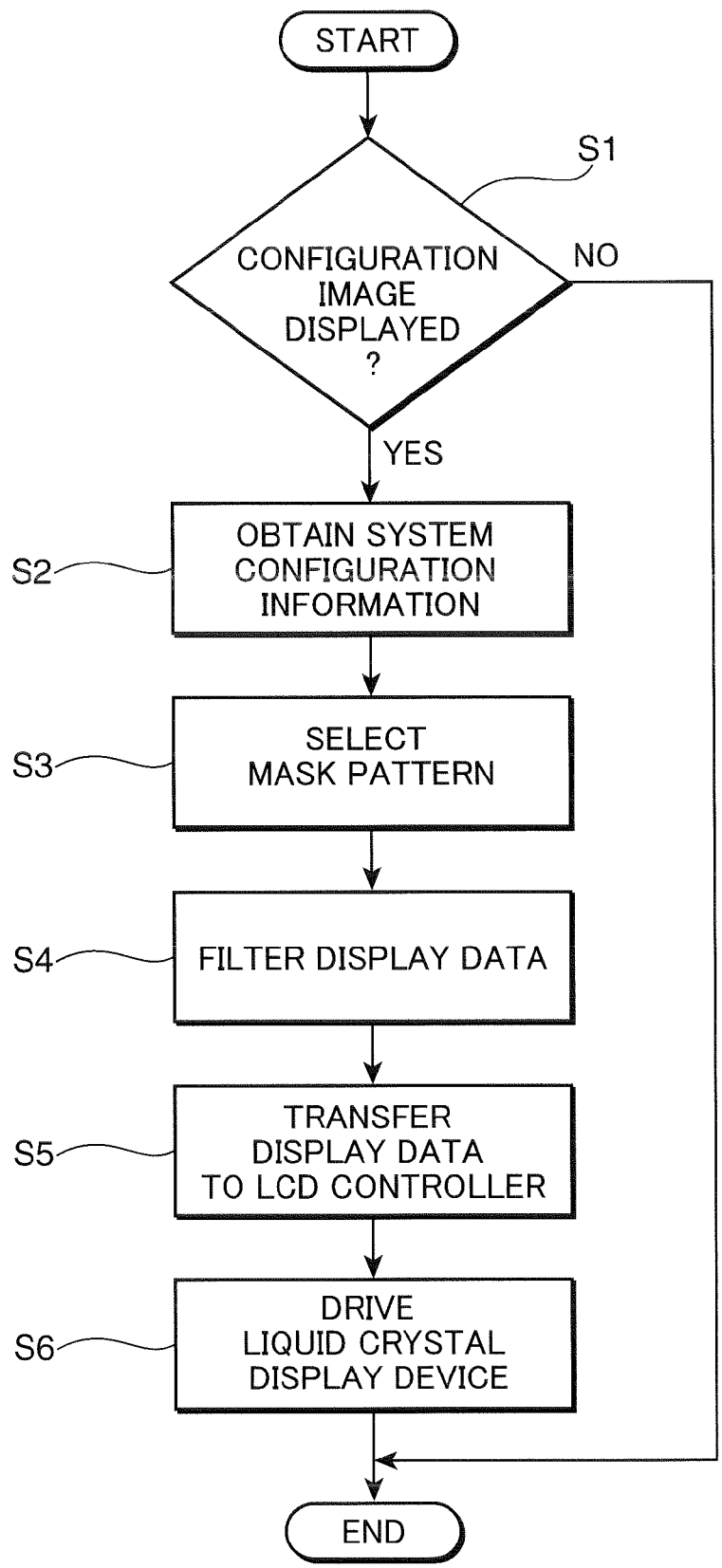
FIG. 5 is a flowchart illustrating a display control sequence executed in the display controller in accordance with the first embodiment.

Next, a display control sequence executed in the display controller 110 in accordance with the first embodiment will be described. FIG. 5 is a flowchart illustrating the display control sequence executed in the display controller 110 in accordance with the first embodiment.

When a power of the image forming apparatus 1a is turned on, the main body controller 120 performs a predetermined initialization processing, and thereafter creates system configuration information with reference to a connection signal of the option connector 130. Further, the display controller 110 performs a predetermined initialization processing and thereafter shifts to the display control sequence. Hereinafter, the display control sequence will be described by following the order of steps.

Firstly, in step S1, the CPU 111 of the display controller 110 determines whether or not the liquid crystal display device 100 should display the configuration image on the display screen 100a. For example, when phenomenon such as a sheet jam (jamming), running out of a sheet, and a misdesignation of a sheet size occurs during an image forming, the image forming apparatus 1a displays an overall system configuration image on the display screen 100a to visually presenting to a user a portion at which the phenomenon such as a sheet jam occurs. In this case, for example, the main body controller 120 transmits a display order of displaying a configuration image to the display controller 110. The CPU 111 determines existence and nonexistence of the display order transmitted from the main body controller 120 to determine whether or not the configuration image should be displayed on the display screen 100a.

The CPU 111 of the display controller 110 determines that it would be necessary to display the configuration image when it receives the display order transmitted from the main body controller 120. Here, when it is determined that it would be necessary to display the configuration image (YES in step S1), the routine proceeds to the processing of step S2. When the CPU 111 does not receive the display order transmitted from the main body controller 120, it determines that it would not be necessary to display the configuration image. When it is determined that it would not be necessary to display the configuration image (NO in step S1), the sequence is terminated for the meantime.

Next, when it is determined in step S1 that it would be necessary to display the configuration image, the CPU 111 of the display controller 110 obtains current system configuration information in step S2. It should be understood that the system configuration information which is received from the main body controller 120 in the step before execution of the sequence may be cashed, or the system configuration information may be newly received from the main body controller 120.

Next, in step S3, the CPU 111 accesses the mask pattern memory 114 and selects a mask pattern which corresponds to the current system configuration information.

Next, in step S4, the CPU 111 reads out display data from the display data memory 113 and filters the display data in accordance with the selected mask pattern. Specifically, among two-dimensional addresses of the display data, the CPU 111 performs a processing of rewriting address areas corresponding to any of the divisional areas R1 through R5 on which an image is not allowed to be displayed in accordance with the mask pattern to "NULL" (blank data). It should be understood that the filtered display data is written into, for example, the RAM 115.

Next, in step S5, the CPU 111 transfers the filtered display data from the RAM 115 to the LCD controller 112. Next, in step S6, the LCD controller 112 of the display controller 110 drives the liquid crystal display device 100 in accordance with the transferred display data.

Figure 6:
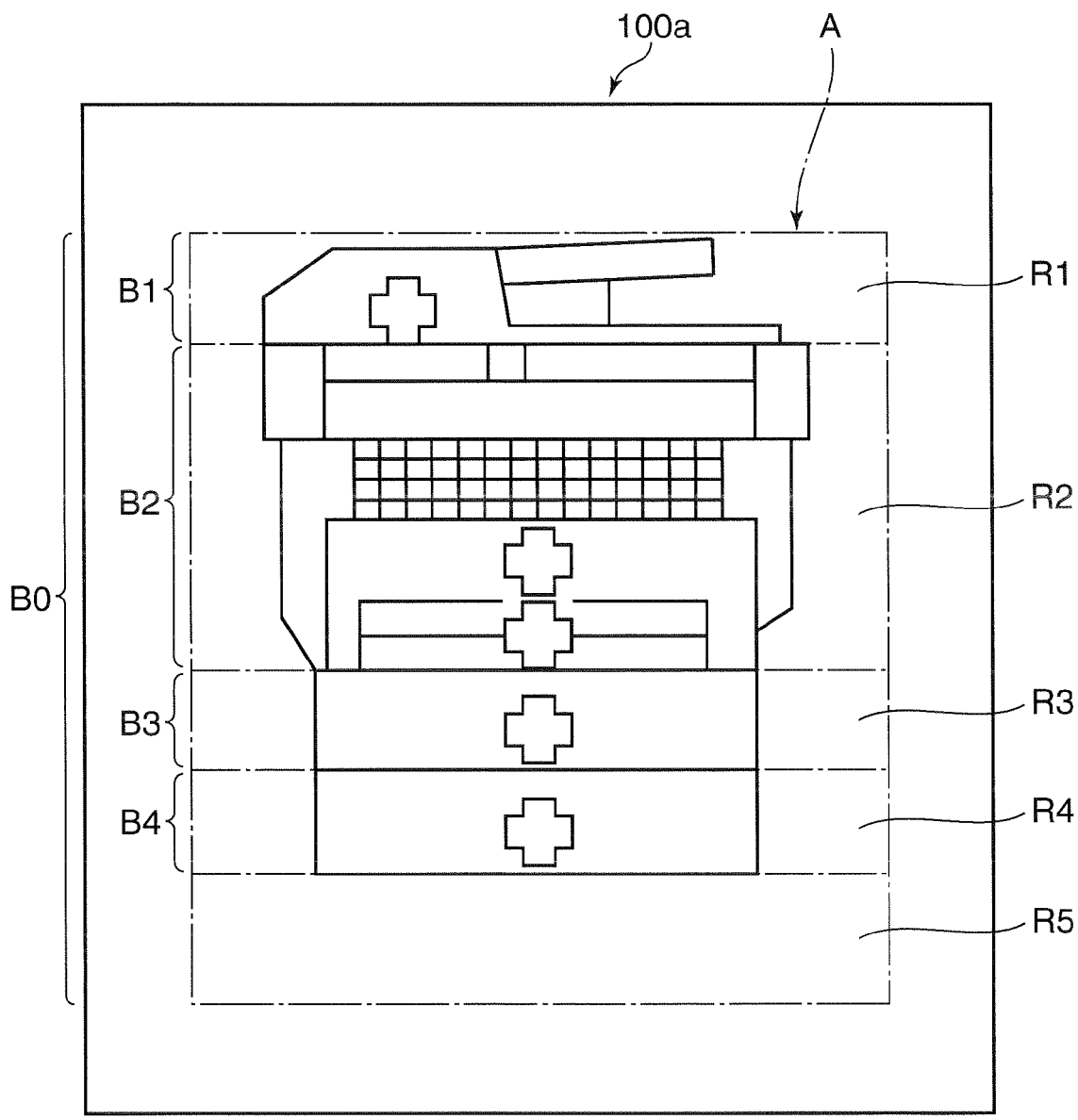
FIG. 6 shows a display operation of the liquid crystal display device, which is performed with execution of the display control sequence shown in FIG. 5.

FIG. 6 shows an example of a display operation of the liquid crystal display device 100, which is performed with execution of the display control sequence shown in FIG. 5. The example of the display operation shown in FIG. 6 corresponds to a system configuration in which one sheet-supplying section 50 is optionally coupled to the image forming apparatus 1a having the standard configuration (document feeding device 8, main body 2 and one sheet-supplying section 50). In this case, being different from the example of the configuration shown in FIG. 1, the image forming apparatus 1a includes two sheet-supplying sections 50 (one added to the standard configuration) in total.

In the above-described system configuration, the mask pattern shown in FIG. 4B is selected in step S3. Therefore, the area corresponding to the divisional area R5 of the display data is rewritten into "NULL" in step S4. As a result, the individual images B1 through B4 of the bitmap image B0 are displayed in the corresponding divisional areas R1 through R4 on the display screen 100a, but a display content of the divisional area R5 is allowed to be blank. Accordingly, as a whole, the bitmap image B0 is displayed in a manner such that it is partially masked. The bitmap image B0 partially masked in such manner becomes a configuration image which truly simulates an actual overall system configuration (the document feeding device 8, the main body 2 and two sheet-supplying sections 50).

Next, another example of a display operation in accordance with the present embodiment will be described. Although it is not illustrated particularly, storing a plurality of different mask patterns in the mask pattern memory 114 allows a display operation to be performed in conformity with an actual system configuration of the image forming apparatus 1a as described herebelow.

(1) For example, in a case where the system of the image forming apparatus 1a has a standard configuration including the document feeding device 8, the main body 2 and only one sheet-supplying section 50, a mask pattern of allowing the divisional areas R4, R5 to be blank is selected. The individual images B4, B5 are not displayed on the display screen 100a, and a configuration image having a combination of the individual images B1, B2, B3 is displayed.

(2) Alternatively, in a case where the document feeding device 8 is not optionally provided, and two sheet-supplying sections 50 are coupled to the main body 2, a mask pattern of allowing the divisional areas R1, R5 to be blank is selected. On the display screen 100a, the individual images B1, B5 are not displayed, and a configuration image having a combination of the individual images B2, B3, B4 is displayed.

(3) In a case where the document feeding device 8 is not optionally provided, and only one sheet-supplying section 50 is coupled to the main body 2, a mask pattern of allowing the divisional areas R1, R4, R5 to be blank is selected. On the display screen 100a, the individual images B1, B4, B5 are not displayed, and a configuration image having a combination of the individual images B2, B3 is displayed.

It should be understood that mask patterns may be prepared for all of the system configuration patterns which can be anticipated in advance, or may be prepared and sorted into a plurality of groups so that patterns selected from the groups can be used in combination.

For example, in the case of the display operation of (2) above, the mask pattern memory 114 stores mask patterns of allowing the divisional area R1 to be blank as a first group, and stores mask patterns of allowing the divisional area R5 to be blank as a second group. The CPU 111 selects mask patterns in combination of the first group and the second group. This allows the individual images B1, B5 not to be displayed on the display screen 100a, and a configuration image including a combination of the individual images B2, B3, B4 is displayed.

Alternatively, in the case of the example of display operation of (3) above, the mask pattern memory 114 stores a mask pattern of allowing the divisional area R1 to be blank as a first group, and stores mask patterns of allowing the divisional areas R4, R5 to be blank as a second group. The CPU 111 selects the first group and the second group in combination. This allows the individual images B1, B4, B5 not to be displayed on the display screen 100a, and a configuration image including a combination of the individual images B2, B3 is displayed.

Other than the above, three mask patterns respectively allowing one of the divisional areas R1, R4, R5 to be blank may be prepared, so that one of these can be used solely or they can be used in desirable combinations.

As described above, according to the present embodiment, a mask pattern is selected in conformity with an actual system configuration, and the display data is filtered to be displayed on the display screen 100a. Accordingly, it would be enough to store only one kind of display data showing an overall configuration of the image forming apparatus 1a in the display data memory 113.

Further, even if the system configuration changes, it would be enough to always use only one kind of display data. Accordingly, it would not be necessary to read out a plurality of display data in accordance with a system configuration or arrange these on the memory space to construct transfer data. Thus, a load required for data transfer and data processing in the display controller 110 is reduced, so that efficient data transfer and processing can be achieved.

Furthermore, even in a case where the configuration pattern of the image forming apparatus changes in a plurality of ways, it would not be necessary to store duplicate display data for each configuration pattern, so that the amount of data to be stored can be minimized.

The present invention is not limited to the embodiment described above, and it may be modified in various ways for practice. As an example of the system configuration in accordance with the present embodiment, the main body 2 and the standard sheet-supplying section 50 are separated. However, the sheet-supplying section 50 may be uniformly provided in the main body 2.

Further, the display area A, the divisional areas R1 through R5, the bitmap image B0, and the like shown in the present embodiment are preferred examples, and these may be desirably modified for practice. Further, when the configuration pattern of the system changes, another bitmap image is used accordingly. Therefore, when the configuration pattern of the system changes, it surely becomes different from the contents of the display data and mask pattern in accordance with the present embodiment.

Further, the document feeding device 8 and the sheet-supplying section 50 are described as optional attachments in the present embodiment. However, a finisher (post-processing device) as another example of the attachment may be coupled to the main body 2.

Furthermore, the liquid crystal display device 100 is provided on the main body 2 in the present embodiment. However, the liquid crystal display device 100 may be provided on the attachment such as the document feeding device 8 and the finisher.

Second Embodiment

Figure 7:
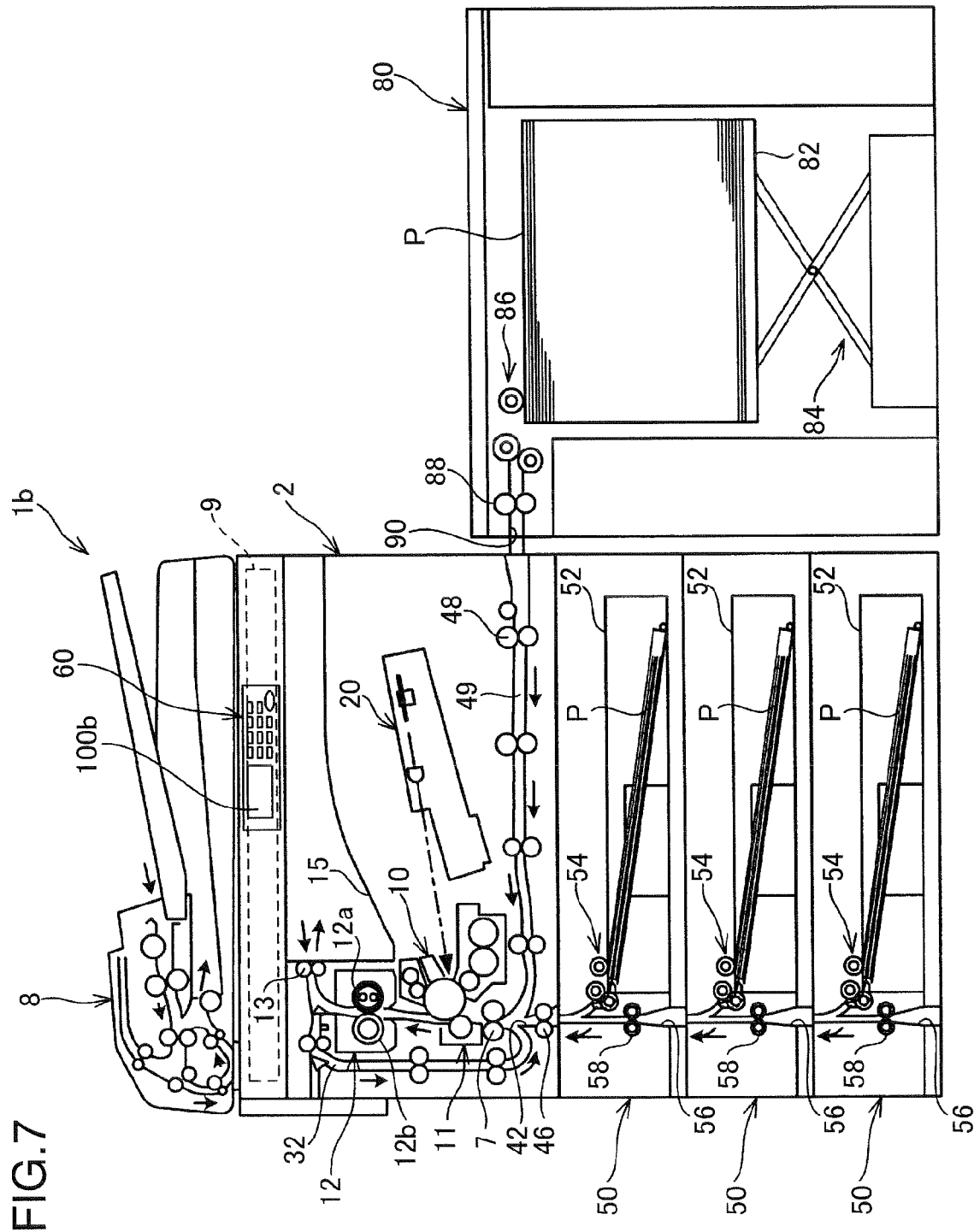
FIG. 7 is a front vertical sectional view schematically showing an overall configuration of an image forming apparatus in accordance with a second embodiment.

Next, a second embodiment of the present invention will be described with reference to the drawings. FIG. 7 is a front vertical sectional view schematically showing an overall configuration of an image forming apparatus 1b in accordance with the second embodiment. A front side of FIG. 7 corresponds to a front side of the image forming apparatus 1b facing a user. Further, a right hand side of FIG. 1 corresponds to a right side of the image forming apparatus 1b, and a left hand side corresponds to a left side of the image forming apparatus 1b. Solid line arrows depicted in FIG. 7 show conveying paths and conveying directions of sheets in the image forming apparatus 1b. It should be understood that components which are the same as those in the first embodiment are identified with the same reference numerals.

The image forming apparatus 1b includes, for example, a copying machine, a complex machine, and a multifunction peripheral (MFP) for network use. The image forming apparatus 1b has a box-shaped main body 2 of so-called an in-body sheet discharging type. Therefore, the main body 2 is provided therein with an in-body type sheet-discharging tray 15. The sheet-discharging tray 15 is adapted to discharge a sheet printed in the image forming apparatus 1b from the left side to the right side of the main body 2. A user can take out the sheet discharged to the sheet-discharging tray 15 from the front side or the right side of the main body 2. It should be understood that the image forming apparatus 1b may be provided with a sheet-discharging tray which is not of an in-body sheet-discharging type, or may be coupled with a post-processing apparatus (not illustrated) for performing a post-processing such as a punching processing and a stapling processing.

On the top of the main body 2, a document feeding device 8 is provided. When the image forming apparatus 1b is used as a copying machine, a facsimile machine, and a network scanner, the document feeding device 8 can read a document set thereon. In an upper portion of the main body 2, there is provided an optical image reading device 9. The image reading device 9 has an unillustrated contact glass and reads out an image side of a document placed on an upper surface of the contact glass or a document conveyed by the document feeding device 8.

Further, the document feeding device 8 is coupled to the main body 2 through an unillustrated hinge structure. The hinge structure is positioned at a rear end portion of the main body 2, and the document feeding device 8 is operated to move up pivotally about the hinge structure to open the upper surface of the image reading device 9.

In the image forming apparatus 1b according to the present embodiment, a sheet-supplying section (attachment) 50 can be coupled standardly or optionally to the lower side of the main body 2 for use. Further, in the present embodiment, a large capacity sheet feeding section (attachment) 80 may be optionally coupled to a side (right side in the example of FIG. 7) of the main body 2. For example, provided that a configuration in which the document feeding device 8 and one sheet-supplying section 50 are coupled to the main body 2 is a standard configuration of the image forming apparatus 1b, the example shown in FIG. 7 is an optional configuration in which two sheet-supplying sections 50 are coupled successively in layers in addition to the standard configuration, and the large capacity sheet supplying section 80 is further coupled on the right side.

Each sheet-supplying section 50 has a sheet-supplying cassette 52, a sheet-supplying unit 54, a sheet passage 56, and a conveying roller 58. The sheet-supplying cassette 52 accommodates a stack of sheets P. The sheet-supplying unit 54 sends out an uppermost sheet P one after another in an upper left direction. The sheet P sent out by the sheet-supplying unit 54 is conveyed vertically upward through the sheet passage 56. The sheet P conveyed upward is taken by the conveying roller 46 of the main body 2 and sent to a sheet conveying passage 42.

Further, the respective sheet passages 56 of the vertically arranged sheet-supplying sections 50 are connected to each other at their respective upper end and lower end. Therefore, a sheet P sent out from a sheet-supplying section 50 which is positioned at a second stage from the uppermost or at a stage lower than the second stage among three stages of sheet-supplying sections 50 is taken by the conveying rollers 58 in the sheet passages 56 of upper stages and conveyed vertically upward. The sheet P sent out from the sheet-supplying section 50 passes through the sheet conveying passage 42 and is taken by the registration roller 7.

The large capacity sheet supplying section 80 accommodates a larger number of sheets P than the sheet-supplying section 50. The large capacity sheet supplying section 80 has a sheet-holding plate 82, a lifting unit 84, a sheet-supplying unit 86, a supplying roller 88, and a sheet passage 90. The sheet-holding plate 82 holds a relatively large number of sheets P in a stack. These sheets P are lifted vertically upward by a driving force of the lifting unit 84, and the uppermost part of the sheets P is maintained at a constant height. The sheet-supplying unit 86 sends out a sheet P placed at the upper most layer successively in a leftward direction. The sheet P sent out by the sheet-supplying unit 86 is sent into the main body 2 by the supplying roller 88 through the sheet passage 90. The conveyed sheet P is taken by the conveying roller 48 of the main body 2 and sent into the sheet conveying passage 49. After being conveyed leftward in the main body 2, the sheet P enters the sheet conveying passage 42 and is taken by the registration roller 7.

In the image forming apparatus 1b, an image forming is performed in such a manner as described hereinbelow. In the main body 2, there are provided a print engine 10 and a transferring section 11 at positions downstream of the sheet conveying passage 42 in a sheet-conveying direction. The print engine 10 forms an electrostatic latent image in accordance with image data of a read image to which a predetermined image processing is applied, or image data transmitted from an external equipment, and forms (develops) a toner image with the electrostatic latent image.

In the main body 2, there is provided a laser scanning unit 20 being adjacent on the right side of the print engine 10 to form an electrostatic latent image on the print engine 10. As indicated by one-dotted chain line arrows in FIG. 7, the laser scanning unit 20 irradiates a scanning beam to a surface of a photoconductive drum provided in the print engine 10.

The registration roller 7 adjusts an oblique transfer of a sheet P and sends out the sheet P to the transferring section 11 in synchronization with a toner image formed in the print engine 10. The transferring section 11 transfers a toner image to a sheet P which is conveyed by the registration roller 7 while being synchronized.

The fixing device 12 is provided on downstream of the transferring section 11 in the sheet conveying direction. The sheet P onto which an unfixed toner image is transferred in the transferring section 11 is sent to the fixing device 12. The fixing device 12 has a heating roller 12a and a pressing roller 12b. The toner image is heated and pressed when the sheet P passes through a nip portion between the heating roller 12a and the pressing roller 12b, so that the toner image is fixed on the sheet P.

When a both side printing is not performed, in other words, when a one side printing is performed, the sheet P discharged from the fixing device 12 is discharged to the sheet-discharging tray 15 by a sheet-discharging roller 13. When the both side printing is performed, the sheet P is temporarily conveyed toward the sheet-discharging tray 15 until a certain point by the sheet-discharging roller 13, and a conveying direction is switched so that the sheet P is taken into a sheet-reversing passage 32. After being taken into the sheet-reversing passage 32, the sheet P is conveyed downward in the sheet-reversing passage 32 along the left side of the main body 2, and thereafter reversed upward at an upper position of the sheet-supplying section 50 and sent to the registration roller 7.

On an exterior cover of the image forming apparatus 1b, there is provided an operation display device 60. The operation display device 60 includes various operation buttons and a liquid crystal display device. The operation buttons receive a user's input operation. Further, the liquid crystal display device displays on its display screen various textual information for a user (such as a status and operation menus) and a configuration image simulating configurations of the image forming apparatus 1b and its attachments. Such configuration image is used for visually presenting to a user a position where a sheet jam occurs during an operation of the image forming apparatus 1b and a state of sheets running out in the sheet-supplying section 50 or the large capacity sheet supplying section 80. Hereinafter, a display control of a configuration image in accordance with the present embodiment will be described in detail.

Figure 8:
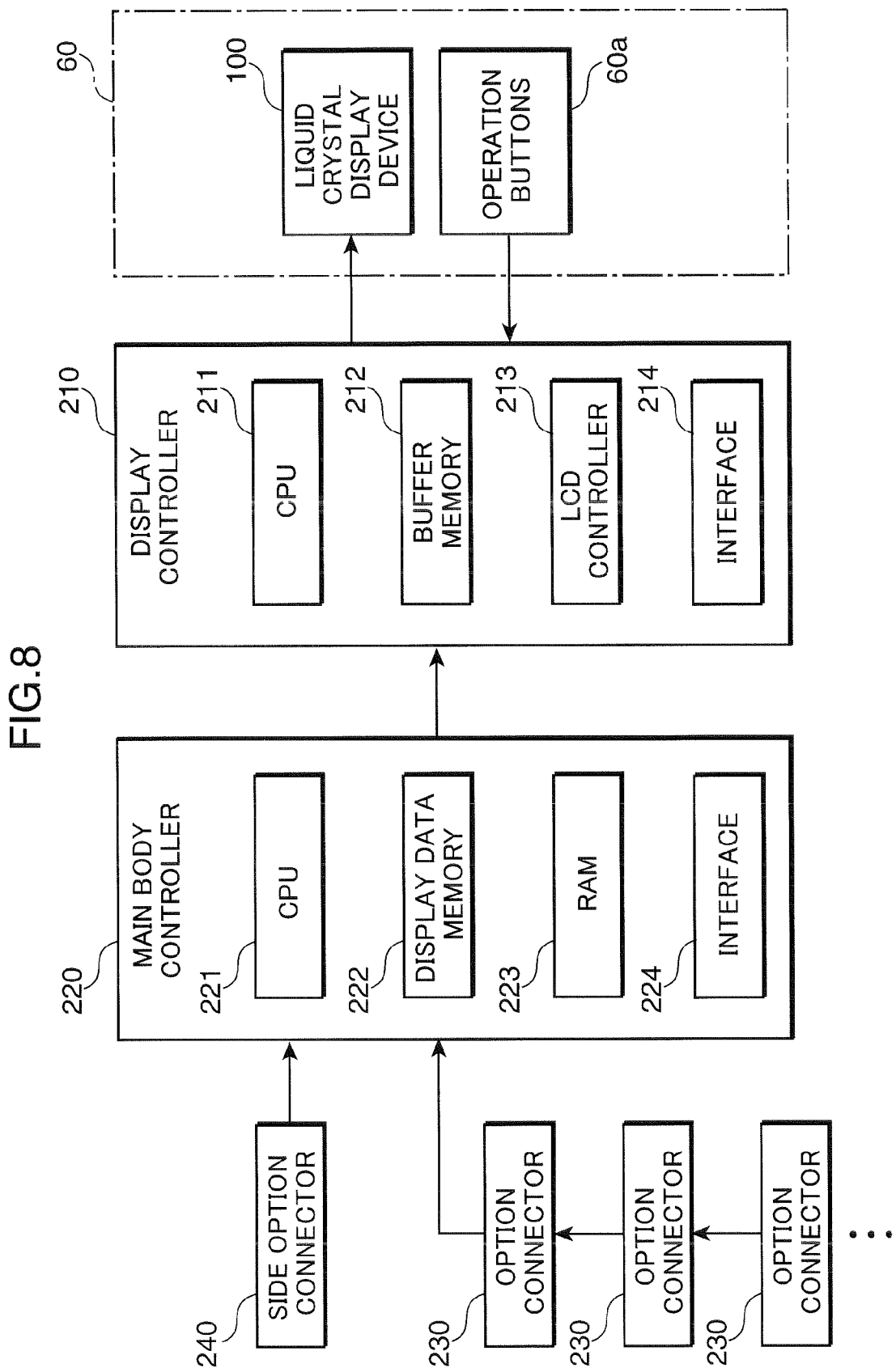
FIG. 8 is a block diagram showing a configuration of a display controller of a liquid crystal display device provided in an operation display portion shown in FIG. 7.

FIG. 8 is a block diagram showing a configuration of a display controller 210 of a liquid crystal display device 100 provided in the operation display device 60 shown in FIG. 7. A control of the liquid crystal display device 100 is performed, for example, by the display controller 210. The display controller 210 includes, for example, a CPU 211, a buffer memory 212, an LCD controller 213, and an interface 214.

The display controller 210 may be configured as a single circuit board provided in the main body 2 of the image forming apparatus 1b. On the circuit board, there are provided the above-described components. The above-described components are connected to each other through an unillustrated wiring pattern and a bus. The CPU 211 and the LCD controller 213 may be of a widely used type. It should be understood that the CPU 211 may be an ASIC in which an application is installed for exclusive use, or may be a package including the buffer memory 212. The buffer memory 212 includes, for example, a VRAM (Video RAM) having a storage capacity associated with a display ability (maximum resolution, maximum number of colors, and the like) of the liquid crystal display device 100. Operation signals outputted from operation buttons 60a are inputted through the interface 214.

Further, the image forming apparatus 1b has a main body controller 220 in addition to the display controller 210. The main body controller 220 is configured as a unit which is adapted to control an image forming operation performed in the main body 2. The main body controller 220 has a CPU 221, a display data memory 222, a RAM 223, and an interface 224. These components are provided on the same circuit board and are connected to each other through an unillustrated wiring pattern and a bus.

The CPU 221 stores a control program in, for example, a ROM provided therein, and executes the control program to control an image forming operation of the image forming apparatus 1b. The display data memory 222 includes a storage device such as a ROM, an EEPROM, and the like. In a memory area (memory block) of the display data memory 222, display data (bitmap data) as a material of an image to be displayed by the liquid crystal display device 100 is stored. Details of the display data will be described hereinafter.

The display data memory 222 stores as display data a configuration image simulating an overall configuration of the image forming apparatus i.e. a combination of the main body 2 and a maximum number of attachments. The liquid crystal display device 100 has a display area necessary for displaying the configuration image on the display screen, and the display area is divided into a plurality of divisional areas. In the present embodiment, the liquid crystal display device 100 is provided on the main body 2. However, the present invention is not especially limited to this. The liquid crystal display device 100 may be provided on the sheet-supplying section 50 or on the large capacity sheet supplying section 80.

The buffer memory 212 accumulates display data for allowing the liquid crystal display device 100 to display an image on the display screen. The CPU 221 transfers the display data stored in the display data memory 222 to the buffer memory 212 and allows the buffer memory 212 to store the display data. Further, the CPU 221 instructs the display controller 210 to display the configuration image on the display screen of the liquid crystal display device 100, and determines displaying and non-displaying on each of the divisional areas and outputs a control instruction signal of instructing displaying or non-displaying on each of the divisional areas.

The CPU 211 individually switches displaying and non-displaying on each of the plurality of divisional areas. The LCD controller 213 controls an operation of the liquid crystal display device 100 in accordance with display data accumulated in the buffer memory 212.

Each sheet-supplying section 50 has an option connector 230 of, for example, a drawer type. When the sheet-supplying section 50 is coupled to the main body 2, the option connector 230 is connected simultaneously. Further, when a plurality of sheet-supplying section 50 are coupled in layers, the option connectors 230 are connected to the main body 2 in cascade. Furthermore, the large capacity sheet supplying section 80 has a side option connector 240 of a cable type. When the large capacity sheet supplying section 80 is coupled to the main body 2, the side option connector 240 is connected through an insertion opening of the main body 2.

The option connectors 230 and the option connector 240 are grounded at the ground level which is in common with the main body controller 220. The main body controller 220 can detect the number of stages of the sheet-supplying sections 50 in accordance with connection signals (ON or OFF) of the option connector 230 and the option connector 240, or it can detect existence and non-existence of the large capacity sheet supplying section 80. When the sheet-supplying section 50 and large capacity sheet supplying section 80 have a plurality of kinds, the above-described connection signal further includes information (about 4 bits) for identifying the kind.

The main body controller 220 detects the number of connected sheet-supplying section 50 and existence and non-existence of the large capacity sheet supplying section 80, and then creates system configuration information of the image forming apparatus 1b. This system configuration information is adapted to identify an overall system configuration when the sheet-supplying section 50 is standardly or optionally coupled to the main body 2 of the image forming apparatus 1b, or when the large capacity sheet supplying section 80 is optionally coupled to the main body 2. Specifically, the system configuration information is adapted to identify if the system of the image forming apparatus 1b includes a configuration having only the main body 2, or a configuration in which one sheet-supplying section 50 is coupled to the main body 2, or a configuration having two sheet-supplying sections 50 coupled to the main body 2, or a configuration having three or more sheet-supplying sections 50 coupled to the main body 2, or a configuration further having the large capacity sheet supplying section 80.

The CPU 221 of the main body controller 220 reads out a connection signal of the option connector 230 and the option connector 240 and creates system configuration information when a power of the image forming apparatus 1b is turned on. Then, the CPU 221 allows, for example, the RAM 223 to store the created system configuration information. In a case where the option connector 230 and the option connector 240 are compatible to so-called a hot plug such as a USB (Universal Serial Bus) standard and an IEEE 1394 standard, the CPU 221 takes in connection signal of those by an external interruption and renews system configuration information of the RAM 223 each time.

In the present embodiment, the main body 2 corresponds to an example of a main body, and the sheet-supplying section 50 and the large capacity sheet supplying section 80 correspond to examples of an attachment, and the display data memory 222 corresponds to an example of a data storage portion, and the liquid crystal display device 100 corresponds to an example of an image display device, and the buffer memory 212 corresponds to an example of a data accumulating portion, and the CPU 221 corresponds to a data transferring portion, and the CPU 211 and the LCD controller 213 correspond to an example of a display controller, and the CPU 221 corresponds to an example of a control instructing portion, and the CPU 221, the option connector 230 and the side option connector 240 correspond to an example of a configuration detecting portion.

FIG. 9 shows a display screen 100b of the liquid crystal display device 100 in accordance with the second embodiment. In the present embodiment, a display area A indicated by one-dotted chain lines is defined on the display screen 100b. On the display area A, a bitmap image (configuration image) B0 is generally displayed. The bitmap image B0 of FIG. 9 simulates an overall system configuration in which the main body 2 and a maximum number (here, it is three) of the sheet-supplying sections 50 are coupled together, and the large capacity sheet supplying section 80 is further coupled (maximum optional configuration).

Further, the display area A is divided into a plurality of divisional areas R1 through R6 in the display screen 100b. The rectangular areas defined by one-dotted lines in FIG. 9 correspond respectively to the divisional areas R1 through R6. Among those, five divisional areas R1 through R5 are arranged vertically adjacent to each other on the left portion of the display screen 100b. In the example shown in FIG. 9, the five divisional areas R1 through R5 are arranged in a vertical direction. The remaining one divisional area R6 is vertically long and arranged on the right portion of the display screen 100b. In this example, the divisional area R6 is adjacent to all of the divisional areas R1 through R5. It should be understood that the contour of the display area A and the one-dotted lines defining the divisional areas R1 through R6 are not actually displayed on the display screen 100b.

Figure 10A:
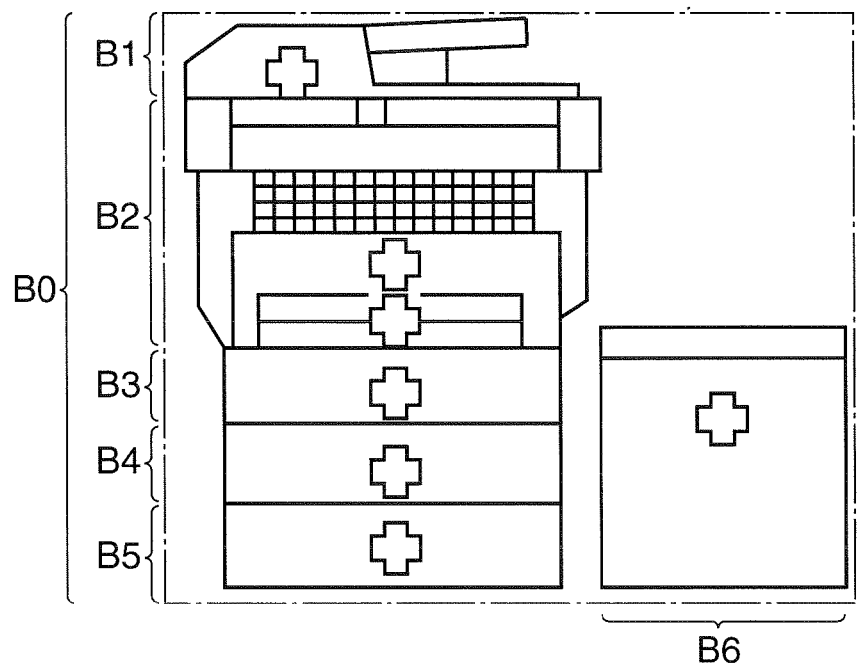
FIG. 10A generally shows a bitmap image in accordance with the second embodiment.
Figure 10B:
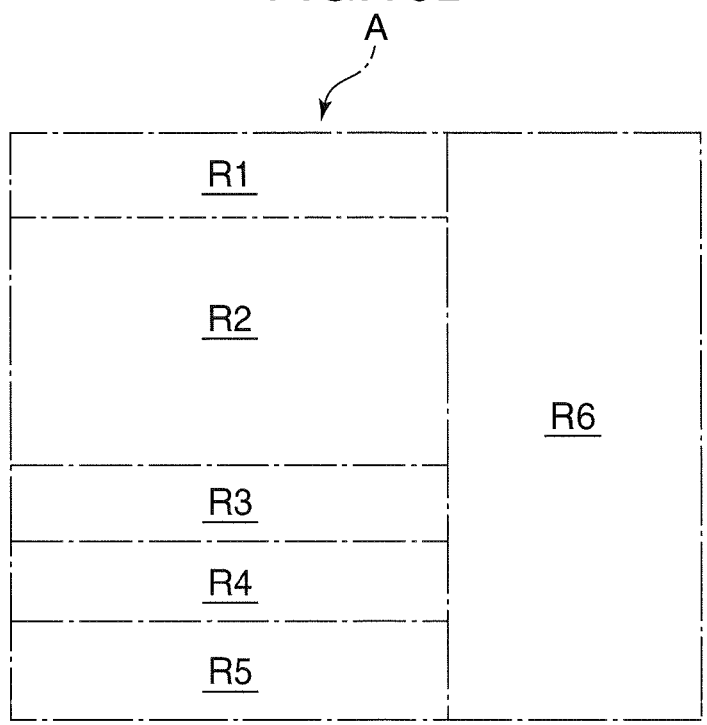
FIG. 10B generally shows divisional areas in accordance with the second embodiment.

FIG. 10 shows the bitmap image B0 and the divisional areas R1 through R6 in accordance with the second embodiment separately. FIG. 10A generally shows the bitmap image B0 in accordance with the second embodiment, and FIG. 10B generally shows the divisional areas R1 through R6 in accordance with the second embodiment.

In FIG. 10A, the bitmap image B0 is stored as one display data as a whole in the display data memory 222. The display data is constructed by monochromatic binary data or 4 bit data having 16 shades in a bitmap form.

The bitmap image B0 includes six individual images B1 through B6 corresponding respectively to the divisional areas R1 through R6. Among the individual images, the individual image B1 corresponds to a configuration image simulating a configuration of the document feeding device 8 shown in FIG. 7. Further, the individual image B2 corresponds to an image simulating a configuration of the main body 2. Similarly, the individual images B3, B4, B5 correspond to configuration images of the sheet-supplying sections 50 of respective stages. Further, the individual image B6 corresponds to an image simulating a configuration of the large capacity sheet supplying section 80. A combination of the six individual images B1 through B6 constitutes a single bitmap image B0 simulating an overall system configuration of the image forming apparatus 1b. It should be understood that the separation of the individual images B1 through B6 is made just for showing visible images of those, and the bitmap display data is not divided into six data units.

In FIG. 10B, the configurations of the display area A and the divisional areas R1 through R6 are as described above. As described above, the display area A corresponds the whole bitmap image B0. Further, the plurality of divisional areas R1 through R6 are defined correspondingly to the individual images B1 through B6 included in the bitmap image B0. The CPU 211 of the display controller 210 is capable of performing a control of switching displaying and non-displaying on each of the divisional areas R1 through R6. On a divisional area switched to non-displaying among the divisional areas R1 through R6, a corresponding individual image among the individual images B1 through B6 is not displayed on the display screen 100b. The switching of displaying and non-displaying by the CPU 211 will be further described in detail hereinafter.

Figure 11:
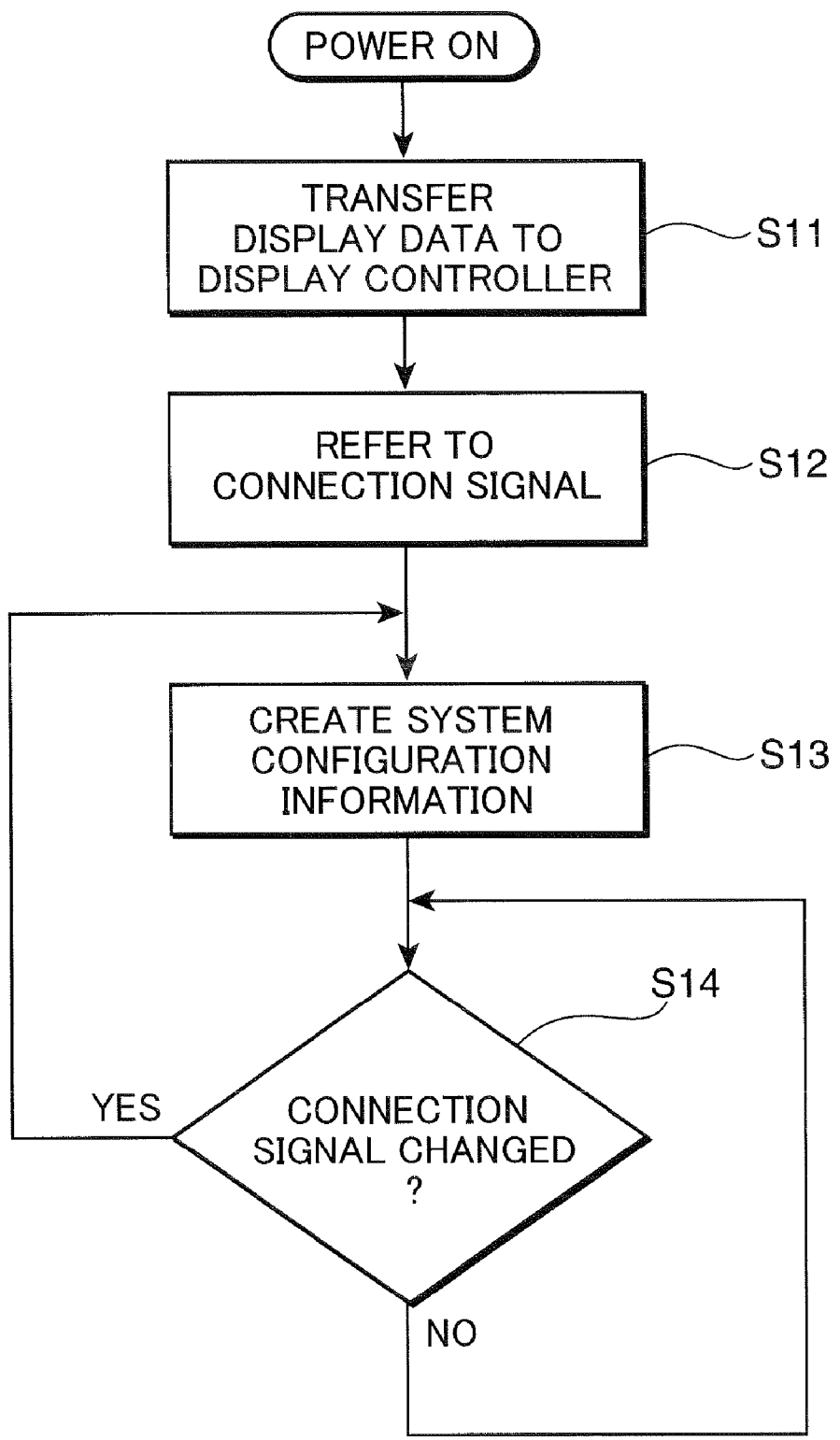
FIG. 11 is a flowchart illustrating a system configuration information renewal processing executed in a main body controller in accordance with the second embodiment.

Next, a system configuration information renewing processing which is executed in the main body controller 220 in accordance with the second embodiment will be described. FIG. 11 is a flowchart illustrating the system configuration information renewing processing executed in the main body controller 220 in accordance with the second embodiment.

When a power of the image forming apparatus 1b is turned on, the main body controller 220 and the display controller 210 performs their respective predetermined initialization processing. Then, when it falls into a state where the main body controller 220 and the display controller 210 are communicable with each other, the main body controller 220 executes the system configuration information renewing processing shown in FIG. 11. Hereinafter, the processing will be described by following the order of steps.

Firstly, in step S11, the CPU 221 of the main body controller 220 reads out display data from the display data memory 222 and transfers the same to the display controller 210. The display data transferred at this time is the whole bitmap image B0 shown in FIG. 10A. It should be understood that, though it is not shown in the flowchart of FIG. 11, the CPU 211 of the display controller 210 executes a processing of accumulating the transferred display data into the buffer memory 212.

Next, in step S12, the CPU 221 of the main body controller 220 refers to connection signals of the option connector 230 and the side option connector 240. Next, in step S13, the CPU 221 creates system configuration information in accordance with the connection signals.

Next, in step S14, the CPU 221 of the main body controller 220 refers to connection signals of the option connector 230 and the side option connector 240 by an external interruption to determine whether or not there is a change in the connection signals. In a case where there is no especial change in the connection signals (NO in step S14), the CPU 221 continues monitoring changes in the connection signals.

On the other hand, for example, when a change in connection signals occurs due to a change in the system configuration such as addition or removal of options in mid-course (YES in step S14), the CPU 221 allows the routine to go back to the processing of step S13 to newly create system configuration information. This renews the system configuration information stored in the RAM 223 to have the latest content.

Figure 12:
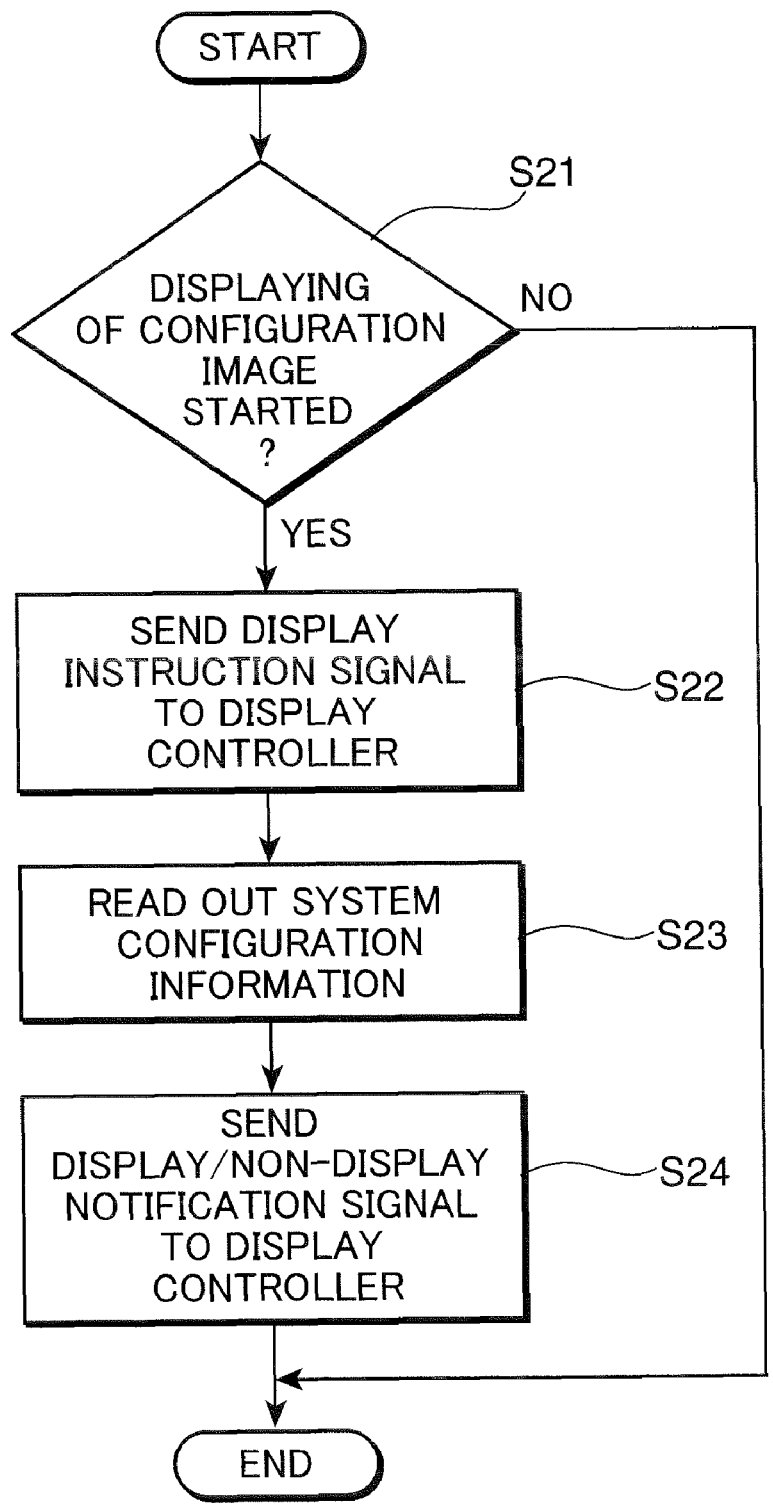
FIG. 12 is a flowchart illustrating a control instruction signal transmission processing of transmitting a control instruction signal from the main body controller to the display controller in accordance with the second embodiment.

Next, a control instruction signal transmitting processing of transmitting a control instruction signal from the main body controller 220 to the display controller 210 will be described. FIG. 12 is a flowchart illustrating the control instruction signal transmitting processing of transmitting a control instruction signal from the main body controller 220 to the display controller 210 in accordance with the second embodiment. The main body controller 220 executes the control instruction signal transmitting processing, for example, at a predetermined cycle during an operation of the image forming apparatus 1b.

Firstly, in step S21, the CPU 221 of the main body controller 220 determines whether or not the configuration image should be displayed on the display screen 100b of the liquid crystal display device 100. For example, when phenomenon such as a sheet jam (jamming), running out of a sheet, and a misdesignation of a sheet size occurs during an image forming, the image forming apparatus 1b displays an overall system configuration image on the display screen 100b to visually presenting to a user a portion at which the phenomenon such as a sheet jam occurs.

When phenomenon such as a sheet jam (jamming), running out of a sheet, and a misdesignation of a sheet size occurs during an image forming, the CPU 221 of the main body controller 220 determines that the configuration image should be displayed. When it is determined that the configuration image should be displayed on the display screen 100b (YES in step S21), the routine proceeds to step S22 and so on. On the other hand, when the phenomenon such as a sheet jam (jamming), running out of a sheet, and a misdesignation of a sheet size does not occur during the image forming, the CPU 221 of the main body controller 220 determines that the configuration image should not be displayed. When it is determined that the configuration image should not be displayed on the display screen 100b (NO in step S21), the CPU 221 of the main body controller 220 terminates the control instruction signal transmitting processing for the meantime.

Next, in step S22, the CPU 221 of the main body controller 220 transmits to the display controller 210 a display instruction signal of allowing the configuration image to be displayed. Next, in step S23, the CPU 221 reads out the system configuration information stored in the RAM 223.

Next, in step S24, the CPU 221 transmits to the display controller 210 a display/non-display notification signal presenting displaying and non-displaying on each of the divisional areas R1 through R6 in accordance with the system configuration information read out from the RAM 223.

Figure 13:
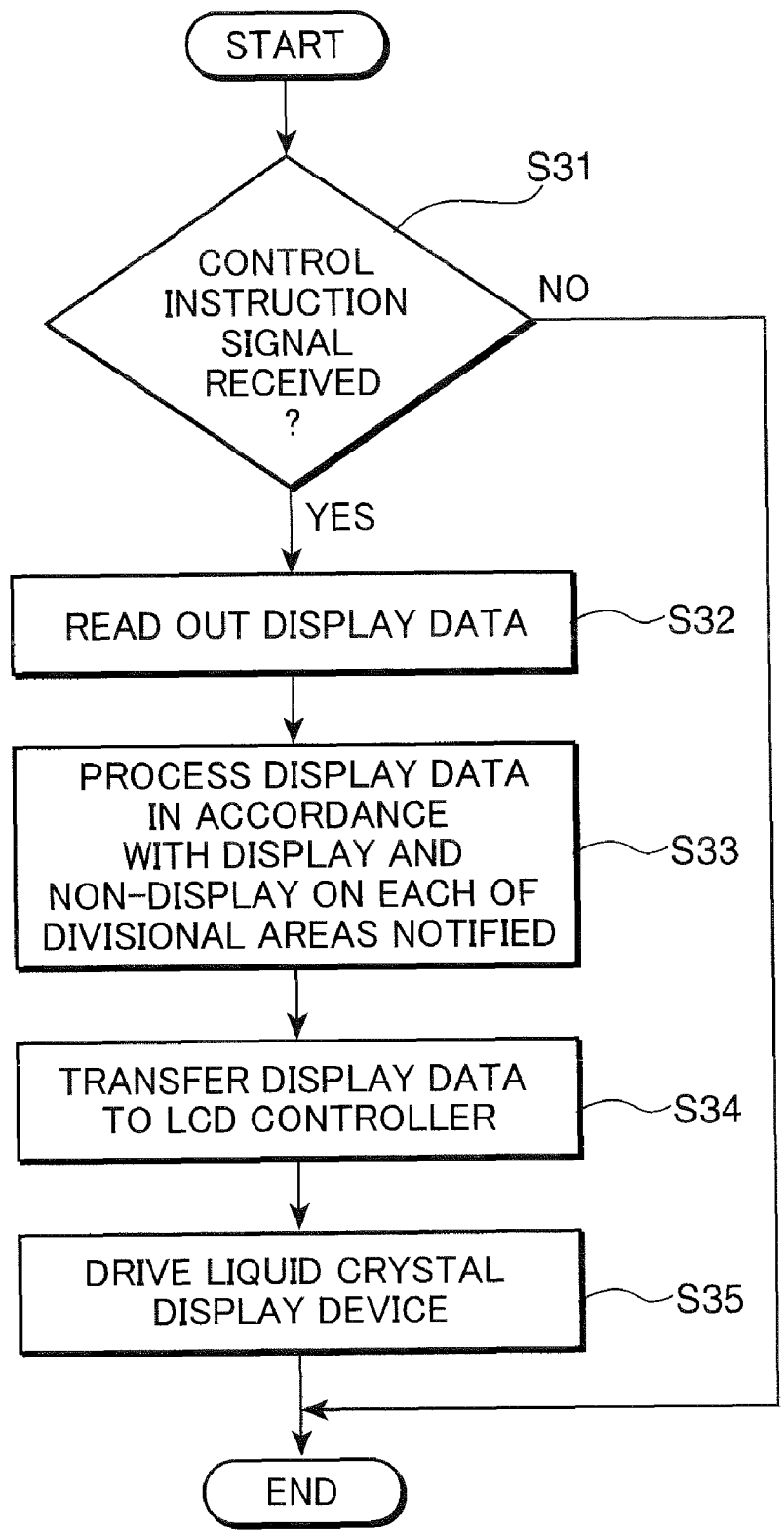
FIG. 13 is a flowchart illustrating a display control processing executed in the display controller in accordance with the second embodiment.

Next, the display control processing executed in the display controller 210 in accordance with the second embodiment will be described. FIG. 13 is a flowchart illustrating the display control processing executed in the display controller 210 in accordance with the second embodiment. During an operation of the image forming apparatus 1b, the CPU 211 of the display controller 210 executes the display control processing, for example, at a predetermined cycle.

Firstly, in step S31, the CPU 211 of the display controller 210 determines whether or not the control instruction signal transmitted from the main body controller 220 is received. The control instruction signal received at this time includes a display instruction signal of instructing the liquid crystal display device 100 to display the configuration image and a display/non-display notification signal of notifying displaying and non-displaying on each of the divisional areas R1 through R6.

When it is determined that the control instruction signal, in other words, the display instruction signal and the display/non-display notification signal transmitted by the main body controller 220 is received (YES in step S31), the CPU 211 of the display controller 210 allows the routine to proceed to step S32 and so on. On the other hand, when it is determined that the control instruction signal is not received (NO in step S31), the CPU 211 terminates the display control processing for the meantime. The CPU 211 of the display controller 210 allows the routine to proceed to step S32 when it receives both display instruction signal and the display/non-display notification signal, and terminates the display control processing when it only receives either one of the display instruction signal and the display/non-display notification signal.

Next, in step S32, the CPU 211 of the display controller 210 reads out display data accumulated in the buffer memory 212. The display data accumulated in the buffer memory 212 corresponds to the whole bitmap image B0.

Next, in step S33, the CPU 211 of the display controller 210 processes the read display data in accordance with displaying and non-displaying on each of the divisional areas R1 through R6 notified by the display/non-display notification signal. Specifically, among two-dimensional addresses of the display data, the CPU 211 performs a processing of rewriting an address area which is notified not necessary to be displayed among the address areas of the divisional areas R1 through R6 to "NULL" (blank data). The rewritten display data is newly accumulated (read-modify-write operation) into the buffer memory 212 or written into the internally-provided RAM of the CPU 211.

Next, in step S34, the CPU 211 transfers (copies) the processed display data from the buffer memory 212 or the internally provided RAM of the CPU 211 to the LCD controller 213. Next, in step S35, the LCD controller 213 of the display controller 210 drives the liquid crystal display device 100 in accordance with the transferred display data.

Figure 14:
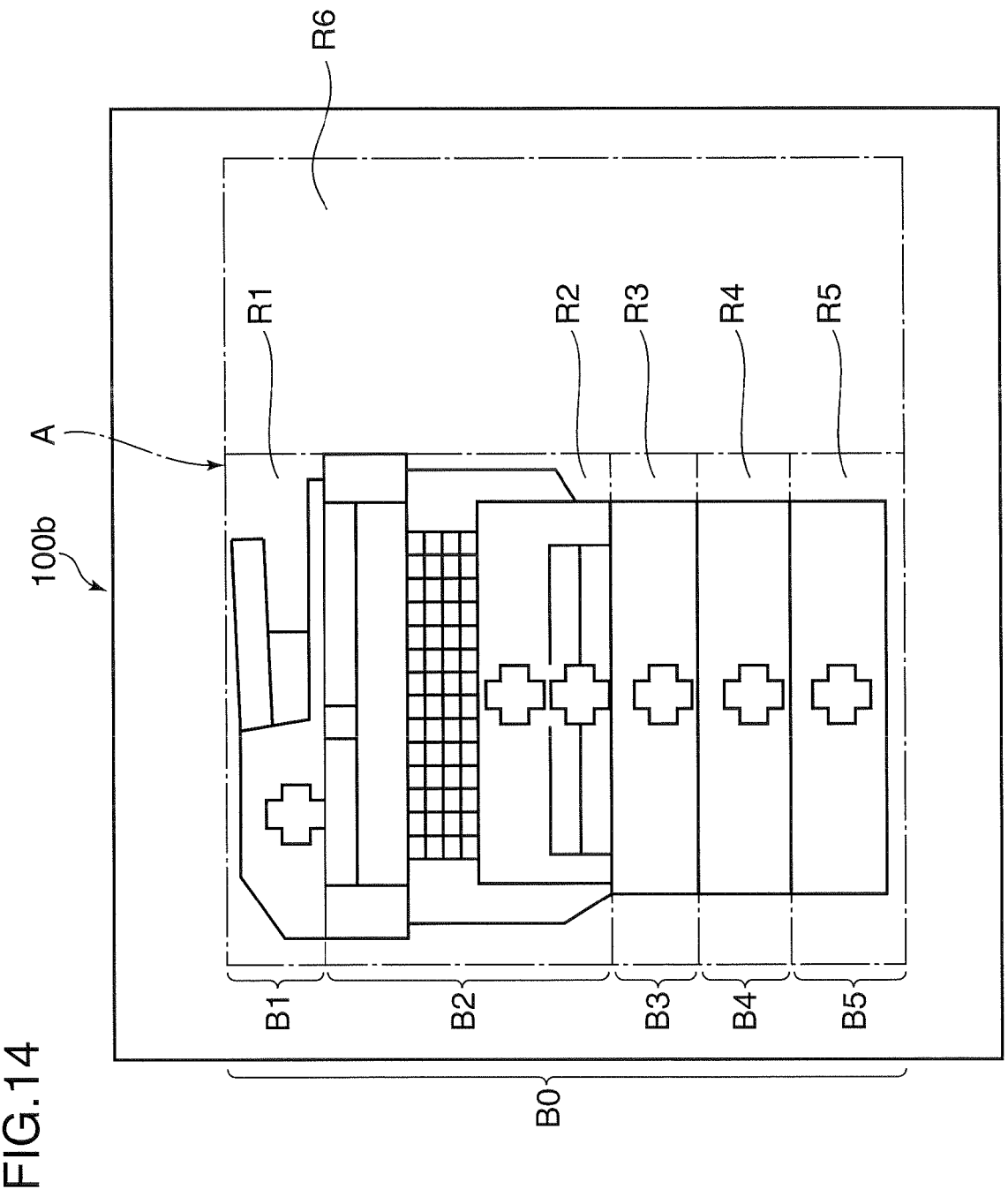
FIG. 14 shows a first example of a display operation of the liquid crystal display device, which is performed with execution of the display control processing shown in FIG. 13.

Here, a first example of a display operation in accordance with the second embodiment will be described. FIG. 14 shows the first example of the display operation of the liquid crystal display device 100, which is performed with execution of the display control processing shown in FIG. 13. The first example of the display operation is associated with a system configuration in which two sheet-supplying sections 50 are optionally coupled in addition to a standard configuration of the image forming apparatus 1b (the document feeding device 8, the main body 2 and one sheet-supplying section 50). In this case, being different from the example of configuration shown in FIG. 7, the image forming apparatus 1b is not provided with the large capacity sheet supplying section 80.

According to the above-described system configuration, in step S24 of the control instruction signal transmitting processing shown in FIG. 12, the CPU 221 of the main body controller 220 notifies to the display controller 210 in a form of the display/non-display notification signal that it would be necessary to display on the divisional areas R1 through R5 but not necessary on the remaining divisional area R6.

Therefore, in step 33 of the display control processing shown in FIG. 13, the CPU 211 of the display controller 210 rewrites the address area corresponding to the divisional area R6 in the display data into "NULL" (blank data). As a result, the individual images B1 through B5 of the bitmap image B0 are displayed respectively on the divisional areas R1 through R5 of the display screen 100b, but the display content on the divisional area R6 is made blank. Therefore, the bitmap image B0 is displayed while being partially masked as a whole. The bitmap image B0 partially masked in such a manner becomes a configuration image truly simulating an actual overall system configuration (document feeding device 8, main body 2 and three sheet-supplying sections 50).

Figure 15:
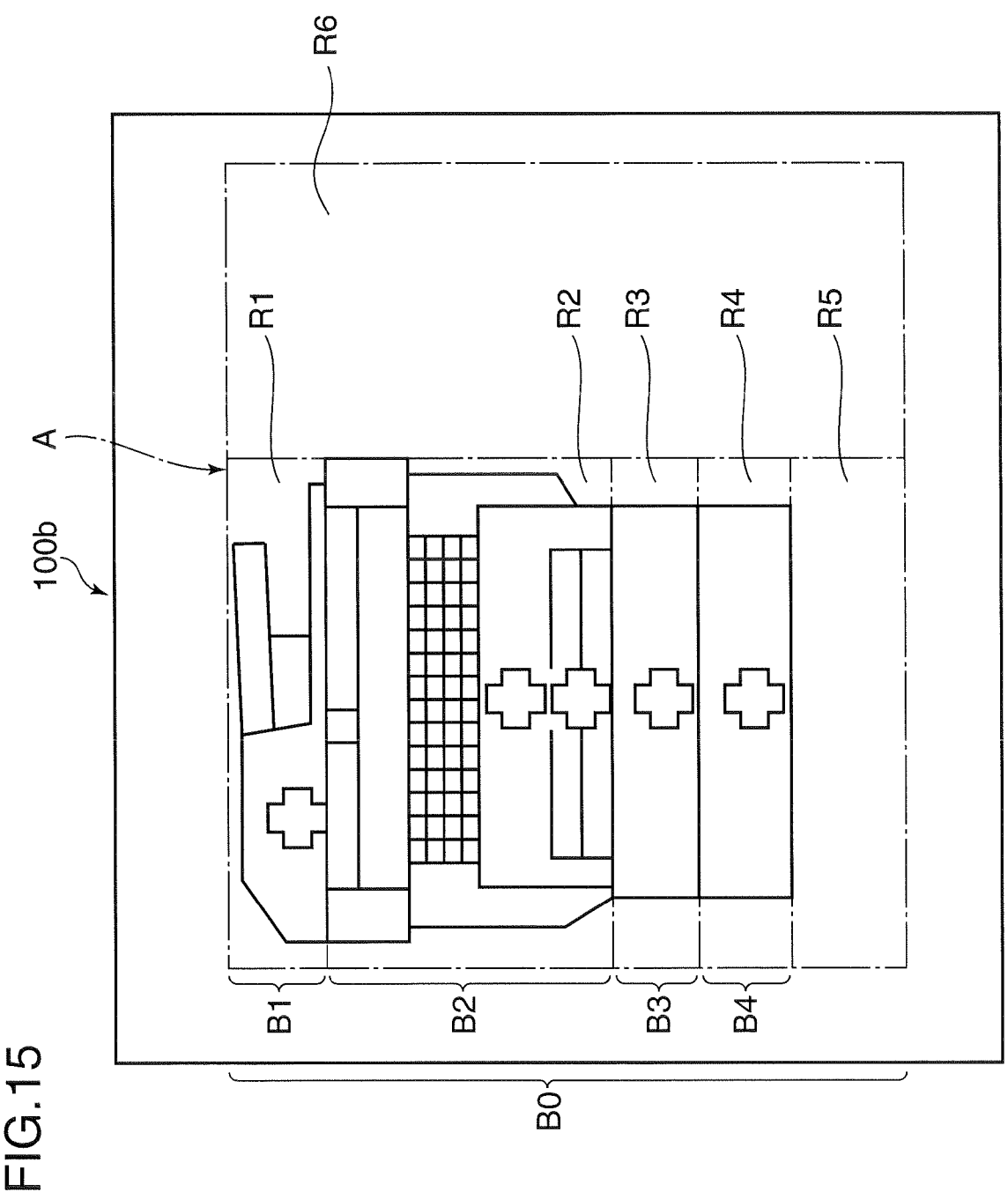
FIG. 15 shows a second example of a display operation of the liquid crystal display device, which is performed with execution of the display control processing shown in FIG. 13.

A second example of a display operation in accordance with the second embodiment will be described. FIG. 15 shows the second example of a display operation of the liquid crystal display device 100, which is performed with the execution of the display control processing shown in FIG. 13. The second example of the display operation is associated with a system configuration in which only one sheet-supplying section 50 is optionally coupled in addition to the standard configuration of the image forming apparatus 1b (document feeding device 8, main body 2 and one sheet-supplying section 50). In this case, being different from the example of the configuration shown in FIG. 7, the image forming apparatus 1b is provided with neither the third sheet-supplying section 50 nor the large capacity sheet supplying section 80.

According to the system configuration of this case, in step S24 of the control instruction signal transmitting processing shown in FIG. 12, the CPU 221 of the main body controller 220 notifies to the display controller 210 in a form of the display/non-display notification signal that it would be necessary to display on the divisional areas R1 through R4 but on the remaining divisional areas R5 and R6.

Therefore, in step 33 of the display control processing shown in FIG. 13, the CPU 211 of the display controller 210 rewrites each of the address area corresponding to the divisional areas R5, R6 in the display data into "NULL" (blank data). As a result, the individual images B1 through B4 of the bitmap image B0 are displayed respectively on the divisional areas R1 through R4 of the display screen 100b, but the display content on each of the divisional areas R5, R6 is made blank. Therefore, the bitmap image B0 is displayed while being partially masked as a whole. The bitmap image B0 partially masked in such a manner becomes a configuration image truly simulating an actual overall system configuration (document feeding device 8, main body 2 and two sheet-supplying section 50).

Next, another example of a display operation in accordance with the second embodiment will be described. Though it is not especially illustrated, the main body controller 220 executes the system configuration information renewing processing shown in FIG. 11 and renews the latest system configuration information constantly to realize a display operation in conformity with an actual system configuration of the image forming apparatus 1b as described herebelow.

(1) For example, when the system configuration of the image forming apparatus 1b is changed to the standard configuration having the document feeding device 8, the main body 2 and only one sheet-supplying section 50, the address areas in the display data corresponding respectively to the divisional areas R4, R5, R6 are rewritten into "NULL" (blank data) in step 33 of the display control processing shown in FIG. 13. As a result, the individual images B4, B5, B6 are not displayed on the display screen 100b, but a configuration image in a combination of the individual images B1, B2, B3 is displayed.

(2) Alternatively, when the system configuration is changed to the one in which the document feeding device 8 is not optionally provided and two sheet-supplying sections 50 are coupled to the main body 2, the areas corresponding to the divisional areas R1, R5, R6 in display data are respectively rewritten into "NULL" (blank data) in step S33 of the display control processing shown in FIG. 13. As a result, the individual images B1, B5, B6 are not displayed on the display screen 100b, and a configuration image in a combination of the individual images B2, B3, B4 is displayed.

(3) When the system configuration is changed to the one in which the document feeding device 8 is not optionally provided, and only one sheet-supplying section 50 is coupled to the main body 2, the areas corresponding to the divisional areas R1, R4, R5, R6 in the display data are respectively rewritten into "NULL" (blank data) in step S33 of the display control processing shown in FIG. 13. As a result, the individual image B1, B4, B5, R6 are not displayed on the display screen 100b, and a configuration image in a combination of only the individual images B2, B3 is displayed.

As described above, in the present embodiment, the main body controller 220 transfers display data of the whole bitmap image B0 to the display controller 210 and thereafter notifies displaying and non-displaying on each of the divisional areas R1 through R6 in conformity with an actual system configuration. Therefore, if the transfer of display data is performed once at first, it would not be necessary to transfer display data every time even when the system configuration is changed later on. Accordingly, the load required for data transfer and data processing is reduced, so that a time required for the data transfer and the data processing can be shortened.

Further, even if the system configuration is changed, it would be enough to use only one kind of display data. Accordingly, it would not be necessary to transfer a plurality of display data in conformity with the system configuration, and also it would not be necessary to arrange these on the memory space to reconstruct the data for transfer. Thus, a load required for data processing can be reduced in both the main body controller 220 and the display controller 210, so that data can be transferred efficiently.

Further, even when the configuration pattern of the image forming apparatus changes in a plurality of ways, it would not be necessary to store duplicate display data for each configuration pattern, so that the amount of data to be stored can be minimized.

The present invention is not limited to the embodiment described above, and it may be modified in various ways for practice. As an example of the system configuration in accordance with the present embodiment, the main body 2 and the standard sheet-supplying section 50 are separated. However, the sheet-supplying section 50 may be uniformly provided in the main body 2.

Furthermore, the display area A, the divisional areas R1 through R6, the bitmap image B0, and the like shown in the present embodiment are preferred examples, and these may be desirably modified for practice.

Further, the document feeding device 8 and the sheet-supplying section 50 are described as optional attachments in the present embodiment. However, a finisher (post-processing device) as another example of the attachment may be coupled to the main body 2.

Furthermore, the liquid crystal display device 100 is provided on the main body 2 in the present embodiment. However, the liquid crystal display device 100 may be provided on the attachment such as the document feeding device 8 and the finisher.

Third Embodiment

Figure 16:
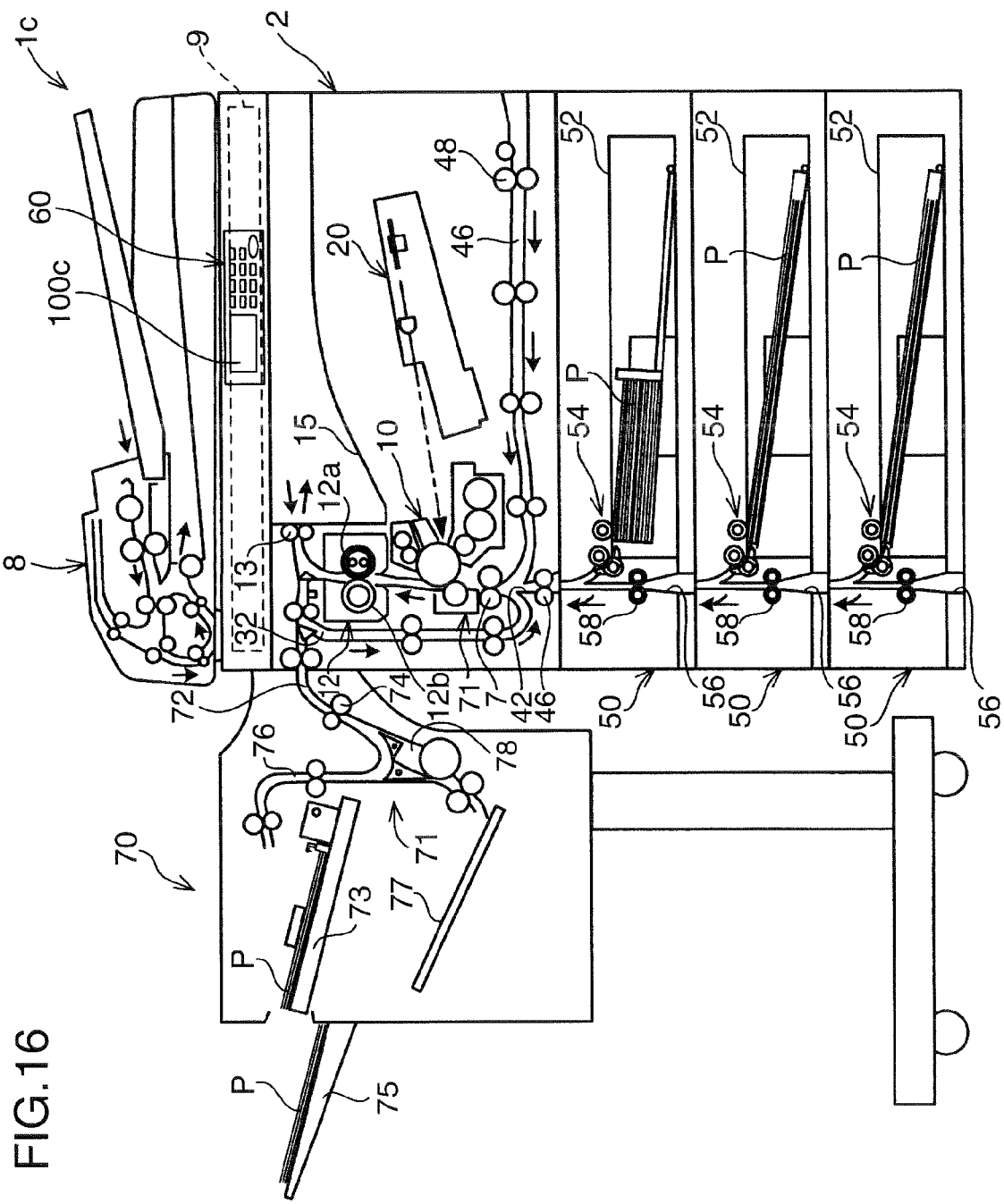
FIG. 16 is a front vertical sectional view schematically showing an overall configuration of an image forming apparatus in accordance with a third embodiment.

Next, a third embodiment of the present invention will be described with reference to the drawings. FIG. 16 is a front vertical sectional view schematically showing an overall configuration of an image forming apparatus 1c in accordance with the third embodiment. A front side of FIG. 16 corresponds to a front side of an image forming apparatus 1c facing a user. Further, a right hand side of FIG. 16 corresponds to a right side of the image forming apparatus 1c, and a left hand side corresponds to a left side of the image forming apparatus 1c. Solid line arrows of FIG. 16 show conveying paths and conveying directions of sheets in the image forming apparatus 1c. It should be understood that components which are the same as those in the first embodiment and the second embodiment are identified with the same reference numerals.

The image forming apparatus 1c includes, for example, a copying machine, a complex machine, and a multifunction peripheral (MFP) for network use. The image forming apparatus 1c has a box-shaped main body 2 of so-called an in-body sheet discharging type. Therefore, the main body 2 is provided therein with an in-body sheet-discharging tray 15. The sheet-discharging tray 15 is adapted to discharge a sheet printed in the image forming apparatus 1c from the left side to the right side of the main body 2. A user can take out from the front side or the right side of the main body 2 the sheet discharged to the sheet-discharging tray 15. It should be understood that the image forming apparatus 1c may be provided with a sheet-discharging tray which is not of an in-body sheet-discharging type.

On the top of the main body 2, a document feeding device 8 is provided. When the image forming apparatus 1c is used as a copying machine, a facsimile machine, and a network scanner, the document feeding device 8 can read a document set thereon. In an upper portion of the main body 2, there is provided an optical image reading device 9. The image reading device 9 has an unillustrated contact glass and reads out an image side of a document placed on an upper surface of the contact glass or a document conveyed by the document feeding device 8.

Further, the document feeding device 8 is coupled to the main body 2 through an unillustrated hinge structure. The hinge structure is positioned at a rear end portion of the main body 2, and the document feeding device 8 is operated to move up pivotally about the hinge structure to open the upper surface of the image reading device 9.

In the image forming apparatus 1c according to the present embodiment, a sheet-supplying section (attachment) 50 can be coupled standardly or optionally to the lower side of the main body 2 for use. Further, in the present embodiment, a finisher (attachment) 70 can be optionally coupled to a side (left side in the example of FIG. 16) of the main body 2 for use. For example, provided that a configuration in which the document feeding device 8 and one sheet-supplying section 50 are coupled to the main body 2 is a standard configuration of the image forming apparatus 1c, the example shown in FIG. 16 is an optional configuration in which two sheet-supplying sections 50 are coupled successively in layers in addition to the standard configuration, and the finisher 70 is further coupled on the left side.

Each standard or optional sheet-supplying section 50 has a sheet-supplying cassette 52, a sheet-supplying unit 54, a sheet passage 56, and a conveying roller 58. The sheet-supplying cassette 52 stores a stack of sheets P. The sheet-supplying unit 54 sends out an uppermost sheet P one after another in an upper left direction. The sheet P sent out by the sheet-supplying unit 54 is conveyed vertically upward through the sheet passage 56. The sheet P conveyed upward is taken by the conveying roller 46 of the main body 2 and sent to a sheet conveying passage 42.

Further, the respective sheet passages 56 of the vertically arranged sheet-supplying section 50 are connected to each other at their respective upper end and lower end. Therefore, a sheet P sent out from a sheet-supplying section 50 which is positioned at a second stage from the uppermost or at a stage lower than the second stage among three stages of sheet-supplying sections 50 is taken by the conveying rollers 58 in the sheet passages 56 of upper stages and conveyed vertically upward. The sheet P sent out from the sheet-supplying section 50 passes through the sheet conveying passage 42 and is taken by the registration roller 7.

In the image forming apparatus 1c, an image forming is performed in such a manner as described herebelow. In the main body 2, there are provided a print engine 10 and a transferring section 11 at positions downstream of the sheet conveying passage 42 in a sheet-conveying direction. The print engine 10 forms an electrostatic latent image in accordance with image data of a read image to which a predetermined image processing is applied, or image data transmitted from an external equipment, and forms (develops) a toner image with the electrostatic latent image.

In the main body 2, there is provided a laser scanning unit 20 being adjacent on the right side of the print engine 10 to form an electrostatic latent image on the print engine 10. As indicated by one-dotted chain line arrow in FIG. 16, the laser scanning unit 20 irradiates a scanning beam to a surface of a photoconductive drum provided in the print engine 10.

The registration roller 7 adjusts an oblique transfer of a sheet P and sends out the sheet P to the transferring section 11 in synchronization with a toner image formed in the print engine 10. The transferring section 11 transfers a toner image to a sheet P which is conveyed by the registration roller 7 while being synchronized.

The fixing device 12 is provided on downstream of the transferring section 11 in the sheet conveying direction. The sheet P onto which an unfixed toner image is transferred in the transferring section 11 is sent to the fixing device 12. The fixing device 12 has a heating roller 12a and a pressing roller 12b. The toner image is heated and pressed when the sheet P passes through a nip portion between the heating roller 12a and the pressing roller 12b, so that the toner image is fixed on the sheet P.

When a both side printing is not performed, in other words, when a one side printing is performed, the sheet P discharged from the fixing device 12 is discharged to the sheet-discharging tray 15 by a sheet-discharging roller 13. When the both side printing is performed, the sheet P is temporarily conveyed toward the sheet-discharging tray 15 until a certain point by the sheet-discharging roller 13, and a conveying direction is switched so that the sheet P is taken into a sheet-reversing passage 32. After being taken into the sheet-reversing passage 32, the sheet P is conveyed downward in the sheet-reversing passage 32 along the left side of the main body 2, and thereafter reversed upward at an upper position of the sheet-supplying section 50 and sent to the registration roller 7.

The optional finisher 70 has, for example, a function of performing a stapling (staple-binding) of sheets P. A sheet P printed on one side or both sides thereof in the image forming apparatus 1c is not discharged to the sheet-discharging tray 15 but conveyed to the finisher 70 when the sheet P is punched out or the sheet P is stapled to be binded.

There is formed a carrying-in passage 72 in the finisher 70, and a sheet P carried in through the carrying-in passage 72 is taken by a carrying-in roller 74. The carrying-in passage 72 branches off on downstream of the carrying-in roller 74, and includes a carrying-out passage 76 on one side and a reversing passage 78 on the other side. The carrying-out passage 76 curves upward as if it draws a horizontally inversed character "J" on one side. The reversing passage 78 obliquely extends in a lower left direction. At a position where the carrying-in passage 72 branches off, there is provided a switching mechanism 71. The switching mechanism 71 switches a conveying direction of the sheet P in the finisher 70. On the downstream of the reversing passage 78, there is provided a reversing tray 77. The sheet P carried into the reversing passage 78 is pulled up toward the carrying-out passage 76 after its leading end portion is sent onto the reversing tray 77.

The finisher 70 shown in FIG. 16 has a function of stacking and binding the discharged sheets P. Specifically, when an intermediate tray 73 is provided on downstream of the carrying-out passage 76, and a user requests a staple setting, the sheets P are stacked on the intermediate tray 73 and binded. Then, a stack of binded sheets P is discharged from the intermediate tray 73 to an external tray 75.

The finisher 70 has a face-up sheet discharging mode and a face-down sheet discharging mode as modes for discharging the sheet P. In the face-up sheet discharging mode, the sheet P which is carried in is discharged to the intermediate tray 73 or the external tray 75 while holding its normal state. In the face-down sheet discharging mode, the sheet P is reversed front and back and discharged to the intermediate tray 73 or the external tray 75. In the face-up sheet discharging mode, the sheet P is conveyed directly from the carrying-in passage 72 to the carrying-out passage 76. On the other hand, in the face-down sheet discharging mode, the sheet P is conveyed from the carrying-in passage 72 to the reversing passage 78, and then to the carrying-out passage 76 via the reversing tray 77.

On an exterior cover of the image forming apparatus 1c, there is provided an operation display device 60. The operation display device 60 includes various operation buttons and a liquid crystal display device. The operation buttons receive a user's input operation. Further, the liquid crystal display device displays on its display screen various textual information for a user (such as a status and operation menus) and a configuration image simulating configurations of the image forming apparatus 1c and its attachments (such as the sheet-supplying section 50 and the finisher 70). Such configuration image is used for visually presenting to a user a position where a sheet jam occurs during an operation of the image forming apparatus 1c and a state of sheets running out in the sheet-supplying section 50. Hereinafter, a display control of a configuration image in accordance with the present embodiment will be described in detail.

Figure 17:
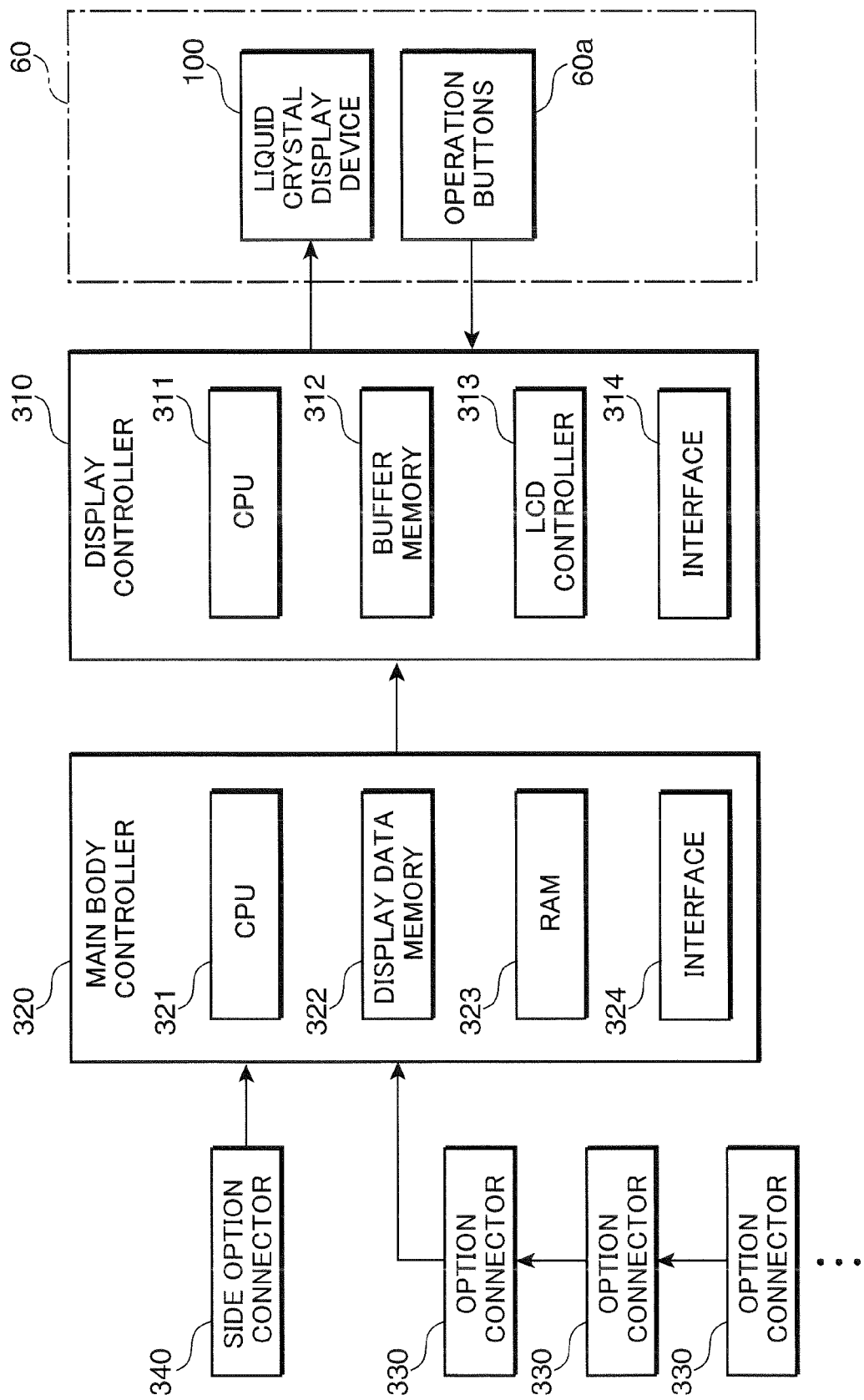
FIG. 17 is a block diagram showing a configuration of a display controller of a liquid display device provided in the operation display portion shown in FIG. 16.

FIG. 17 is a block diagram showing a configuration of a display controller 310 of a liquid crystal display device 100 provided in the operation display device 60 shown in FIG. 16. A control of the liquid crystal display device 100 is performed, for example, in the display controller 310. The display controller 310 includes, for example, a CPU 311, a buffer memory 312, an LCD controller 313, and an interface 314.

The display controller 310 may be configured as a single circuit board provided in the main body 2 of the image forming apparatus 1c. On the circuit board, there are provided the above-described components. The above-described components are connected to each other through an unillustrated wiring pattern and a bus. The CPU 311 and the LCD controller 313 may be of a widely used type. It should be understood that the CPU 311 may be an ASIC in which an application is installed for exclusive use, or may be a package including the buffer memory 312. The buffer memory 312 includes, for example, a VRAM having a storage capacity associated with a display ability (maximum resolution, maximum number of colors, and the like) of the liquid crystal display device 100. Operations signals outputted from operation buttons 60a are inputted through the interface 314.

Further, the image forming apparatus 1c has a main body controller 320 in addition to the display controller 310. The main body controller 320 is configured as a unit which is adapted to control an image forming operation performed in the main body 2. The main body controller 320 has a CPU 321, a display data memory 322, a RAM 323, and an interface 324. These components are provided on the same circuit board and are connected to each other through an unillustrated wiring pattern and a bus.

The CPU 321 stores a control program in, for example, a ROM provided therein, and executes the control program to control an image forming operation of the image forming apparatus 1c. The display data memory 322 includes a storage device such as a ROM, an EEPROM, and the like. In a memory area (memory block) of the display data memory 322, a plurality of display data (bitmap data) as material of images to be displayed by the liquid crystal display device 100 are stored. Details of the display data will be described hereinafter.

The display data memory 322 defines in advance a plurality of configuration patterns of the main body 2, the sheet-supplying section 50, and the finisher 70, and stores as a plurality of a display data configuration images simulating overall configurations of combinations of the main body 2, the sheet supplying section 50, and the finisher 70 arranged in a plurality of configuration patterns.

The liquid crystal display device 100 includes a display screen having a display area on which the configuration image is displayed, and the display area is divided into a plurality of divisional areas. In the present embodiment, the liquid crystal display device 100 is provided on the main body 2. However, the present invention is not especially limited to this. The liquid crystal display device 100 may be provided on the sheet-supplying section 50 or the finisher 70.

The buffer memory 312 accumulates display data for allowing the liquid crystal display device 100 to display an image on the display screen. The CPU 321 determines a display content displayed on each of the plurality of divisional areas. Further, the CPU 321 selects display data including a display content to be displayed on each of divisional areas from among a plurality of display data stored in the display data memory 322 in accordance with a determination result, and transfers the display data of each of the divisional areas to the buffer memory 312, and allows the buffer memory 312 to store the display data.

The CPU 311 allows the configuration image to be displayed on the display screen in accordance with the display data accumulated in the buffer memory 312. Specifically, the CPU 311 selects display data for each of the divisional areas from among a plurality of display data stored in the buffer memory 312, and extracts an individual image of the display data corresponding to each of the divisional areas, and synthesizes the individual images to allow the configuration image of the image forming apparatus to be displayed on the display screen.

Each sheet-supplying section 50 has an option connector 330 of, for example, a drawer type. When the sheet-supplying section 50 is coupled to the main body 2, the option connector 330 is connected simultaneously. Further, when a plurality of sheet-supplying section 50 are coupled in layers, the option connectors 330 are connected to the main body 2 in cascade. Furthermore, the finisher 70 has a side option connector 340 of a cable type. When the finisher 70 is coupled to the main body 2, the side option connector 340 is connected through an insertion opening of the main body 2. It should be understood that the side option connector 340 provided in the finisher 70 may be of a drawer type.

The option connectors 330 and the option connector 340 are grounded at the ground level which is in common with the main body controller 320. The main body controller 320 can detect the number of stages of the sheet-supplying sections 50 in accordance with connection signals (ON or OFF) of the option connector 330 and the option connector 340, or it can detect existence and non-existence of the finisher 70. When the sheet-supplying section 50 and the finisher 70 have a plurality of kinds, the above-described connection signal further includes information (about 4 bits) for identifying the kind.

The main body controller 320 detects the number of connected sheet-supplying section 50 and existence and non-existence of the finisher 70, and then creates system configuration information of the image forming apparatus 1c. This system configuration information is adapted to identify an overall system configuration when the sheet-supplying section 50 is standardly or optionally coupled to the main body 2 of the image forming apparatus 1c, or when the finisher 70 is optionally coupled to the main body 2. Specifically, the system configuration information is adapted to identify if the system of the image forming apparatus 1c includes a configuration having only the main body 2, or a configuration in which one sheet-supplying section 50 is coupled to the main body 2, or a configuration having two sheet-supplying sections 50 coupled to the main body 2, or a configuration having three or more sheet-supplying sections 50 coupled to the main body 2, or a configuration further having the finisher 70.

The CPU 321 of the main body controller 320 reads out connection signals of the option connector 330 and the option connector 340 and creates system configuration information when a power of the image forming apparatus 1c is turned on. Then, the CPU 321 allows, for example, the RAM 323 to store the created system configuration information. In a case where the option connector 330 and the option connector 340 are compatible to so-called a hot plug such as a USB standard and an IEEE 1394 standard, the CPU 321 takes in connection signal of those by an external interruption and renews system configuration information of the RAM 323 each time.

In the present embodiment, the main body 2 corresponds to an example of a main body, and the sheet-supplying section 50 and the finisher 70 corresponds to examples of an attachment, and the display data memory 322 corresponds to an example of a data storage portion, the liquid crystal display device 100 corresponds to an example of an image display device, and the buffer memory 312 corresponds to an example of a data accumulating portion, and the CPU 321 corresponds to an example of a display content determining portion and a data transferring portion, and the CPU 311 and the LCD controller 313 correspond to an example of a display controller, and the CPU 321, the option connector 330, and the side option connector 340 correspond to an example of a configuration detecting portion.

Figure 18:
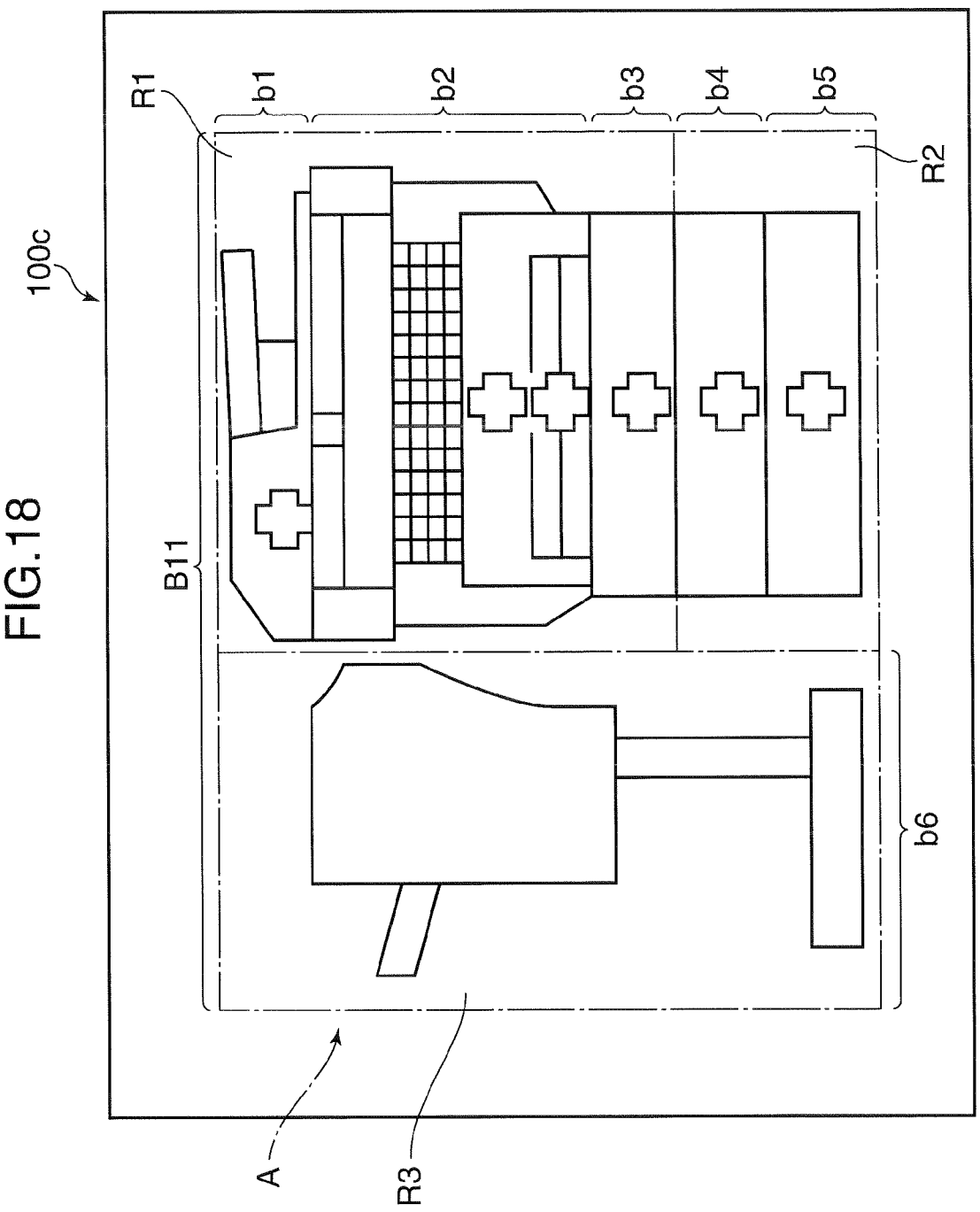
FIG. 18 shows a display screen of the liquid crystal display device in accordance with the third embodiment.

FIG. 18 schematically shows an example of a display screen 100c of the liquid crystal display device 100 in accordance with the third embodiment. In the present embodiment, a display area A indicated by one-dotted chain lines is defined on display screen 100c. On the display area A, a bitmap image (configuration image) B11 simulating an overall configuration of the image forming apparatus 1c including the main body 2 and its attachment (such as the sheet-supplying section 50 and the finisher 70) is displayed. The bitmap image B11 shown in FIG. 18 simulates an overall system configuration in which the document feeding device 8 and a maximum number (here, it is three) of the sheet-supplying sections 50 are coupled to the main body 2, and the finisher 70 is further coupled.

Further, the display area A is divided into a plurality of divisional areas R1 through R3 in the display screen 100c. The rectangular areas defined by one-dotted lines in FIG. 18 correspond respectively to the divisional areas R1 through R3. Among those, two divisional areas R1, R2 are arranged vertically adjacent to each other on the right portion of the display screen 100c. The remaining one divisional area R3 is vertically long and arranged on the left portion of the display screen 100c. In the example of FIG. 18, the divisional area R3 is adjacent to both of the divisional areas R1, R2. It should be understood that the contour of the display area A and the one-dotted lines defining the divisional areas R1, R2, R3 are not actually displayed on the display screen 100c.

Figure 19:
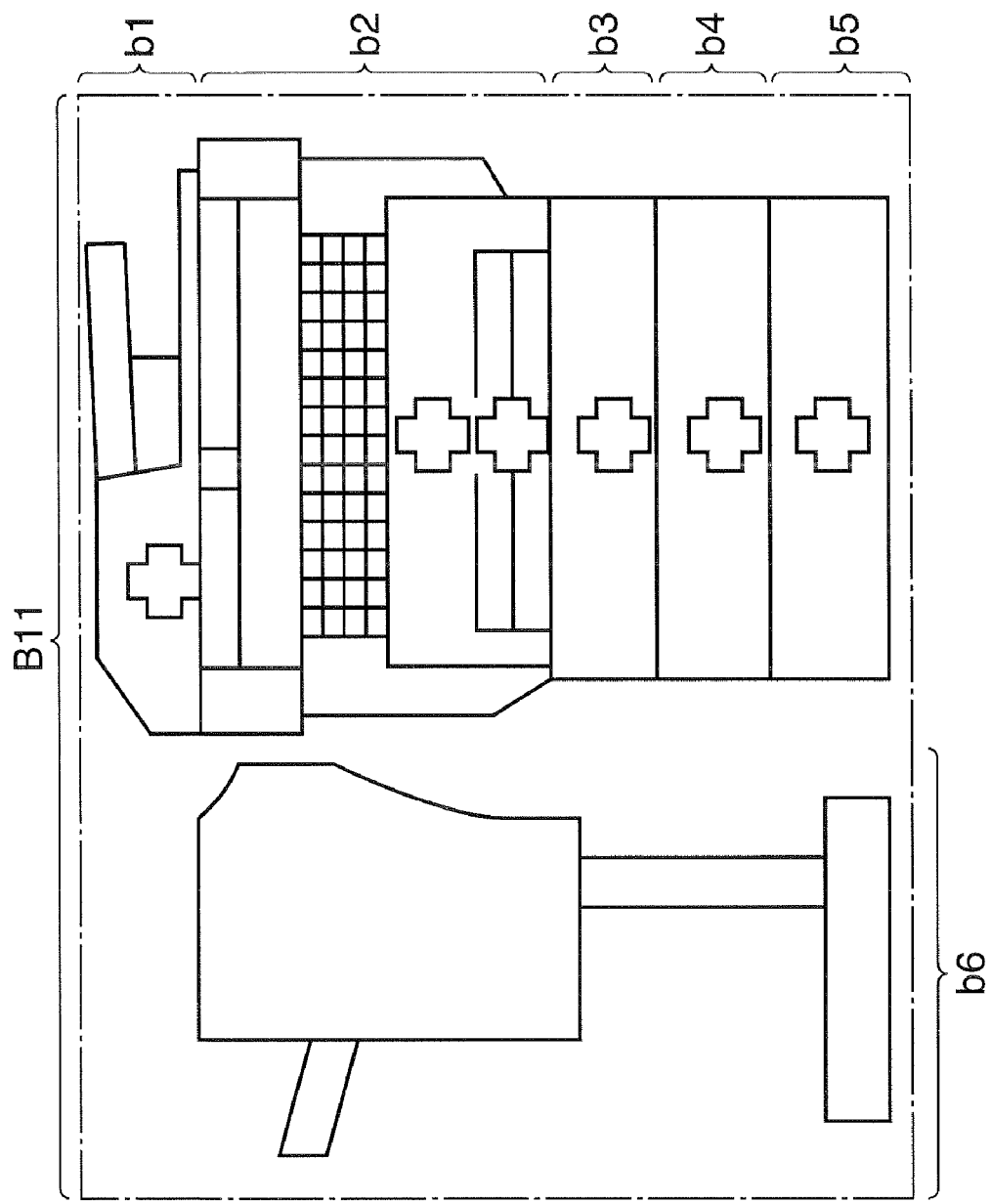
FIG. 19 generally shows a first bitmap image shown in FIG. 18.
Figure 20:
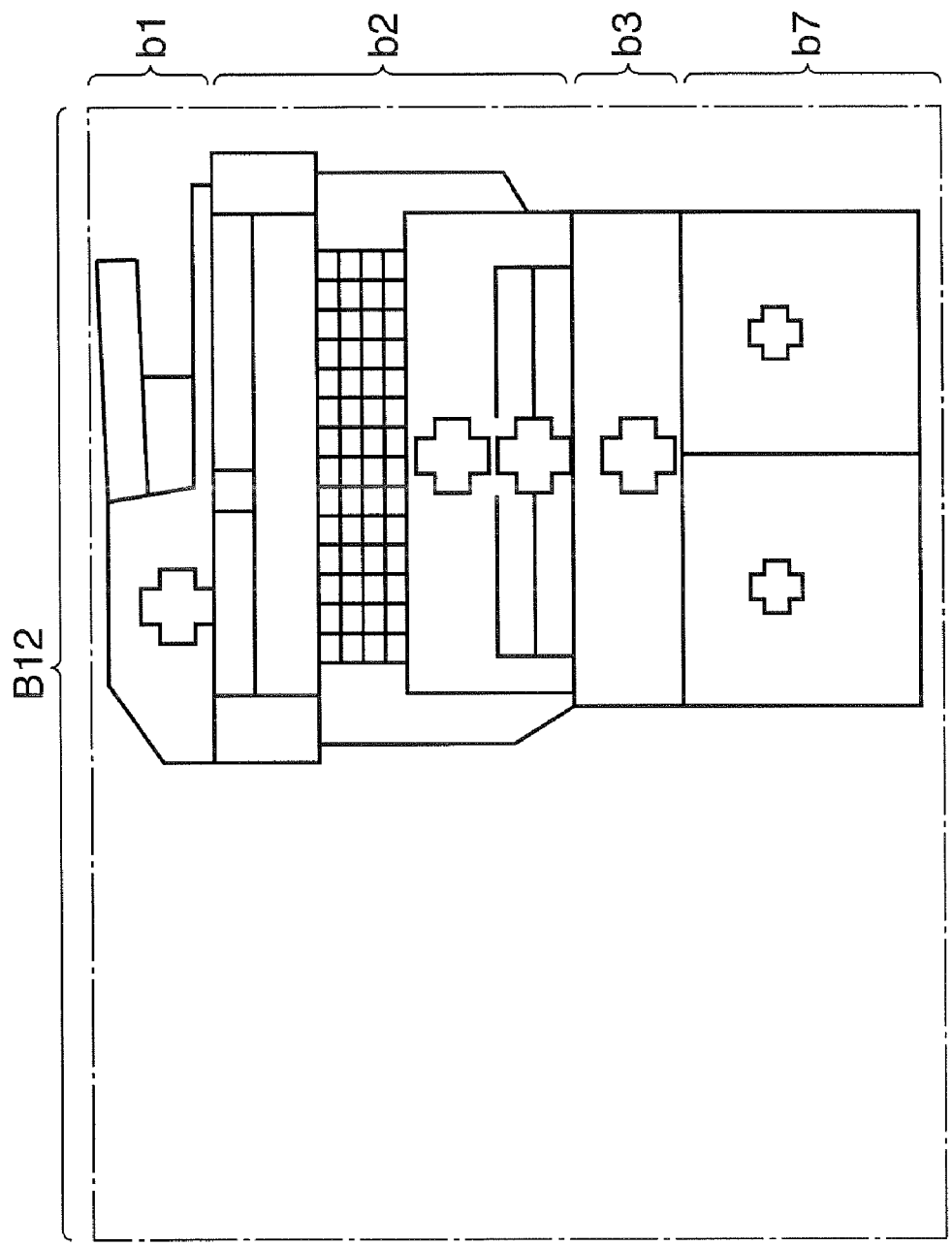
FIG. 20 generally shows a second bitmap image of another kind.
Figure 21:
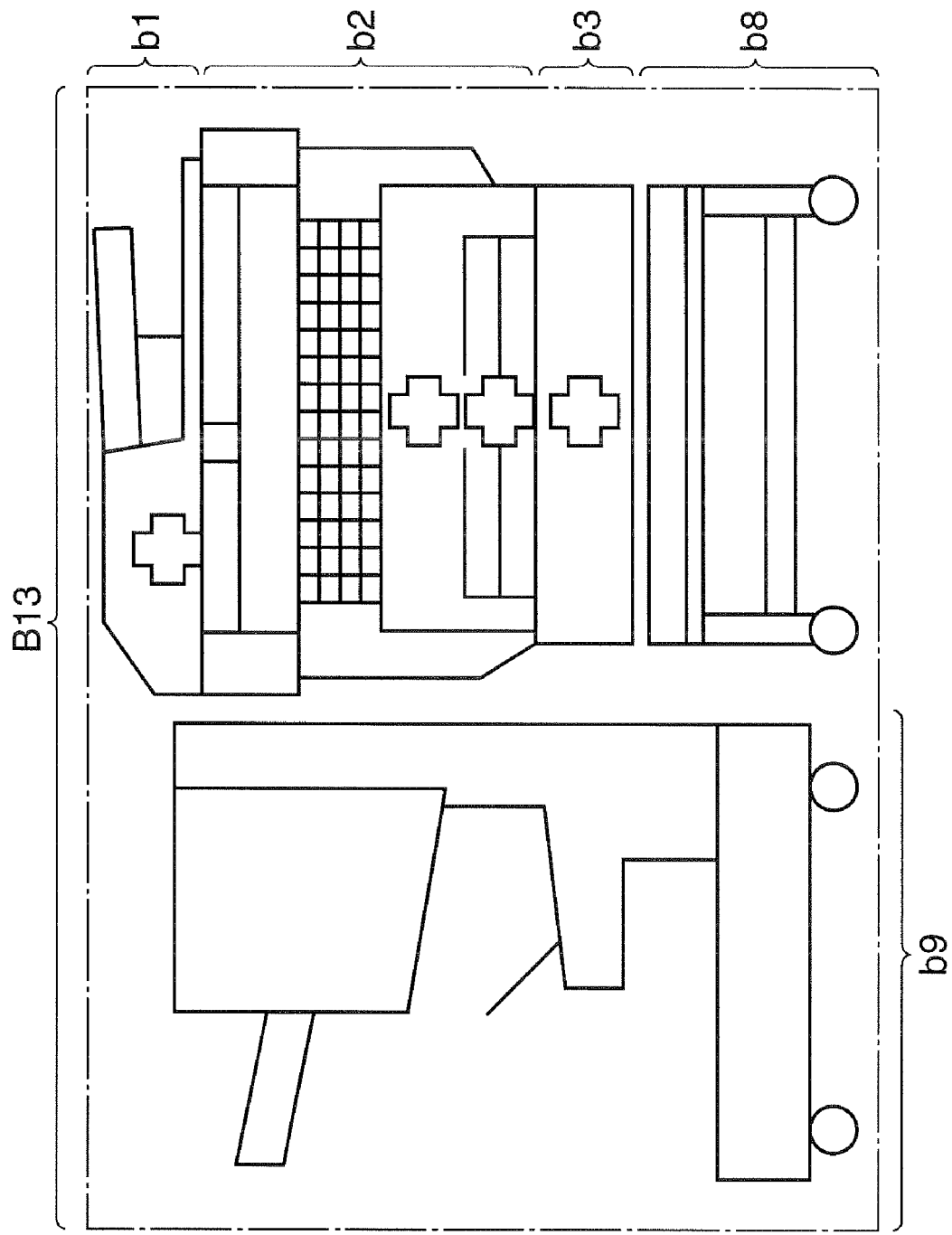
FIG. 21 generally shows a third bitmap image of yet another kind.

FIGS. 19, 20, and 21 show three kinds of examples of bitmap images B11, B12, B13. FIG. 19 generally shows the first bitmap image B11 shown in FIG. 18. FIG. 20 generally shows the second bitmap image B12 of another kind. FIG. 21 generally shows the third bitmap image B13 of yet another kind. These plurality of kinds of bitmap images B11 through B13 are respectively stored as individual data in the display data memory 322. Each display data is constructed by monochromatic binary data and 4 bit data having 16 shades in a bitmap form.

In FIG. 19, the first bitmap image B11 corresponds to a configuration image having a configuration pattern as described above in which the document feeding device 8 and one sheet-supplying section 50 are standardly coupled to the main body 2, and further two sheet-supplying sections 50 and the finisher 70 are optionally coupled.

The first bitmap image B11 mainly includes six individual images b1 through b6. Among those, the individual image b1 corresponds to an image simulating the configuration of the document feeding device 8 shown in FIG. 16. Further, the individual image b2 corresponds to an image simulating the configuration of the main body 2. Similarly, the individual images b3, b4, b5 correspond to images simulating configurations of the sheet-supplying section 50 of respective stages. Further, the individual image b6 corresponds to an image simulating the configuration of the finisher 70. A combination of the six individual images b1 through b6 constitutes a single bitmap image simulating an overall system configuration of the image forming apparatus 1c.

It should be understood that the separation of the individual images b1 through b6 is made just for showing visible images of those, and the bitmap display data is not divided into six data units. However, in a memory space of the display data memory 322, address areas defining the individual images b1 through b6 are finely designated in a single display data.

In FIG. 20, the second bitmap image B12 corresponds to a configuration image having a configuration pattern in which the document feeding device 8 and one sheet-supplying section 50 are standardly coupled to the main body 2, and further a sheet-supplying deck is provided on the lower side as another option. The sheet-supplying deck described herein corresponds to a sheet-supplying section including, for example, two sheet-supplying cassettes arranged serially in a horizontal direction, and has a height which is substantially the same as a height of two vertically layered sheet-supplying sections 50 shown in FIG. 16. Each sheet-supplying cassette can accommodate A4-sized sheets P in a vertically long direction, and has a stacking ability which is greater than that of the sheet-supplying section 50.

The second bitmap image B12 mainly includes four individual images b1 through b3, and b7. Among those, the individual images b1 through b3 are the same as the individual images shown in FIG. 19. The remaining individual image b7 corresponds to the sheet-supplying deck described above. The second bitmap image B12 does not include an individual image corresponding to the finisher 70, and display data is made blank. A combination of the four individual images b1 through b3, and b7 constitutes a single bitmap image simulating an overall system configuration of the image forming apparatus 1c (a configuration pattern having a combination of the main body 2, the standard document feeding device 8, the standard sheet-supplying section 50, and the optional sheet-supplying decks).

In FIG. 21, the third bitmap image B13 corresponds to a configuration image having a configuration pattern in which the document feeding device 8 and one sheet-supplying section 50 are standardly coupled to the main body 2, and a holder is coupled to the lower side as another option, and another type of finisher is further coupled on the left side. The finisher shown here is of a type being different from the finisher shown in FIG. 16, and has functions other than the above-described stapling function, such as a function of perforating sheets P for filing (punching function), and a function of holding the sheets P at the center and further binding the same at the center (booklet function). It should be understood that the holder does not especially function as a sheet-supplying section.

The third bitmap image B13 mainly includes five individual images b1 through b3, b8, and b9. Among those, the individual images b1 through b3 are the same as the individual images shown in FIGS. 19 and 20. Other individual image b8 corresponds to an image simulating the above-described holder, and the remaining individual image b9 corresponds to an image simulating the configuration of the another type of finisher. A combination of such five individual images b1 through b3, b8, and b9 constitutes a single bitmap image simulating an overall system configuration of the image forming apparatus 1c (a configuration pattern having a combination of the main body 2, the standard document feeding device 8, the standard sheet-supplying section 50, the optional finisher, and the holder).

Figure 22:
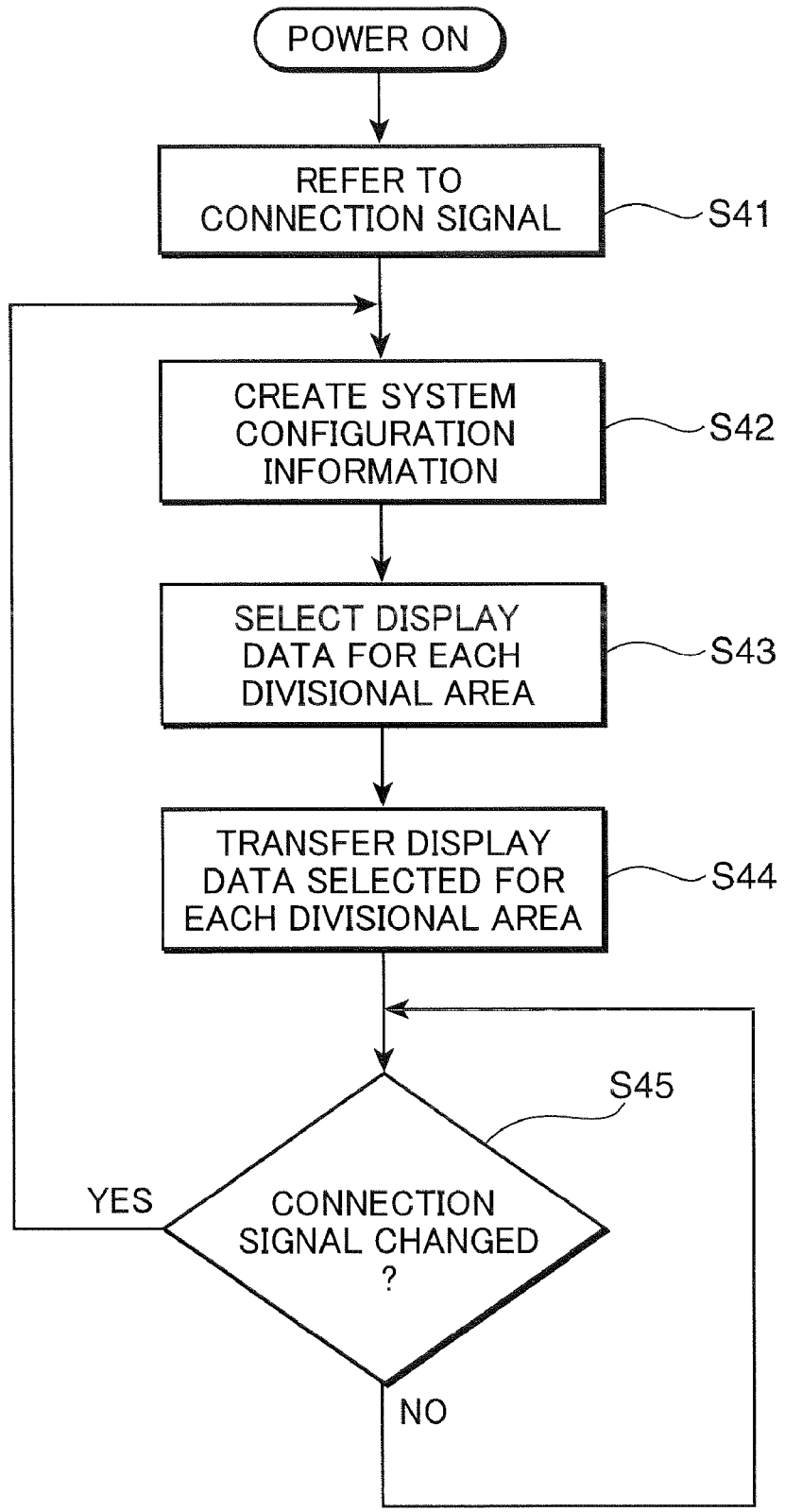
FIG. 22 is a flowchart illustrating a system configuration information renewal processing executed in a main body controller in accordance with the third embodiment.

Next, a system configuration information renewing processing executed in the main body controller 320 in accordance with the third embodiment will be described. FIG. 22 shows a flowchart illustrating the system configuration information renewing processing executed in the main body controller 320 in accordance with the third embodiment.

When a power of the image forming apparatus 1c is turned on, the main body controller 320 and the display controller 310 perform their respective predetermined initialization processing. Then, when it falls to a state where the main body controller 320 and the display controller 310 are communicable with each other, the main body controller 320 executes the system configuration information renewing processing shown in FIG. 22. Hereinafter, the processing will be described by following the order of steps.

Firstly, in step S41, the CPU 321 of the main body controller 320 refers to connection signals of the option connector 330 and the side option connector 340. Next, in step S42, the CPU 321 creates system configuration information in accordance with the connection signals.

Next, in step S43, the CPU 321 of the main body controller 320 selects display data (bitmap data) for each of the divisional areas R1 through R3 on the display screen 100c in accordance with the created system configuration information.

Here, the divisional areas R1 through R3 are defined along borders of the individual images constituting a configuration image (bitmap image) displayed on the display screen 100c. In the example shown in FIG. 18, the vertically arranged divisional areas R1, R2 are divided along the border between a group of the individual images b1 through b3 on the right side the display area A and a group of the individual images b4, b5 on the lower side the individual images b1 through b3. Further, on the left side of the display area A, the divisional area R3 and other divisional areas R1, R2 are divided along the border between the individual image b6 and a set of other individual images b1 through b5.

Thus, the divisional area R1 positioned at the upper right portion of the display area A corresponds to respective positions of the main body 2, the standard sheet-supplying section 50, and the document feeding device 8 on the display screen 100c. Further, the divisional area R2 positioned at the lower right portion corresponds to the position of the two sheet-supplying sections 50, the sheet-supplying deck, or the holder on the display screen 100c. The divisional area R3 on the left side corresponds to the position of the finisher 70 or other type of finisher.

At this time, when the system of the image forming apparatus 1c has a configuration pattern shown in FIG. 16, the CPU 321 of the main body controller 320 selects display data (bitmap data) corresponding to the first bitmap image B11 for each of the divisional areas R1, R2, R3 in step S43.

Next, in step S44 the CPU 321 of the main body controller 320 transfers the display data (bitmap data) selected for each of the divisional areas R1, R2, R3 to the display controller 310.

Next, in step S45, the CPU 321 of the main body controller 320 refers to connection signals of the option connector 330 and the option connector 340 by external interruption to determine whether or not there is a change in the connection signals. When there is no especial change in the connection signals (NO in step S45), the CPU 321 continues monitoring changes in the connection signals.

On the other hand, when a change in connection signals occurs due to a change in the system configuration such as addition or removal of options in mid-course (YES in step S45), the CPU 321 allows the routine to go back to the processing of step S42 and newly creates system configuration information. This renews the system configuration information stored in the RAM 323 to have the latest content.

Further, when system configuration information is renewed, the CPU 321 executes the processing of step S43 and step S44 to select display data for each of the divisional areas R1, R2, R3, and transfers the selected display data to the display controller 310.

Figure 23:
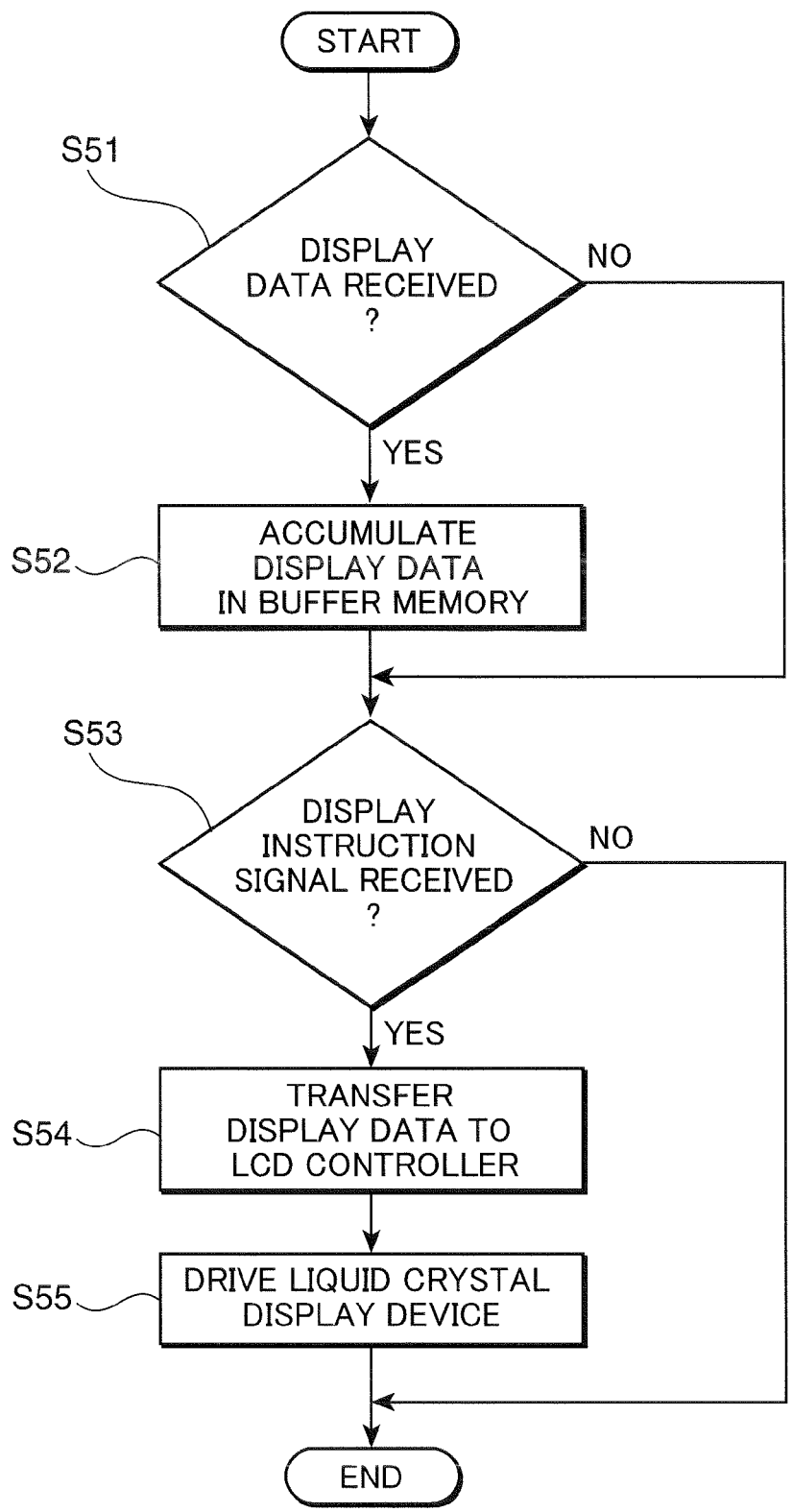
FIG. 23 is a flowchart illustrating a display control processing executed in the display controller in accordance with the third embodiment.

Next, a display control processing executed in the display controller 310 in accordance with the third embodiment will be described. FIG. 23 is a flowchart illustrating the display control processing executed in the display controller 310 in accordance with the third embodiment. During an operation of the image forming apparatus 1c, the CPU 311 of the display controller 310 executes the display control processing, for example, at a predetermined cycle.

Firstly, in step S51, the CPU 311 of the display controller 310 determines whether or not the display data (bitmap data) transmitted from the main body controller 320 is received. When it is determined in step S51 that the display data is received (YES in step S51), the CPU 311 accumulates the transferred display data into the buffer memory 312 in step S52. On the other hand, when it is determined in step S51 that the display data is not received (NO in step S51), the CPU 311 skips the processing of step S52 and allows the routine to proceed to the processing of step S53.

Next, in step S53, the CPU 311 of the display controller 310 determines whether or not a display instruction signal is received, which is transmitted by the main body controller 320 to instruct displaying of a configuration image simulating a configuration of the image forming apparatus 1c. For example, when the main body controller 320 detects a jam and the like of the sheet P, a display instruction signal is transmitted to the display controller 310.

When it is determined that the display instruction signal transmitted by the main body controller 320 is received (YES in step S53), the CPU 311 of the display controller 310 allows the routine to proceed to the processing of step S54 and so on. On the other hand, when it is determined that the display instruction signal is not received (NO in step S53), the CPU 311 terminates the display control processing for the meantime.

Next, in step S54, the CPU 311 of the display controller 310 transfers (copies) the display data accumulated in the buffer memory 312 to the LCD controller 313. The display data transmitted at this time includes a bitmap image (one from B11 through B13) selected for each of the divisional areas R1, R2, R3. Next, in step S55, the LCD controller 313 of the display controller 310 drives the liquid crystal display device 100 in accordance with the transferred display data.

Here, a first example of the display operation in accordance with the third embodiment will be described. With execution of the display control processing shown in FIG. 23, the display screen 100c, for example, shown in FIG. 18 is displayed as a first example of the display operation. The first example of the display operation corresponds to a configuration pattern of the case where two sheet-supplying sections 50 are optionally coupled and further the finisher 70 is coupled in addition to the standard configuration of the image forming apparatus 1c (the document feeding device 8, the main body 2 and one sheet-supplying section 50).

Figure 24:
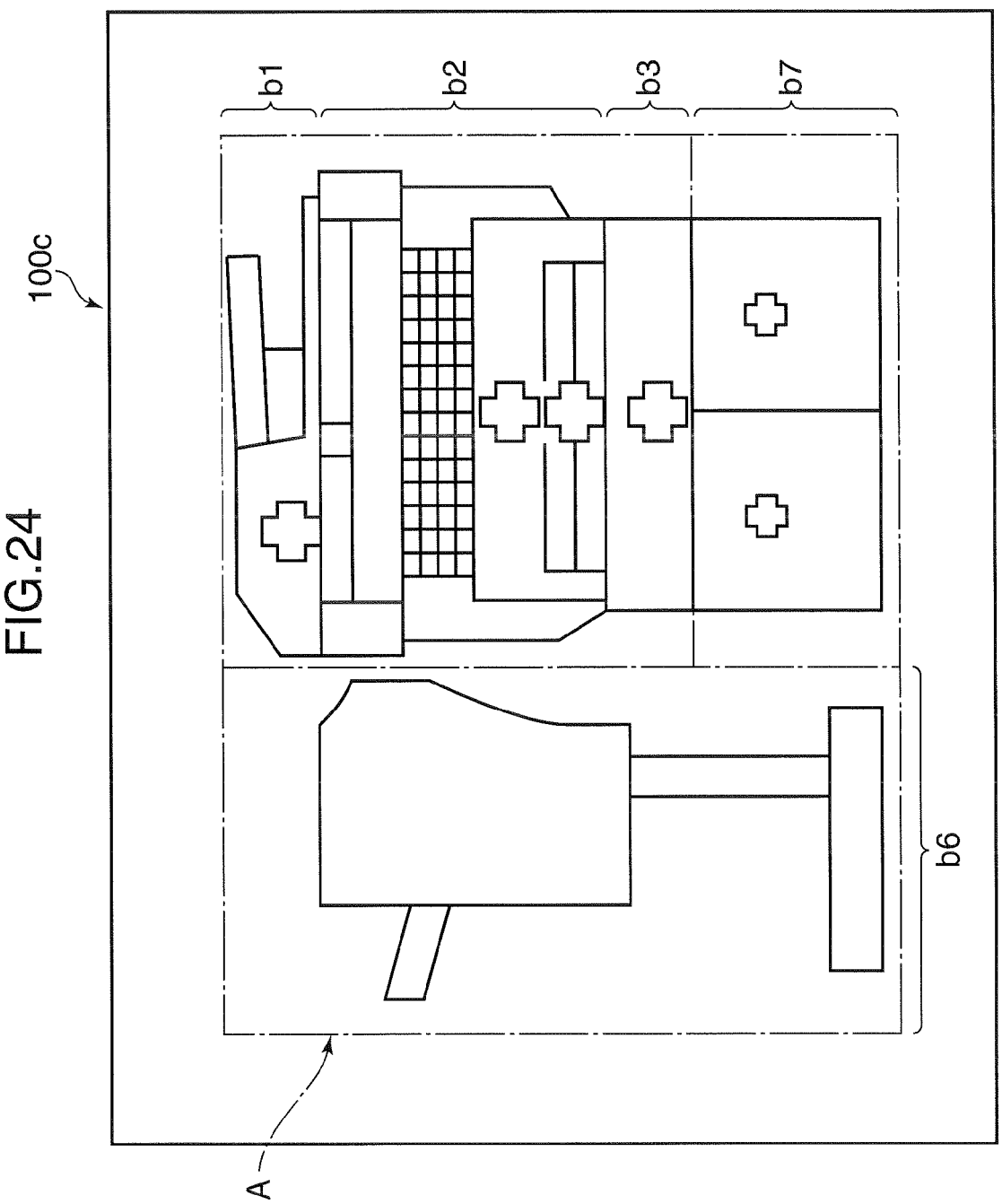
FIG. 24 shows a second example of a display operation of the liquid crystal display device, which is performed with execution of the display control processing shown in FIG. 23.

Next, a second example of the display operation in accordance with the third embodiment. FIG. 24 shows a second example of the display operation of the liquid crystal display device 100, which is performed with execution of the display control processing shown in FIG. 23. The second example of the display operation corresponds to a configuration pattern of the case where the above-described sheet-supplying deck is optionally coupled, and the finisher 70 is further coupled in addition to the standard configuration of the image forming apparatus 1c (the document feeding device 8, the main body 2 and one sheet-supplying section 50). In this case, being different from the example of configuration shown in FIG. 16, the image forming apparatus 1c is not provided with sheet-supplying sections 50 in the second and third stages, but is provided with the sheet-supplying deck instead.

According to this configuration pattern, the display data of the first bitmap image B11 (FIG. 19) is dynamically selected for the divisional areas R1, R3 of the display area A, and the second bitmap image B12 (FIG. 20) is dynamically selected for the divisional area R2 of the display area A, in step S43 of the system configuration information renewing processing shown in FIG. 22.

Then, the display controller 310 drives the liquid crystal display device 100 in accordance with the display data selected for each of the divisional area R1, R2, R3. As a result, as shown in FIG. 24, the individual image b1, b2, b3, b6 being parts of the first bitmap image B11 and the individual image b7 being a part of the second bitmap image B12 are synthesized and displayed as an image on the display screen 100c. The image in this case is a configuration image which truly simulates an overall configuration of an actual configuration pattern (the document feeding device 8, the main body 2, the sheet-supplying section 50, the sheet-supplying deck, and the finisher 70).

Figure 25:
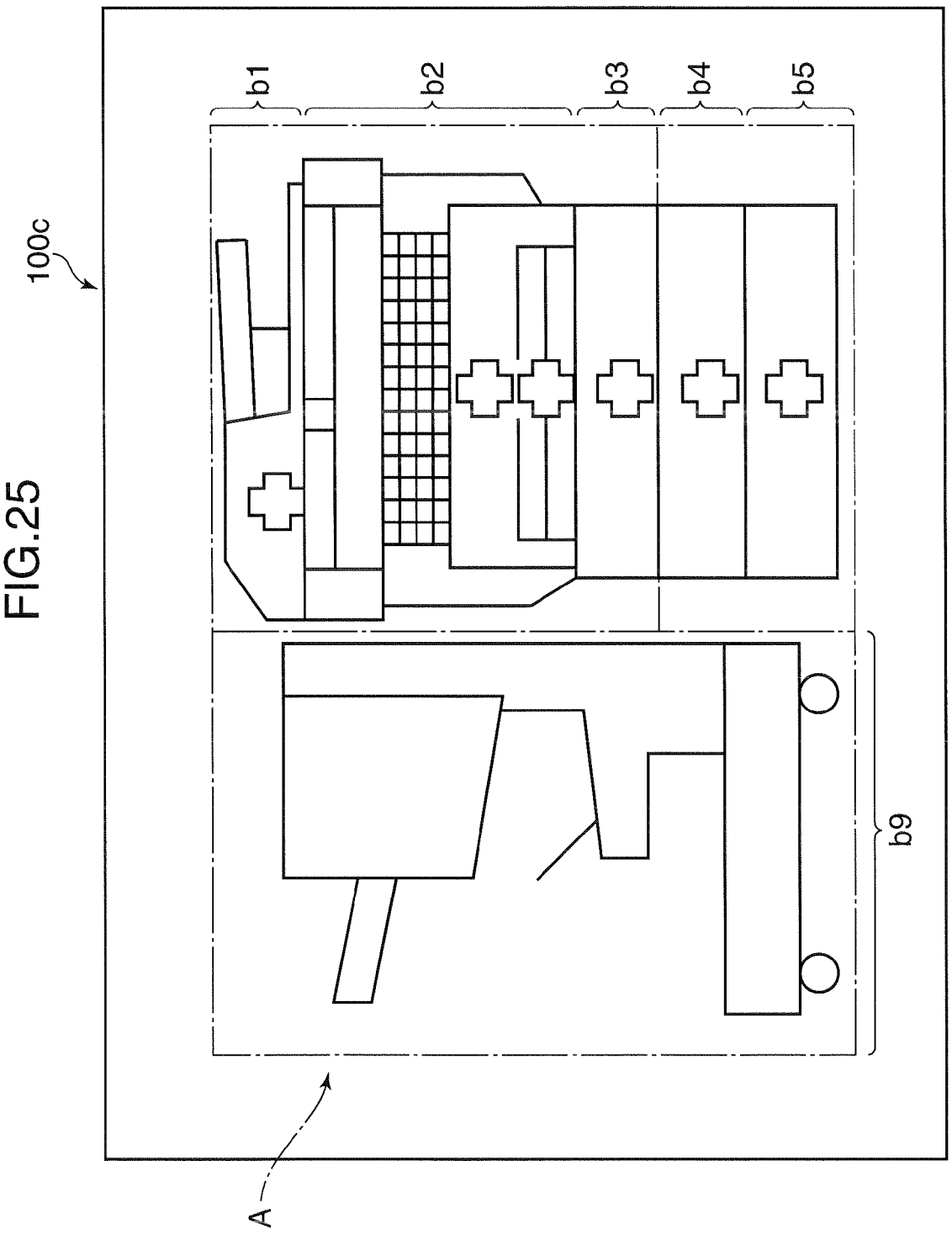
FIG. 25 shows a third example of a display operation of the liquid crystal device, which is performed with execution of the display control processing shown in FIG. 23.

Next, a third example of the display operation in accordance with the third embodiment will be described. FIG. 25 shows the third example of the display operation of the liquid crystal display device 100, which is performed with execution of the display control processing shown in FIG. 23. The third example of the display operation corresponds to a configuration pattern in which two sheet-supplying sections 50 are coupled, and another type of finisher is further coupled in addition to the standard configuration of the image forming apparatus 1c (the document feeding device 8, the main body 2, and one sheet-supplying section 50). In this case, being different from the example of configuration shown in FIG. 16, the image forming apparatus 1c is provided with another type of finisher.

According to this configuration pattern, the display data of the first bitmap image B11 (FIG. 19) is dynamically selected for the divisional area R1, R2 of the display area A, and the display data of the third bitmap image B13 (FIG. 21) is dynamically selected for the divisional area R3 in step S43 of the system configuration information renewing processing shown, in FIG. 22.

Then, the display controller 310 drives the liquid crystal display device 100 in accordance with the display data selected for each of the divisional areas R1, R2, R3. As a result, as shown in FIG. 25, the individual images b1 through b5 being parts of the first bitmap image B11 and the individual image b9 being a part of the third bitmap image B13 are synthesized and displayed as an image on the display screen 100c. The image in this case is a configuration image which truly simulates an overall configuration of an actual configuration pattern (the document feeding device 8, the main body 2, the standard sheet-supplying section 50, two sheet-supplying sections 50, and another type of finisher).

Next, another example of the display operation in accordance with the third embodiment will be described. Though it is not especially illustrated, the main body controller 320 executes the system configuration information renewing processing shown in FIG. 22, and renews the latest system configuration information, so that a display operation in conformity with an actual configuration pattern of the image forming apparatus 1c can be realized in such a manner as described herebelow.

For example, when the system of the image forming apparatus 1c is changed to the configuration pattern having the standard document feeding device 8, one standard sheet-supplying section 50 and the holder in addition to the main body 2, the display data of the first bitmap image B11 is selected for the divisional area R1, and the display data of the third bitmap image B13 is selected for the divisional area R2, and the display data of the second bitmap image B12 (blank data) is selected for the divisional area R3, in step S43 of the system configuration information renewing processing shown in FIG. 22. As a result, the individual images b1 through b3 being parts of the first bitmap image B11 and the individual image b8 being a part of the third bitmap image B13 are synthesized and displayed as a configuration image on the display screen 100c.

Alternatively, when the system of the image forming apparatus 1c is changed to a configuration pattern having the standard document feeding device 8, one standard sheet-supplying section 50, the sheet-supplying deck, and another type of finisher in addition to the main body 2, the display data of the first bitmap image B11 is selected for the divisional area R1, and the display data of the second bitmap image B12 is selected for the divisional area R2, and the display data of the third bitmap image B13 is selected for the divisional area R3, in step S43 of the system configuration information renewing processing shown in FIG. 22. As a result, the individual images b1 through b3 being parts of the first bitmap image B11, the individual image b7 being a part of the second bitmap image B12, and the individual image b9 as being a part of the third bitmap image B13 are synthesized and displayed as a configuration image on the display screen 100c.

As described above, in the present embodiment, the main body controller 320 performs a control of displaying operation (instruction of displaying) by dynamically selecting display data (bitmap data) for each of the divisional area R1, R2, R3 in conformity with an actual configuration pattern of the image forming apparatus 1c and transferring the selected display data to the display controller 310. Therefore, it would be enough to perform transfer of display data only once as a whole at first. Thus, a load required for data transfer and data processing can be reduced, so that a time required for the data transfer and the data processing can be shortened.

Further, even if the configuration pattern of the system is dynamically changed later, selecting display data for each of the divisional areas R1, R2, R3 dynamically in conformity with the changed configuration pattern and transferring the selected data once as a whole would be enough. Therefore, it would not be necessary to transfer a plurality (for each component) of display data many times in conformity with the configuration pattern and arrange these on the memory space to construct data for transfer. Thus, a load required for data processing can be reduced in both the main body controller 320 and the display controller 310, so that data can be transferred efficiently.

The present invention is not limited to the embodiment described above, and it may be modified in various ways for practice. As an example of the system configuration in accordance with the present embodiment, the main body 2 and the standard sheet-supplying section 50 are separated. However, sheet-supplying section 50 may be uniformly provided in the main body 2.

Further, the display area A, the divisional areas R1 through R3, the first through third bitmap images B11, B12, B13, and the like shown in the present embodiment are preferred examples, and these may be desirably modified for practice.

The sheet-supplying sections 50, the sheet-supplying deck, the finisher 70, the holder, another type of finisher, and the like are described as optional attachments in the present embodiment. However, the large capacity sheet feeding section (side deck) as another example of the attachment may be coupled to the main body 2.

Furthermore, the liquid crystal display device 100 is provided on the main body 2 in the present embodiment. However, the liquid crystal display device 100 may be provided on the attachment such as the document feeding device 8, the finisher 70, and the like.

Fourth Embodiment

Figure 26:
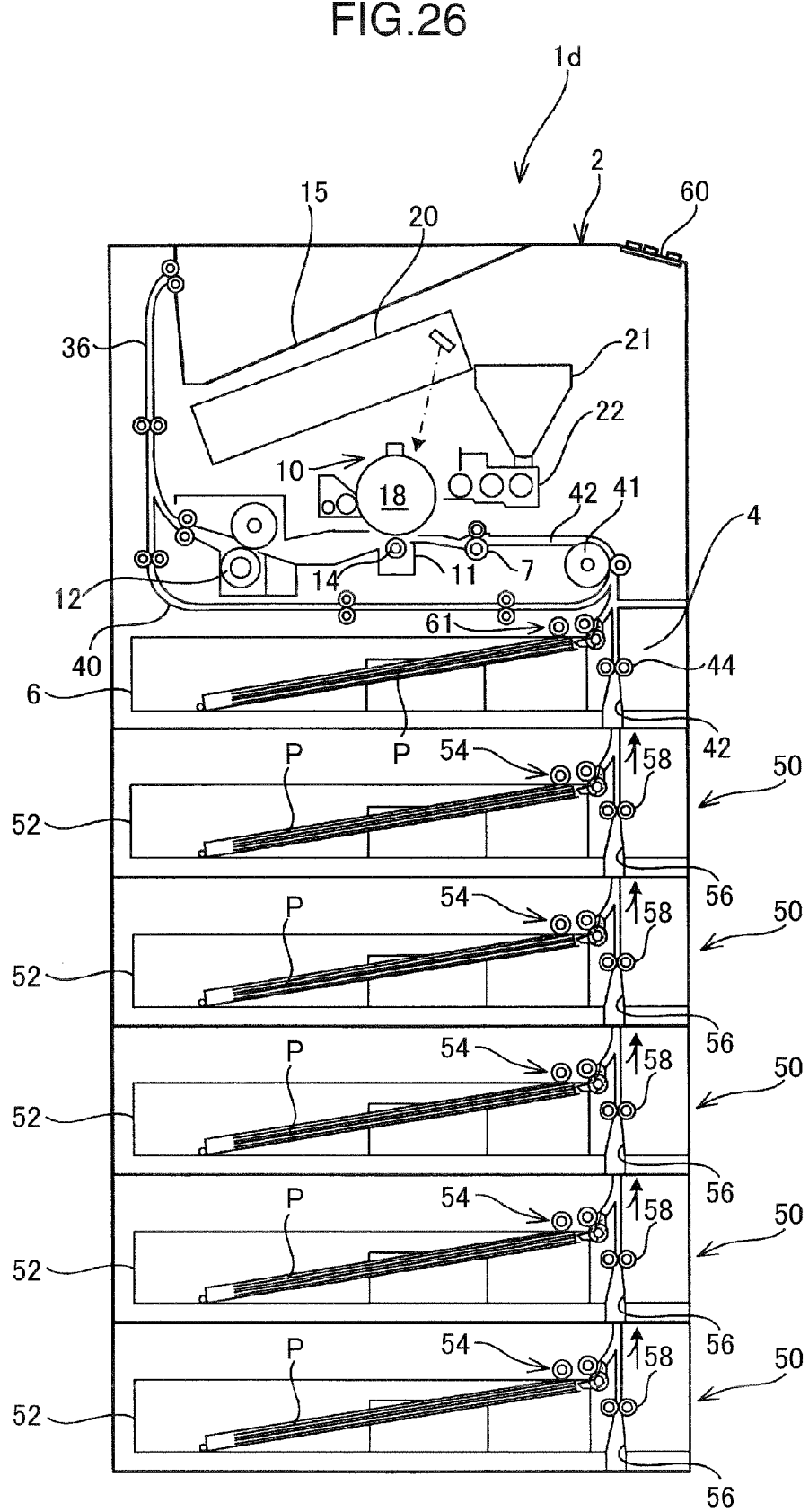
FIG. 26 schematically shows an overall configuration of an image forming apparatus in accordance with a fourth embodiment.

Next, a fourth embodiment of the present invention will be described with reference to the drawings. FIG. 26 schematically shows an overall configuration of an image forming apparatus in accordance with the fourth embodiment. Further, FIG. 26 schematically shows a structure of a printer which is an example of an image forming apparatus 1d.

As shown in FIG. 26, the image forming apparatus 1d includes a sheet storage section 4 in a lower portion of its main body 2. The sheet storage section 4 has a main body cassette 6 and a sheet-supplying portion 61. The main body cassette 6 stores therein a stack of sheets P. The sheet-supplying portion 61 picks up an uppermost sheet P one after another, and sends out in an upper right direction of the main body cassette 6 in FIG. 26. The sheets P sent out therefrom are reversed leftward in the main body 2 and conveyed in a horizontal direction.

Further, the main body cassette 6 is so configured that it can be pulled out in a front side direction of the main body 2. In the state of being pulled out, sheets P can be replenished into the main body cassette 6, and the sheets P can be replaced with another kind of sheets.

In the main body 2, there are arranged a feeding roller 41, a sheet conveying passage 42 for supplying sheets P, a registration roller 7, a print engine 10, and a transferring section 11 in order on downstream of the sheet storage section 4 in a sheet-conveying direction.

The print engine 10 has a photoconductive drum 18 at its central portion. Further, the print engine 10 has a laser scanning unit 20 in its upper portion. As indicated by a one-dotted chain line in FIG. 26, the laser scanning unit 20 irradiates a laser light to the photoconductive drum 18. Further, the transferring section 11 has a transferring roller 14. The transferring roller 14 comes in contact with the photoconductive drum 18 from lower side to form a transfer nip for allowing a toner image to transfer to a sheet P.

Further, a toner container 21 is mounted in the main body 2. The toner container 21 is positioned on right of the laser scanning unit 20 above the sheet conveying passage 42, and is so configured that it is detachable from the main body 2. Toner particles contained in the toner container 21 are supplied to the photoconductive drum 18 via a developing equipment (developing device) 22.

Further, on downstream of the print engine 10 and the transferring section 11 in the sheet-conveying direction, a fixing device 12 and a sheet conveying passage 36 for discharging of sheets P are formed. The sheet conveying passage 36 extends upward along the left side surface of the main body 2 from downstream of the fixing device 12. Further, the sheet conveying passage 36 is bent rightward in an upper portion of the main body 2. On the top of the main body 2, there is formed a sheet-discharging tray 15 which receives sheets P discharged from the end of the sheet conveying passage 36 and stacks the sheets in a height direction. The printed sheets P which are discharged on the sheet-discharging tray 15 can be easily taken out by a user.

On the other hand, in a space beneath the lower side of the transferring section 11 and the fixing device 12 but above the sheet storage section 4, there is formed a sheet conveying passage 40 for a both side printing. The sheet conveying passage 40 branches out at a position along the left side surface of the main body 2 on the course of the sheet conveying passage 36 and extends downward. Further, the sheet conveying passage 40 is bent rightward in the main body 2, extends in a horizontal direction, and merges with the sheet conveying passage 42 at a direct downstream position of the sheet-supplying portion 61.

A schematic configuration of the main body 2 is as described above. In the image forming apparatus 1d according to the present embodiment, a sheet-supplying section (attachment) 50 can be coupled standardly or optionally to the lower side of the main body 2 for use. For example, provided that a configuration in which one sheet-supplying section 50 is coupled to the main body 2 is a standard configuration of the image forming apparatus 1d, the example shown in FIG. 26 is an optional configuration in which four sheet-supplying sections 50 are coupled successively in layers in addition to the standard configuration.

Each sheet-supplying section 50 has a sheet-supplying cassette 52, a sheet-supplying unit 54, a sheet passage 56, and a conveying roller 58. The sheet-supplying cassette 52 stores a stack of sheets P. The sheet-supplying unit 54 sends out an uppermost sheet P one after another in an upper right direction. The sheet P sent out by the sheet-supplying unit 54 is conveyed vertically upward through the sheet passage 56. The sheet P conveyed upward is taken by the conveying roller 44 of the main body 2 and sent to a sheet conveying passage 42.

Further, the respective sheet passages 56 of the vertically arranged sheet-supplying sections 50 are connected to each other at their respective upper end and lower end. Therefore, a sheet P sent out from a sheet-supplying section 50 which is positioned at a second stage from the uppermost or at a stage lower than the second stage among the plurality of sheet-supplying sections 50 is taken by the conveying rollers 58 in the sheet passages 56 of upper stages and conveyed vertically upward.

On an exterior cover of the image forming apparatus 1*d*, there is provided an operation display device 60. The operation display device 60 includes various operation buttons and a liquid crystal display device. The operation buttons receive a user's input operation. Further, the liquid crystal display device displays on its display screen various textual information for a user (such as a status and operation menus) and a configuration image simulating configurations of the image forming apparatus 1*d* and its attachments. Such configuration image is used for visually presenting to a user a position where a sheet jam occurs during an operation of the image forming apparatus 1*d* and a state of running out of sheets in the sheet-supplying section 50. Hereinafter, a display control of a configuration image in accordance with the present embodiment will be described in detail.

Figure 27:
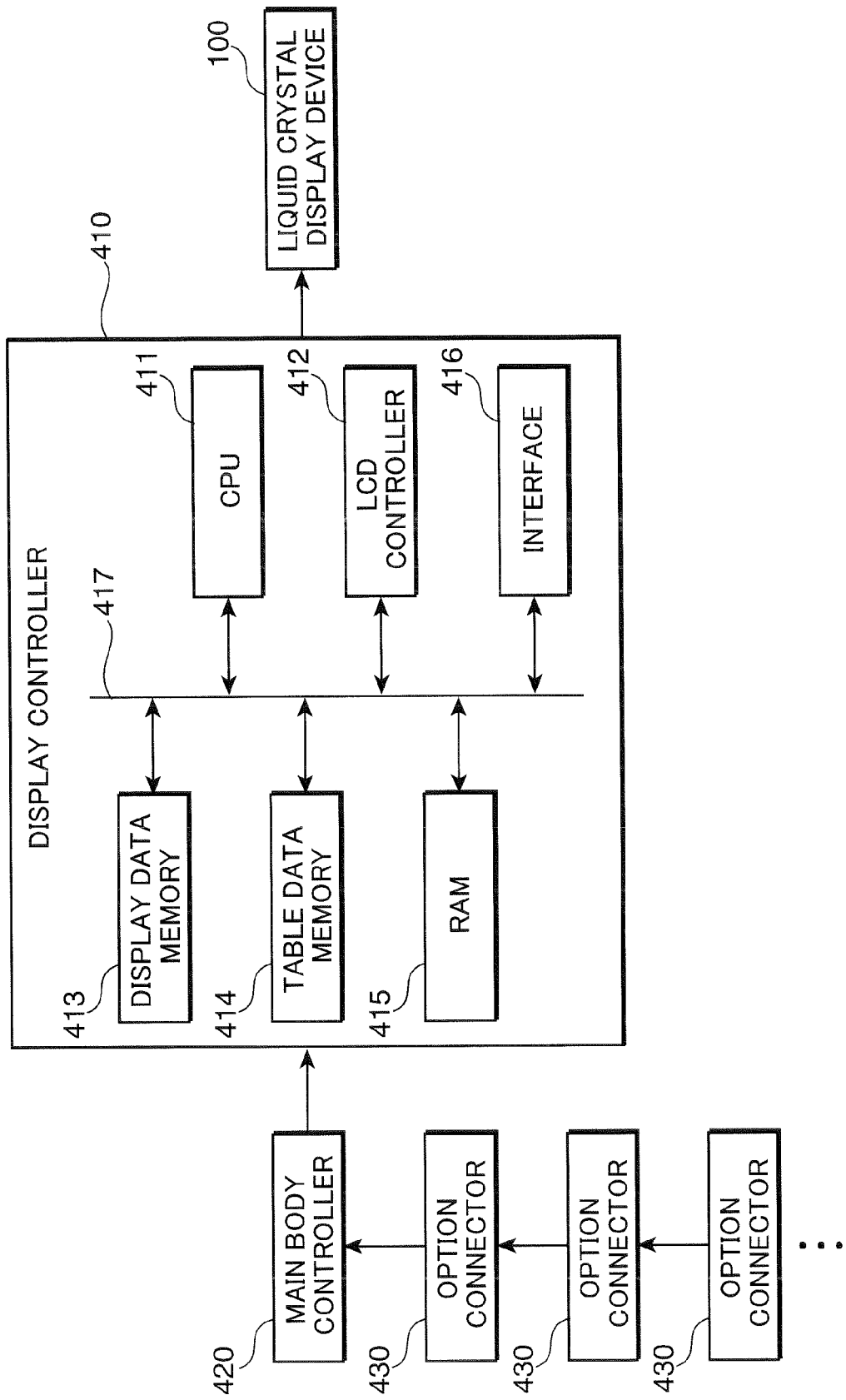
FIG. 27 is a block diagram showing a configuration of a display controller of a liquid crystal display device provided in an operation display device shown in FIG. 26.

FIG. 27 is a block diagram showing a configuration of a display controller 410 of a liquid crystal display device 100 provided in the operation display device 60 shown in FIG. 26. A control of the liquid crystal display device 100 is performed, for example, in the display controller 410. The display controller 410 includes a CPU 411, an LCD controller 412, a display data memory 413, a table data memory 414, a RAM 415, and an interface 416. It should be understood that the components which are the same as those of the first embodiment are identified with the same reference numerals. The liquid crystal display device 100, for example, is provided at a position on an exterior cover surface of the image forming apparatus 1*d* where a user can see it without any difficulty.

The display controller 410 may be configured as a single circuit board provided in the main body 2 of the image forming apparatus 1*d*. On the circuit board, the above-described components are mounted. The components are connected to each other through an unillustrated wiring pattern and a bus 417. The CPU 411, the LCD controller 412, and the RAM 415 may be of a widely used type. It should be understood that the CPU 411 may be an ASIC in which an application is installed for exclusive use. Further, operation signals outputted from the above-described operation buttons are inputted to the display controller 410 through the interface 416.

The display data memory 413 includes a storage device such as a ROM and an EEPROM. In a memory area (memory block) of the display data memory 413, individual display data as material of images to be displayed by the liquid crystal display device 100 is stored. Details of the individual display data will be described hereinafter.

The table data memory 414 may include a memory device such as a ROM and an EEPROM. The table data memory 414 stores table data which are used when the CPU 411 accesses (reads out) the display data memory 413. It should be understood that details of table data will also be described hereinafter.

The main body controller 420 inputs system configuration information to the display controller 410. The system configuration information is adapted to identify an overall system configuration when the sheet-supplying section 50 is standardly or optionally coupled to the main body 2 of the image forming apparatus 1*d*. Specifically, the system configuration information is adapted to identify if the system of the image forming apparatus 1*d* includes a configuration having only the main body 2 (configuration pattern 0), or a configuration (standard in the present embodiment) in which one sheet-supplying section 50 is coupled to the main body 2 (configuration pattern 1), or a configuration having two sheet-supplying sections 50 coupled to the main body 2 (configuration pattern 2), or a configuration having three, four, or five (or six or more) sheet-supplying sections 50 coupled to the main body 2 (configuration pattern 3, 4, 5 . . . ).

In the liquid crystal display device 100, a display area necessary for displaying a configuration image on a display screen is divided into a plurality of divisional areas. In the present embodiment, the liquid crystal display device 100 is provided on the main body 2, but the present invention is not especially limited to this. The liquid crystal display device 100 may be provided on the sheet-supplying section 50.

The display data memory 413 stores a plurality of individual display data corresponding respectively to the plurality of divisional areas. The CPU 411 allows an image to be displayed on each of the divisional areas in accordance with the plurality of individual display data stored in the display data memory 413 so as to allow a configuration image simulating an overall configuration in combination of the main body 2 and the sheet-supplying section 50 to be displayed on the display screen in a state such that the plurality of divisional areas are synthesized.

The table data memory 414 stores table data for defining a plurality of configuration patterns of combinations of the main body 2 and the sheet-supplying section 50 and associating each of the divisional areas and respective individual display data for each of the plurality of configuration patterns.

The main body controller 420 is provided in the main body 2 as a unit having a function of controlling an image forming operation of the image forming apparatus 1*d*. The above-described system configuration information is created in the main body controller 420. Though it is not illustrated, the main body controller 420 also includes an arithmetic processing unit such as a CPU, a storage device, and an interface, and each of the components is mounted on the circuit board. Each sheet-supplying section 50 has an option connector 430 of a drawer type. When the sheet-supplying section 50 is coupled to the main body 2, the option connector 430 is connected simultaneously.

Further, when a plurality of sheet-supplying sections 50 are coupled in layers, the option connectors 430 are connected to the main body 2 in cascade. Each option connector 430 is grounded at the ground level which is in common with the main body controller 420. The main body controller 420 can detect the number of stages of the sheet-supplying sections 50 in accordance with a connection signal (ON or OFF) of each option connector 430. When there are a plurality of kinds of sheet-supplying section 50, the above-described connection signal further includes information (about 4 bits) for identifying the kind.

In the present embodiment, the main body 2 corresponds to an example of a main body, and the sheet-supplying section 50 corresponds to an example of an attachment, and the liquid crystal display device 100 corresponds to an example of an image display device, and the display data memory 413 corresponds to an example of a data storage portion, and the CPU 411 and the LCD controller 412 correspond to an example of a display controller, and table data memory 414 corresponds to an example of an association information storing portion, and the main body controller 420 and the option connector 430 correspond to an example of a configuration detecting portion.

Figure 28:
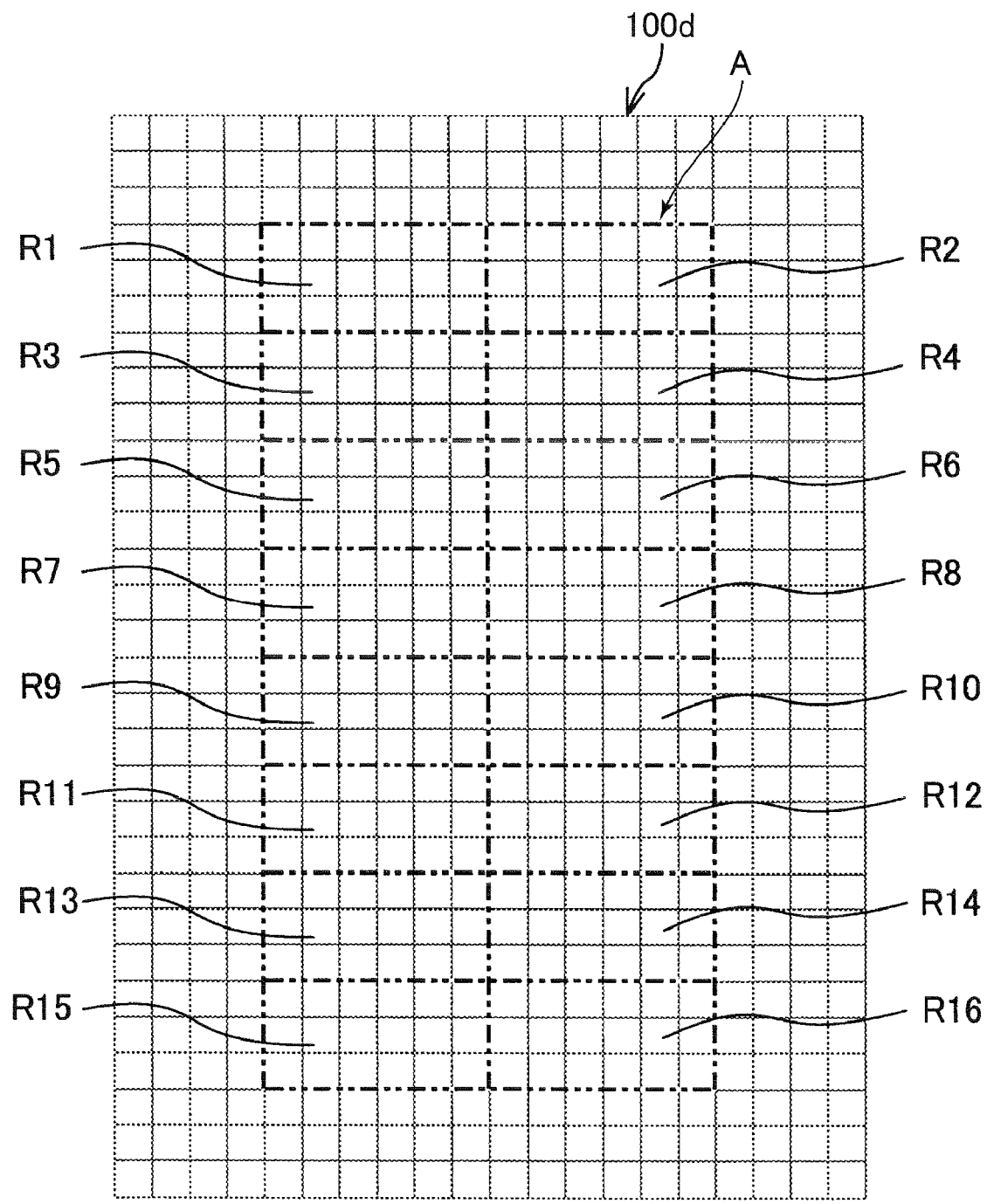
FIG. 28 schematically shows a display screen of the liquid crystal display device.
Figure 29A:
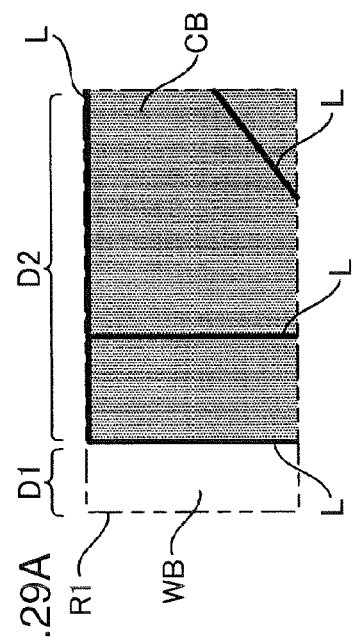
FIGS. 29A through 29F show individual display data corresponding respectively to upper six display areas of a display screen.
Figure 29B:
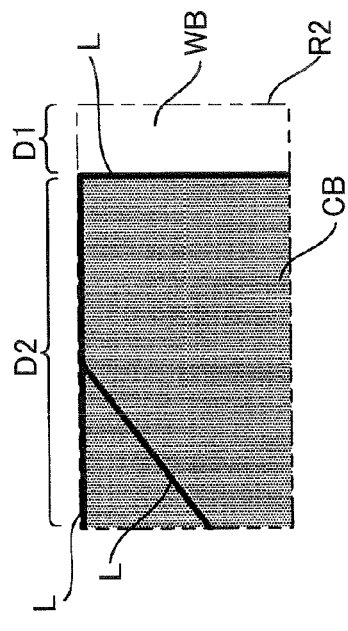
Figure 29C:
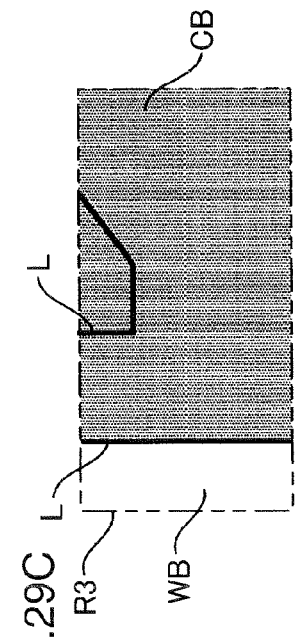
Figure 29D:
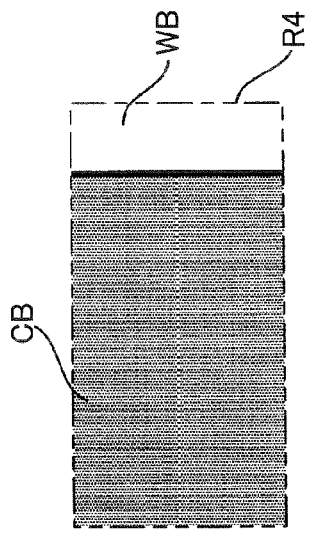
Figure 29E:
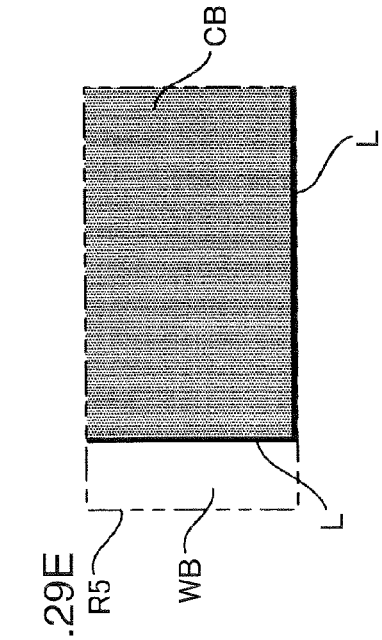
Figure 29F:
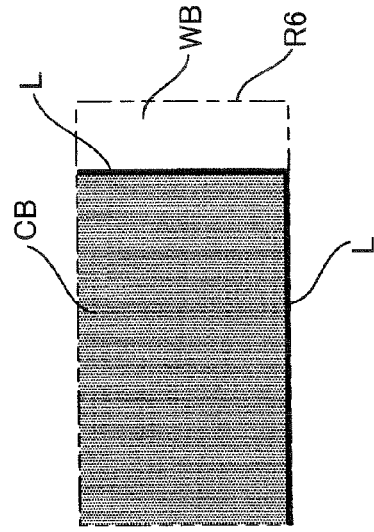
Figure 30A:
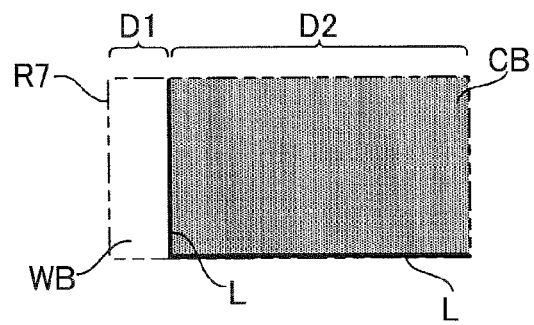
FIGS. 30A through 30J show individual display data corresponding respectively to lower ten display areas continuing downward from the display areas of FIGS. 29A through 29F.
Figure 30B:
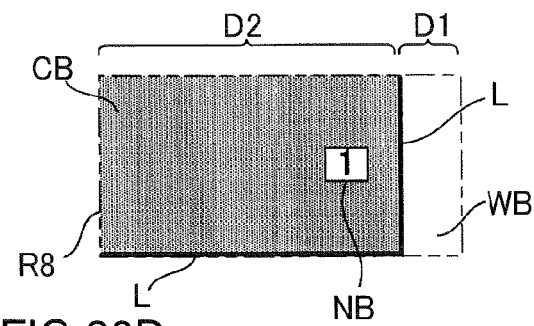
Figure 30C:
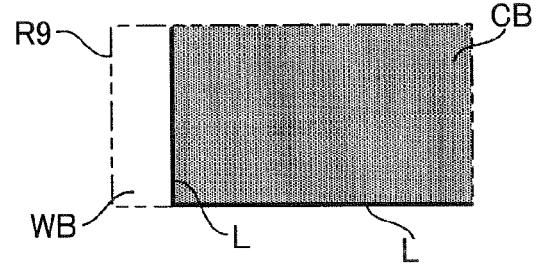
Figure 30D:
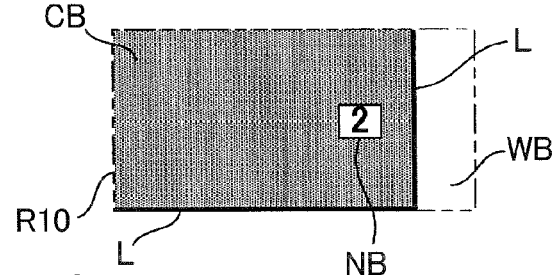
Figure 30E:
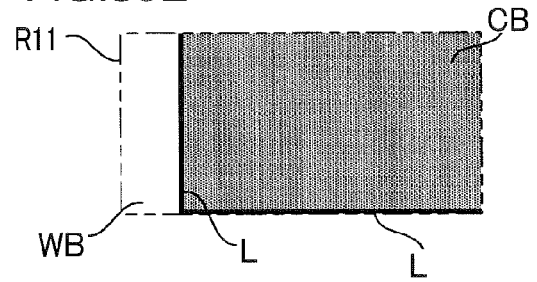
Figure 30F:
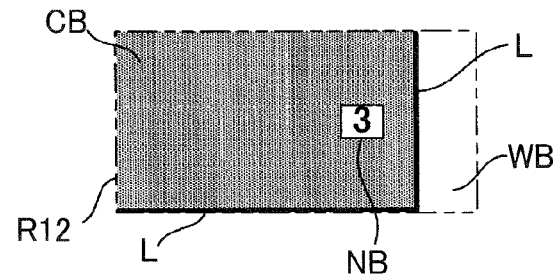
Figure 30G:
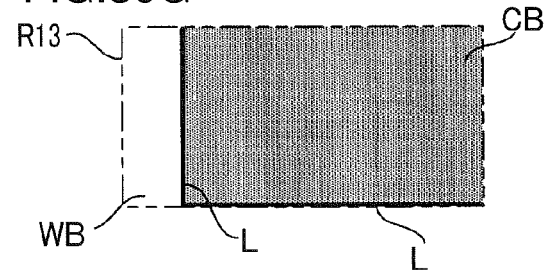
Figure 30H:
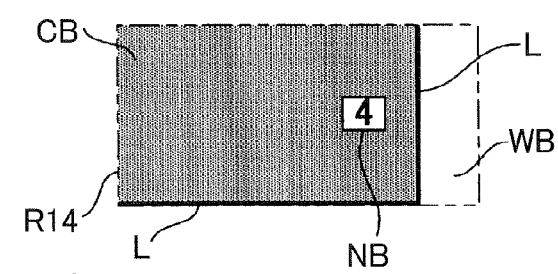
Figure 30I:
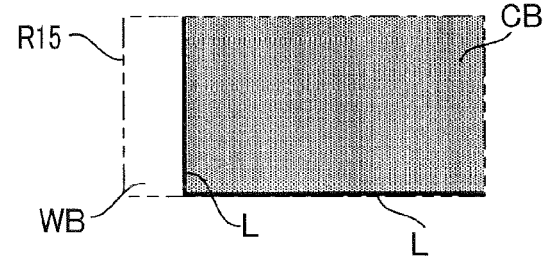
Figure 30J:
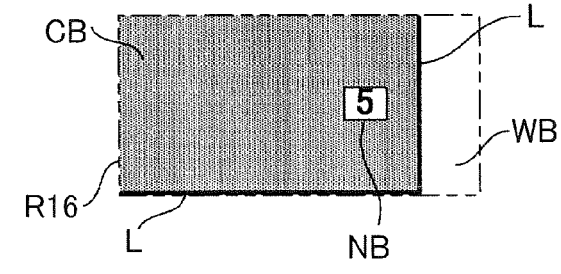

FIG. 28 schematically shows a display screen 100*d* of the liquid crystal display device 100 in accordance with the fourth embodiment. The dotted lines of a lattice-like pattern shown in FIG. 28 are grid lines which are virtually defined on the display screen 100*d*. The grid lines vertically and horizontally partitions pixels arranged on the display screen 100*d* into lattices each having at a predetermined number of pixels.

In the present embodiment, a plurality (sixteen areas in this example) of divisional areas R1 through R16 are defined on the display area A of the display screen 100*d*, and each rectangular part constituting the smallest unit indicated by the two-dotted chain lines in FIG. 28 corresponds to one divisional area. Each of the divisional areas R1 through R16 includes lattices partitioned into three lines and six columns by the grid lines. Further, the divisional areas R1 through R16 are arranged adjacent to each other on the display screen 100*d*. In this example, sixteen divisional areas R1 through R16 in total are arranged, where there are eight lines and two columns. It should be understood that the grid lines and two-dotted chain lines indicating the divisional areas R1 through R16 are not displayed on the actual display screen 100*d*.

Next, FIGS. 29 and 30 show specific examples of the individual display data. FIGS. 29A through 29F show individual display data corresponding respectively to the upper six (three lines by two columns) divisional areas R1 through R6 of the display screen 100*d*. Further, FIGS. 30A through 30J show individual display data corresponding respectively to the ten (five lines by two columns) divisional areas R7 through R16 continuing downward. These individual display data are stored in the display data memory 413 in a form of raster data (for example, bitmap of 16 bit color, monochromatic gradations, monochromatic binary, or the like).

The individual display data mainly include blank portions D1 and image portions D2. In FIGS. 29A, 29C, 29E, 30A, 30C, 30E, 30G, and 30I, respective blank portions D1 are positioned on the left side, and respective image portions D2 are positioned on the right side. On the other hand, in FIGS. 29B, 29D, 29F, 30B, 30D, 30F, 30H, 30J, respective blank portions D1 are positioned on the right side, and respective image portions D2 are positioned on the left side.

Among those, the blank portions D1 are areas for displaying blank (white image) on corresponding pixels on the display screen 100*d*, and the blank portions D1 include white data WB. Further, the image portions D2 are areas for displaying a configuration image of the image forming apparatus 1*d* (or sheet-supplying section 50) on the display screen 100*d*, and the image portions D2 include color data CB and line data L. It should be understood that the data named "line data L" herein is not vector data but raster data.

The six individual display data shown in FIGS. 29A through 29F are arranged and synthesized to be a single image to form a configuration image of the main body 2 as a whole. Further, each pair of individual display data positioned horizontally adjacent to each other in FIGS. 30A through 30J are arranged and synthesized to be a single image to form a configuration image of the sheet-supplying section 50 as a whole.

Further, as shown in FIGS. 30B, 30D, 30F, 30H, and 30J, each of the individual display data corresponding to the lower divisional areas R8, R10, R12, R14, and R16 on the right hand column includes icon-like graphic data NB in its image portion D2 in addition to the color data CB and the line data L. These graphic data NB are adapted to visually display the cassette numbers such as "1" through "5" on the display screen 100*d*. It should be understood that the numbers "1" through "5" drawn in the graphic data NB are raster images, and they are not constituted by fonts.

FIG. 31 shows an example of table data in accordance with the fourth embodiment. The table data associates one of a plurality of ranks (here, four ranks of "A" through "D") with each of the sixteen divisional areas R1 through R16. Among those, the rank "A" is associated with individual display data of "NONE." Further, the rank "B" is associated with individual display data of "BITMAP a" shown as examples in FIGS. 29 and 30. The rank "C" is associated with individual display data of another "BITMAP b." It should be understood that a content of individual display data associated with the rank "D" is not given, but the rank "D" may be associated with individual data of "BITMAP c" as an option.

The table data designates association of "A" through "D" with each of the divisional areas in accordance with a configuration pattern of the system. In FIG. 31, the ranks designated for the divisional areas are shown with shades. As described above, when a configuration of a combination of the main body 2 and another additional sheet-supplying section 50 is standard, the system configuration pattern shown in FIG. 26 includes four sheet-supplying sections 50 additionally coupled to the standard configuration (combination of the main body 2 and one sheet-supplying section 50).

The table data shown in FIG. 31 corresponds to the above-described configuration pattern. In this case, it can be seen that the rank "B" is designated for all of the divisional areas R1 through R16. In this case, individual display data of "BITMAP a" shown as example in FIGS. 29 and 30 is associated with all of the divisional areas R1 through R16.

Figure 32:
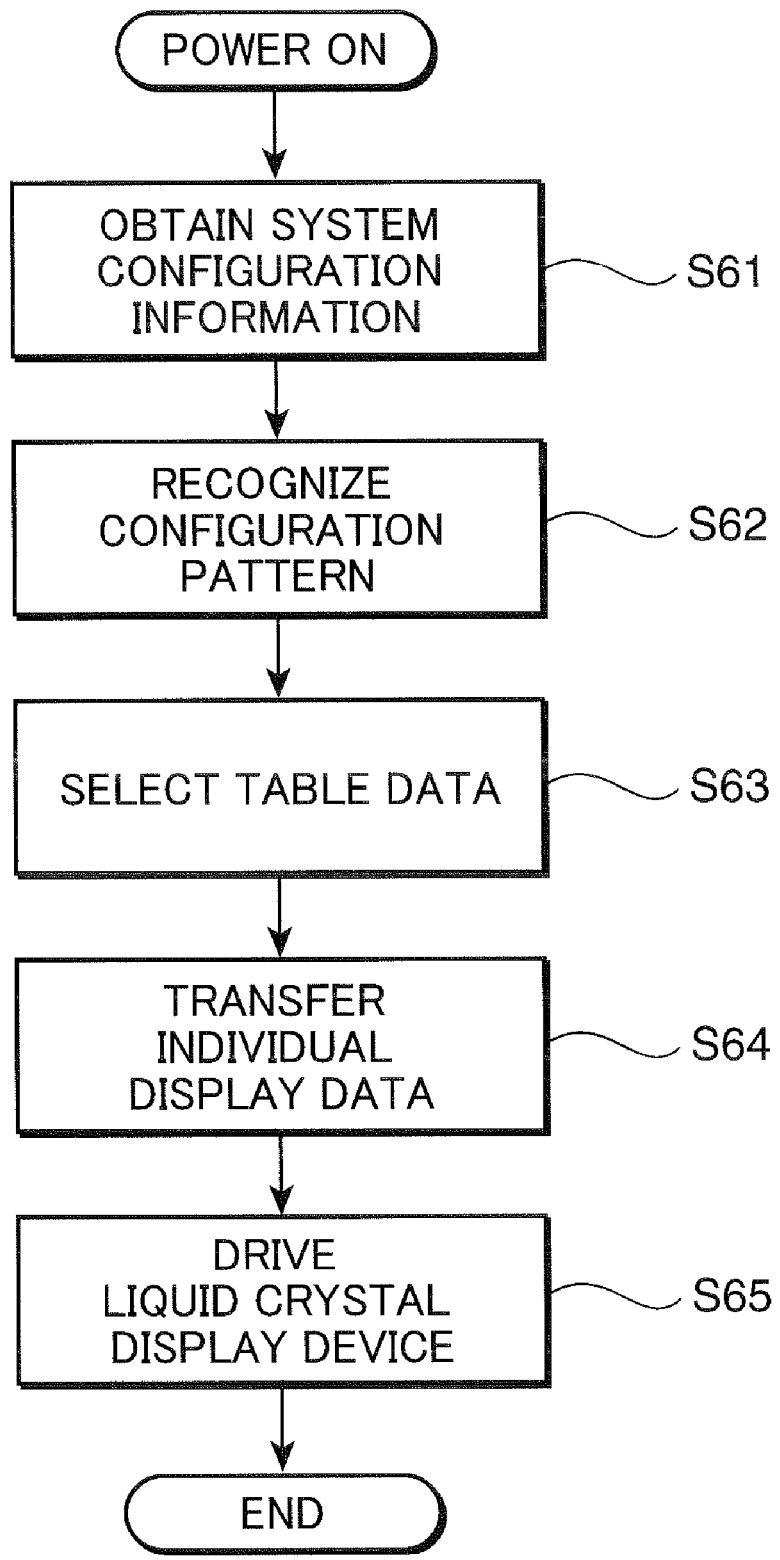
FIG. 32 is a flowchart illustrating a display control sequence executed in a display controller in accordance with the fourth embodiment.

Next, a display control sequence executed in the display controller 410 in accordance with the fourth embodiment will be described. FIG. 32 is a flowchart illustrating the display control sequence executed in the display controller 410 in accordance with the fourth embodiment.

When a power of the image forming apparatus 1*d* is turned on, the main body controller 420 performs a predetermined initialization processing, and thereafter creates system configuration information with reference to connection signals of the option connector 430. Further, the display controller 410 executes a predetermined initialization processing and thereafter shifts to the display control sequence. Hereinafter, it will be described by following the order of steps.

Firstly, in step S61, the CPU 411 of the display controller 410 obtains system configuration information transmitted from the main body controller 420. Next, in step S62, the CPU 411 of the display controller 410 recognizes a configuration pattern (0 through N) of the image forming apparatus 1*d* from the system configuration information, and cashes the same.

Next, in step S63, the CPU 411 of the display controller 410 accesses the table data memory 414 and selects table data which corresponds to the identified configuration pattern (0 through N). The selected table data is stored into, for example, the RAM 415.

Next, in step S64, the CPU 411 of the display controller 410 refers to table data on the RAM 415, accesses the display data memory 413, and then transfers the read individual display data to the LCD controller 412. At this time, the CPU 411 designates read-out individual display data in accordance with the ranks "A" through "D" designated in the table data for the divisional areas R1 through R16.

Next, in step S65, the LCD controller 412 of the display controller 410 drives the liquid crystal display device 100 in accordance with the transferred individual display data.

Figure 33:
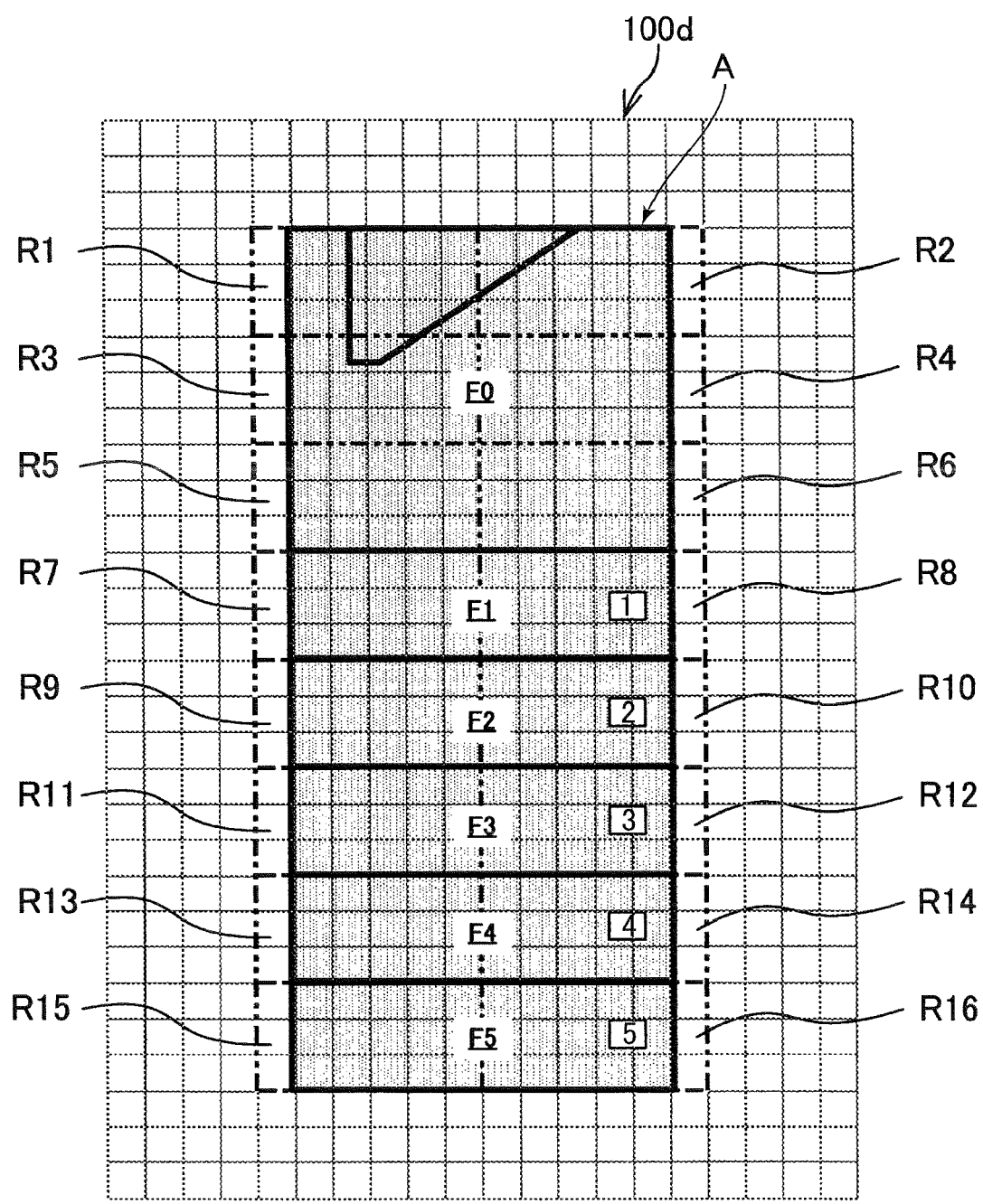
FIG. 33 illustrates a first example of a display operation of the liquid crystal display device, which is performed with execution of the display control sequence shown in FIG. 32.
Figure 34A:
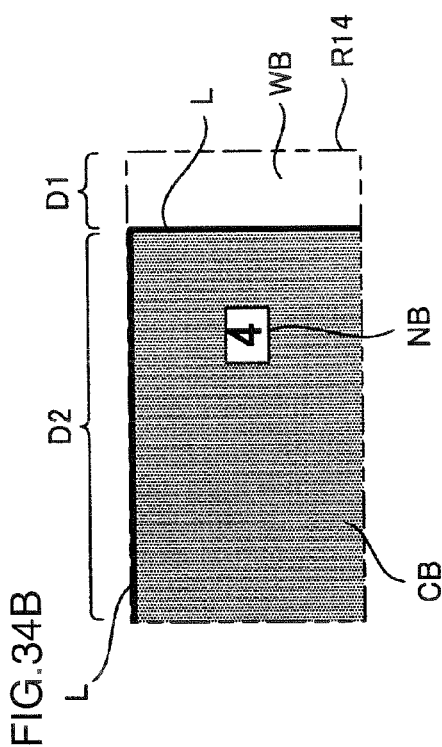
FIG. 34 shows individual display data of a second example of the display operation in accordance with the fourth embodiment.
Figure 34B:
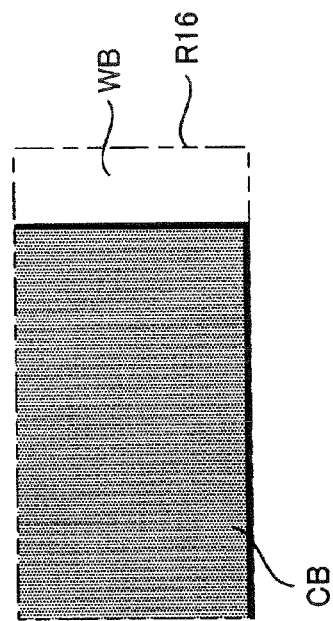
Figure 34C:
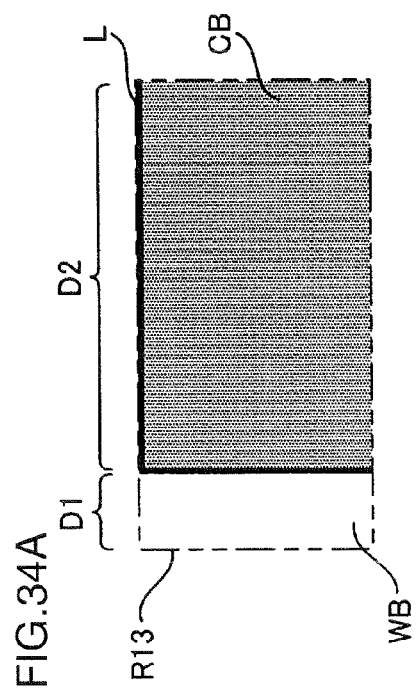
Figure 34D:
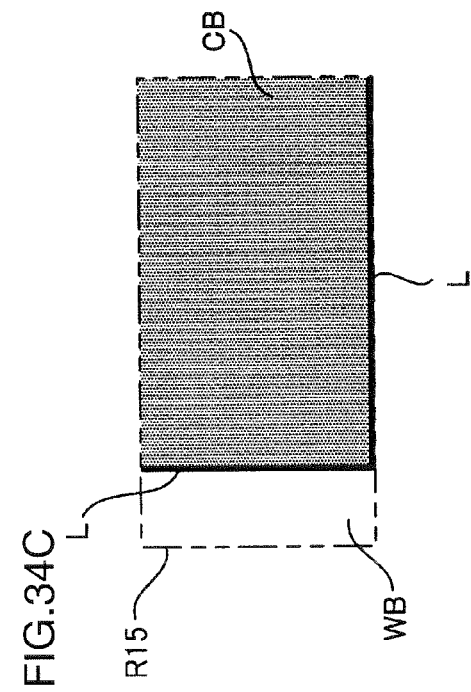

FIG. 33 illustrates a first example of the display operation of the liquid crystal display device 100, which is performed with execution of the display control sequence shown in FIG. 32. The first example of the display operation is associated with the system configuration (configuration pattern 5) in which four sheet-supplying sections 50 are added to the standard configuration of the image forming apparatus 1d.

According to this system configuration, the table data shown in FIG. 31 is selected in step S63, and all of the divisional areas R1 through R16 of the display area A of the display screen 100d are associated with the individual display data of "BITMAP a". As a result, the bitmap images shown in FIGS. 29A through 29F are displayed respectively on the divisional areas R1 through R6. Therefore, synthesizing these bitmap images allows a configuration image F0 simulating a configuration of the main body 2 to be displayed. Further, the bitmap images shown in FIGS. 30A through 30J are displayed respectively on the divisional areas R7 through R16. At this time, each of horizontally adjacent pairs of divisional areas R7, R8, divisional areas R9, R10, divisional areas R11, R12, divisional areas R13, R14, and divisional areas R15, R16 is synthesized, so that configuration images F1 through F5 each simulating a configuration of the sheet-supplying section 50 are displayed. Then, the configuration images F0 through F5 are synthesized on the display screen 100d, so that a configuration image simulating an overall system configuration of the image forming apparatus 1d is displayed.

Next, a second example of display operation of the liquid crystal display device 100, which is performed with execution of the display control sequence will be described. In the example of second display operation, individual display data of another "BITMAP b" is used in addition to the "BITMAP a".

FIG. 34 shows individual display data of a second example the display operation in accordance with the fourth embodiment. The individual display data of "BITMAP b" shown in FIG. 34 is associated with the divisional areas R13 through R16 on the display screen 100d. If the four individual display data shown in FIGS. 34A through 34D arranged and synthesized into one image, the image constitutes a configuration image of a large-capacity sheet-supplying section as a whole. The large-capacity sheet-supplying section is an optional attachment having a capacity of twice larger than that of the sheet-supplying section 50, and its size corresponds to that of two sheet-supplying sections 50 arranged vertically.

FIG. 35 shows table data of the second example of the display operation in accordance with the fourth embodiment. The table data shown in FIG. 35 corresponds to a system configuration (configuration pattern 6) in which two sheet-supplying sections 50 are coupled in addition to the standard system configuration, and the above-described large-capacity sheet-supplying section is optionally coupled. It should be understood that the large-capacity sheet-supplying section is coupled at a position of the lowermost layer.

According to the table data shown in FIG. 35, the rank "B" is designated for the divisional areas R1 through R12, but the rank "C" is designated for other divisional areas R13 through R16. In this case, the divisional areas R1 through R12 are associated with the individual data of "BITMAP a", and other divisional areas R13 through R16 are associated with the individual display data of "BITMAP b".

Figure 36:
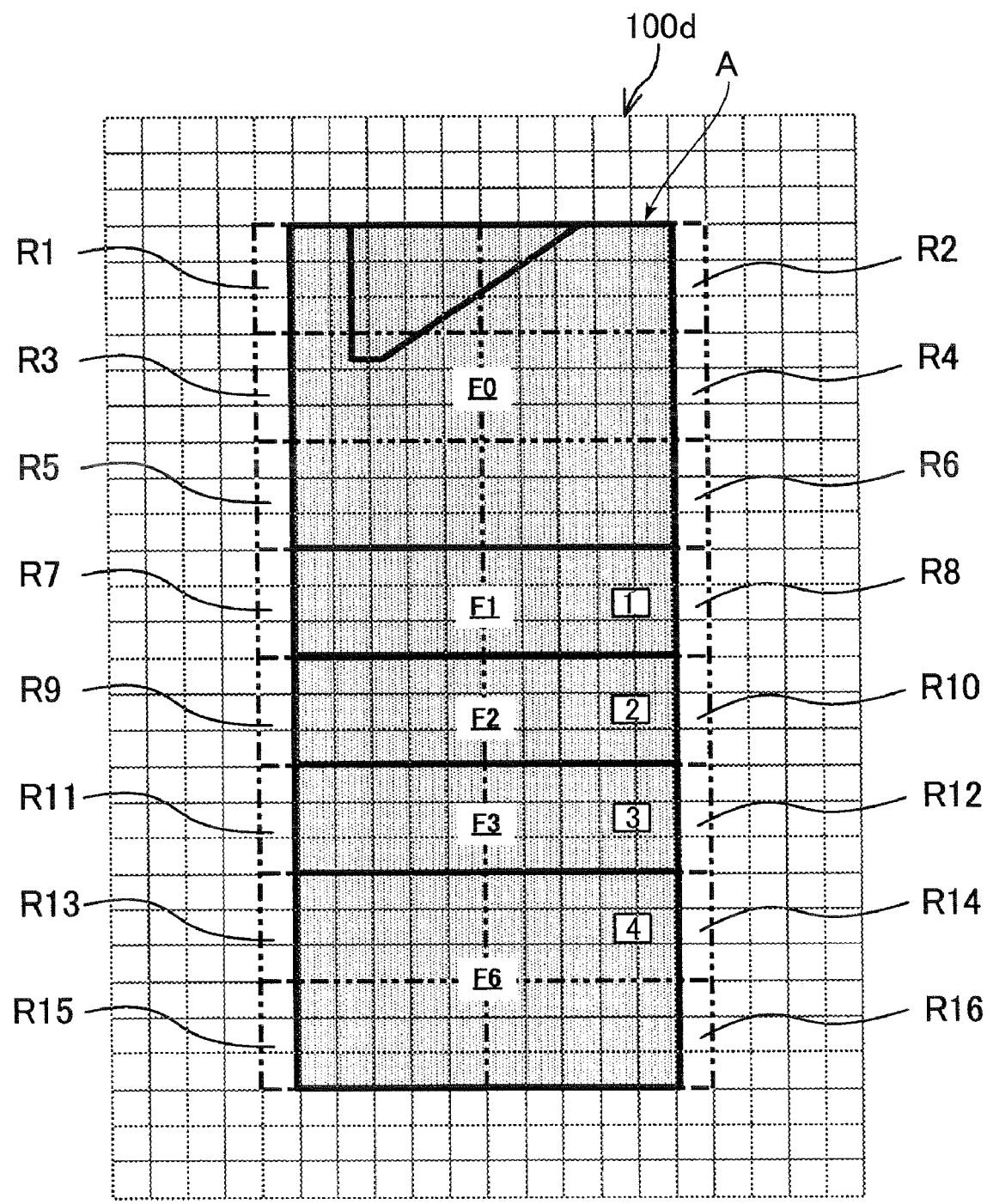
FIG. 36 shows a display screen of the liquid crystal display device in the second example of the display operation in accordance with the fourth embodiment.

FIG. 36 shows a display screen of the liquid crystal display device 100 in the second example of the display operation in accordance with the fourth embodiment. In this case, bitmap images are displayed on the divisional areas R1 through R6 of the display area A of the display screen 100d in accordance with the individual display data of "BITMAP a". Therefore, when these images are synthesized, a configuration image F0 simulating a configuration of the main body 2 is displayed. Further, also on the lower six divisional areas R7 through R12, bitmap images are displayed in accordance with the individual display data of "BITMAP a". Therefore, synthesizing each of the horizontally adjacent pairs of divisional areas R7, R8, divisional areas R9, R10, and divisional area R11, R12 allows configuration images F1 through F3 each simulating a configuration of the sheet-supplying section 50 to be displayed. On other four divisional areas R13 through R16, bitmap images are displayed in accordance with individual display data of "BITMAP b". Therefore, synthesizing those allows a configuration image F6 simulating a configuration of the large-capacity sheet-supplying section to be displayed. As a result, synthesizing the configuration images F0 through F3 and F6 allows a configuration image simulating an overall system configuration of the image forming apparatus 1d to be displayed as a whole on the display screen 100d.

Next, a third example of the display operation of the liquid crystal display device 100, which is performed with execution of the display control sequence will be described. FIG. 37 shows table data used in the third example of the display operation in accordance with the fourth embodiment. The table data shown in FIG. 37 corresponds to a system configuration (referred to as configuration pattern 2) in which one sheet-supplying section 50 is optionally coupled in addition to the standard system configuration.

In the table data shown in FIG. 37, the rank "B" is designated for the divisional areas R1 through R10, but the rank "A" is designated for other divisional areas R11 through R16. In this case, the individual display data of "BITMAP a" is associated with the divisional areas R1 through R10, but individual display data of "NONE" is associated with other divisional areas R11 through R16. It should be understood that the individual display data of "NONE" indicates that all of pixels have white data WB on the display data memory 413, or it is blank data (=0).

Figure 38:
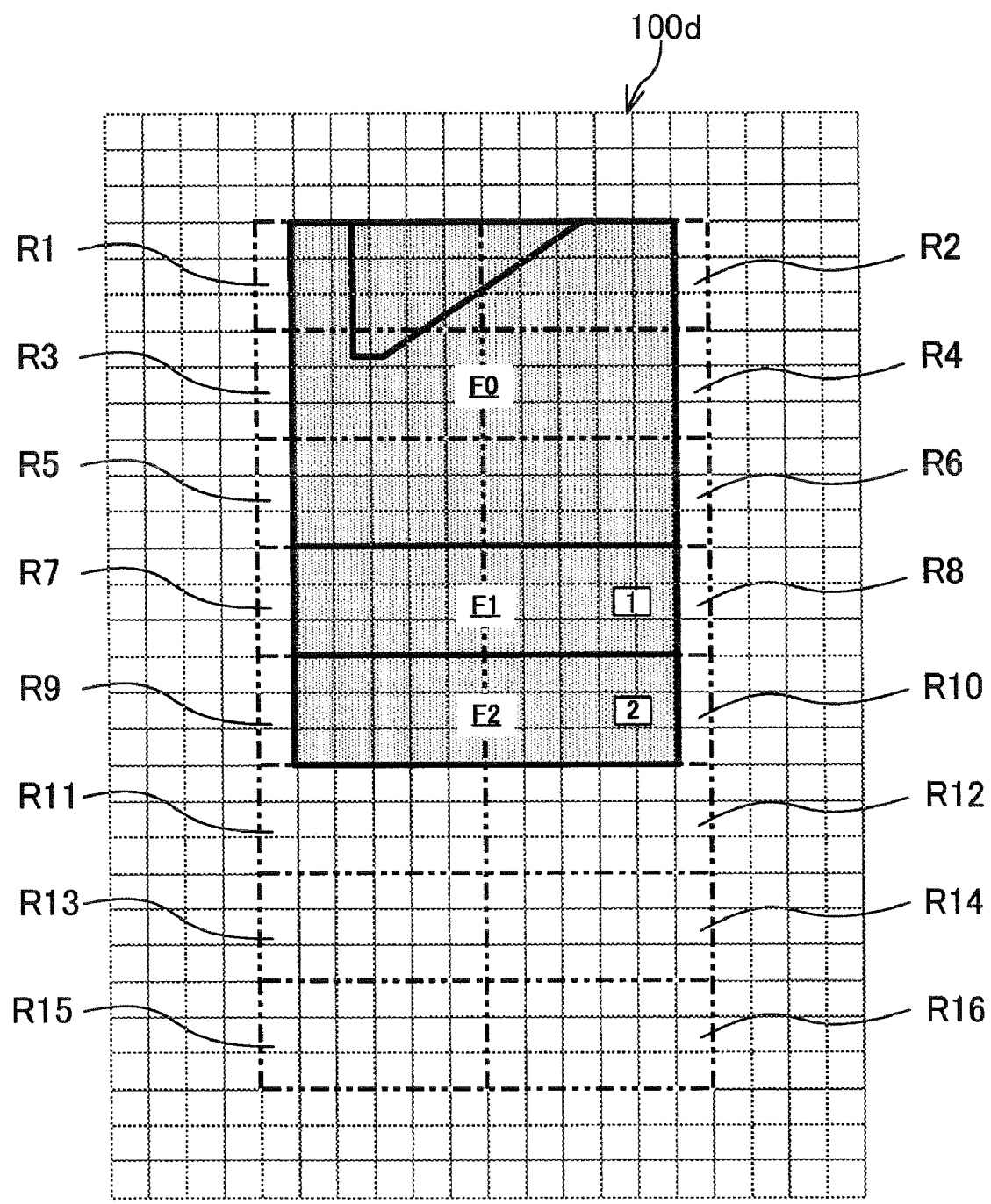
FIG. 38 shows a display screen of the liquid crystal display device in the third example of the display operation in accordance with the fourth embodiment.

FIG. 38 shows a display screen of the liquid crystal display device 100 in the third example of the display operation in accordance with the fourth embodiment. In this case, bitmap images are displayed on the divisional areas R1 through R6 of the display area A of the display screen 100d in accordance with individual display data of "BITMAP a". Therefore, synthesizing these images allows the configuration image F0 simulating the configuration of the main body 2 to be displayed. Further, bitmap images are displayed on the lower four divisional areas R7 through R10 in accordance with the individual display data of "BITMAP a". Therefore, synthesizing each horizontally adjacent pair of divisional areas R7, R8, and divisional areas R9, R10 allows configuration images F1, F2 each simulating the sheet-supplying section 50 to be displayed. Then, on other six divisional areas R11 through R16, display contents are determined in accordance with the individual display data of "NONE". Therefore, nothing is displayed on the display screen 100d, or blank image is displayed. As a result, synthesizing the configuration images F0 through F2 allows a configuration image simulating an overall system configuration of the image forming apparatus 1d as whole to be displayed on the display screen 100d.

Next, a fourth example of the display operation of the liquid crystal display device 100, which is performed with execution of the display control sequence will be described. FIG. 39 shows table data used in the fourth example of the display operation in accordance with the fourth embodiment.

The table data shown in FIG. 39 corresponds to the standard system configuration (configuration pattern 0) without any option.

In the table data shown in FIG. 39, the rank "B" is designated for the divisional areas R1 through R8, but the rank "A" is designated from other areas divisional areas R9 through R16. In this case, the individual display data of "BITMAP a" is associated with the divisional areas R1 through R8, but the individual display data of "NONE" is associated with other divisional areas R9 through R16.

Figure 40:
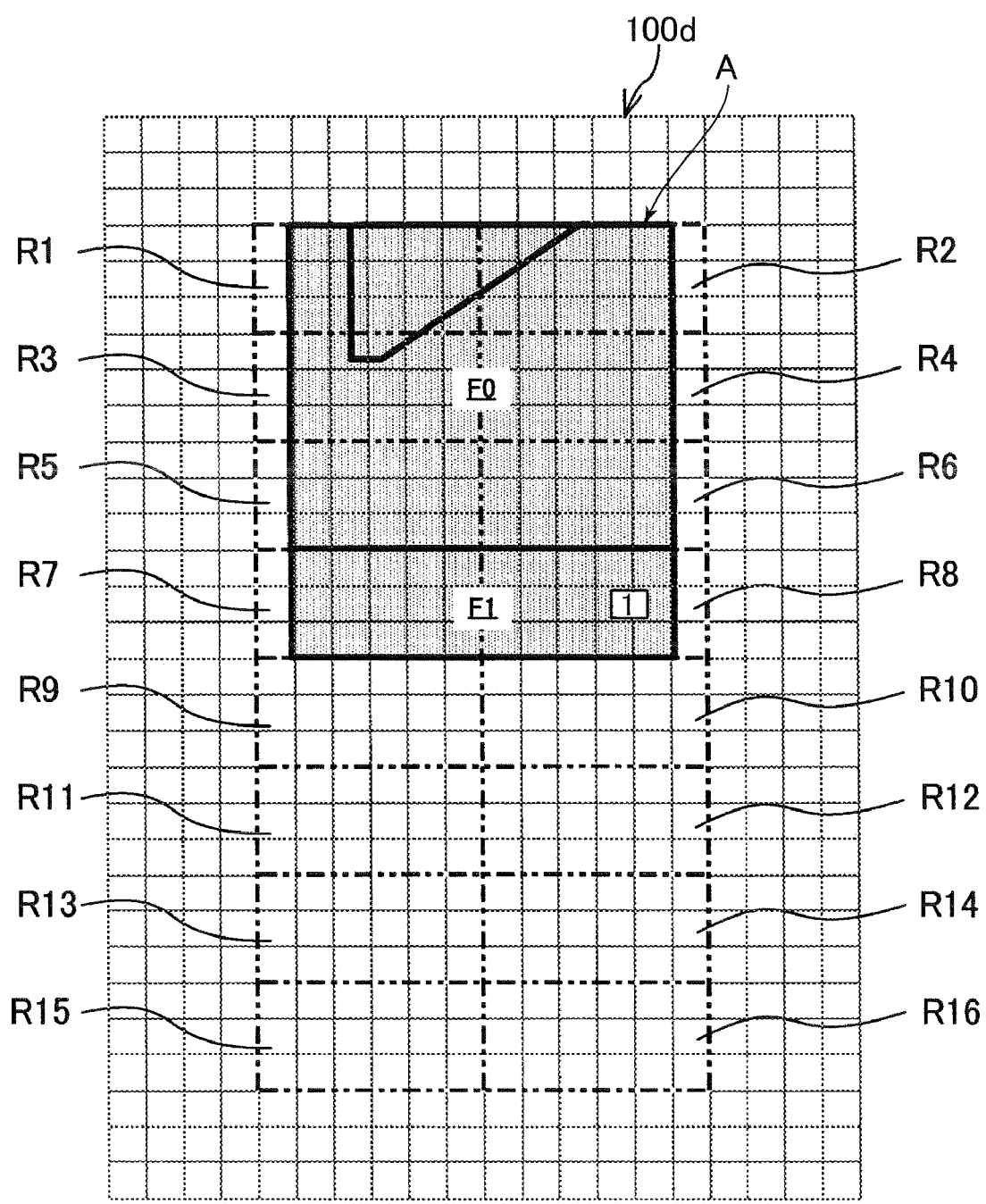
FIG. 40 shows a display screen of the liquid crystal display device in the fourth example of the display operation in accordance with the fourth embodiment.

FIG. 40 shows a display screen of the liquid crystal display device 100 in the fourth example of the display operation in accordance with the fourth embodiment. In this case, bitmap images are displayed on the divisional areas R1 through R6 of the display area A of the display screen 100d in accordance with the individual display data of "BITMAP a". Therefore, synthesizing these images allows a configuration image F0 simulating the configuration of the main body 2 to be displayed. Further, bitmap images are displayed on the lower two divisional areas R7, R8 in accordance with the individual display data of "BITMAP a". Therefore, synthesizing these images allows the configuration image F1 simulating the configuration of the sheet-supplying section 50 to be displayed. Then, display contents are determined in accordance with the individual display data of "NONE" on other eight divisional areas R9 through R16. Therefore, nothing is displayed on the display screen 100d, or blank is displayed. As a result, synthesizing the configuration images F0, F1 allows a configuration image simulating the standard system configuration of the image forming apparatus 1d as a whole is displayed on the display screen 100d.

As described above, in the present embodiment, a plurality of divisional areas R1 through R16 are defined on the display area A of the display screen 100d, and individual display data associated with each of the divisional areas R1 through R16 is stored in the display data memory 413. Then, when the system configuration of the image forming apparatus 1d changes in a plurality of ways, table data stored in the table data memory 414 for each of the configuration patterns is referred, and display contents on the divisional areas R1 through R16 are determined in accordance with the individual display data associated in accordance with the table data.

In the present embodiment, the individual display data (for example, "BITMAP a" and "BITMAP b") associated with the divisional areas R1 through R16 have the same amount (data capacity). Therefore, it becomes easy to maintain or manage when memory areas are reserved, or when address is designated in the display data memory 413.

Further, like the large-capacity sheet-supplying section, even when an attachment having a configuration (size) different from other sheet-supplying section 50 is used, it would be enough to add the individual display data having the same data capacity for each corresponding display area on the display screen 100d. Accordingly, construction of new individual display data becomes easy, and maintenance and management also become easy.

The present invention is not limited to the above-described embodiment, and it can be modified in various ways for practice. In the system configuration according to the present embodiment, the sheet storage section 4 is provided in the main body 2. However, it is not necessary to provide the sheet storage section 4 in the main body 2.

Further, the present embodiment shows a configuration pattern in which the sheet-supplying section 50 is standardly provided in the main body 2. However, the image forming apparatus 1d may have a standard system configuration including only the main body 2.

The table data of the first through fourth examples of the display operation are just preferred examples. They can be desirably modified for practice. Further, when the system configuration pattern changes, other table data is surely prepared in accordance with the change.

In the present embodiment, the sheet-supplying section 50 and the large-capacity sheet-supplying section are described as examples of the attachment, but it may have a configuration in which an image reading device and a finisher (post-processing device) are coupled to the main body 2 as other attachment.

Further, in the present embodiment, the liquid crystal display device 100 is provided on the main body 2. However, the liquid crystal display device 100 and the like may be provided on attachment such as the image reading device, the finisher, or the like.

Furthermore, in the present embodiment, a printer is described as an example of the image forming apparatus 1d. However, the image forming apparatus may be a copying machine, a facsimile machine, a complex machine, or the like.

The above-described embodiments include the invention having the following configurations.

An image forming apparatus in accordance with one aspect of the present invention comprises: a main body for printing an image formed in accordance with image data onto a medium; an attachment coupled to the main body; a data storage portion for storing as display data a configuration image simulating an overall configuration of a combination of the main body and the attachment; an image display device including a display screen having a display area divided into a plurality of divisional areas for displaying the configuration image, the image display device being provided on either one of the main body and the attachment; and a controller for determining displaying and non-displaying on each of the plurality of divisional areas, and controlling the display device to allow a part of the configuration image to be displayed in accordance with the display data on a divisional area which is determined to display, and to allow an other part of the configuration image not to be displayed on a divisional area which is determined not to be displayed.

According to this configuration, the main body has a function to print an image formed in accordance with image data onto a medium. Further, the attachment is coupled to the main body to, for example, supplement a function of the main body or add another function. In this case, the image forming apparatus is constituted by a system having the main body and the attachment which associate with each other for operation. The data storage portion stores as display data a configuration image simulating an overall configuration of a combination of the main body and the attachment. On either one of the main body and the attachment, there is provided the image display device including a display screen having a display area divided into a plurality of divisional areas for displaying the configuration image. Displaying and non-displaying on each of the plurality of divisional areas is determined, and the image display device is controlled to allow a part of the configuration image to be displayed on a divisional area which is determined to display, and to allow an other part of the configuration image not to be displayed on a divisional area which is determined not to be displayed.

Thus, determining displaying and non-displaying on each of the plurality of divisional areas allows a plurality of kinds of configuration images to be displayed with use of one kind of display data. Therefore, even when an overall configuration of a combination of the main body and the attachment constituting the image forming apparatus changes, controlling displaying and non-displaying on divisional areas in accordance with the change allows a configuration image to be displayed in conformity with various configurations of the image forming apparatus. Further, even when a configuration of the image forming apparatus, it would be enough to always use one kind of display data. Therefore, it would not be necessary to read a plurality of display data and arrange these on a memory space to construct transfer data in conformity with a configuration of the image forming apparatus, so that a load required for data transfer and data processing is reduced. Consequently, the data transfer and data processing can be performed efficiently.

Further, in the above-described image forming apparatus, it is preferable that the controller includes: a display determining portion for determining displaying and non-displaying on each of the plurality of divisional areas; and a display controller for controlling the image display device to allow a part of the configuration image to be displayed in accordance with the display data on a divisional area which is determined to display by the display determining portion, and to allow an other part of the configuration image not to be displayed on a divisional area which is determined not to be displayed by the display determining portion.

According to this configuration, the display determining portion determines displaying and non-displaying on each of the plurality of divisional areas. Further, the display controller controls the image display device to allow a part of the configuration image to be displayed in accordance with the display data on a divisional area which is determined to display by the display determining portion, and to allow an other part of the configuration image not to be displayed on a divisional area which is determined not to be displayed by the display determining portion.

Thus, displaying and non-displaying on each of the plurality of divisional areas is determined, and displaying and non-displaying is controlled in accordance with the determination result, so that an overall configuration of a combination of the main body and the attachment included in the image forming apparatus can be easily presented to a user.

Further, in the above-described image forming apparatus, it is preferable that the data storage portion stores as display data a configuration image simulating a combination of the main body and a maximum number of attachments.

According to this configuration, a configuration image simulating an overall system configuration is displayed on the display screen, and the configuration image is displayed in accordance with one kind of display data corresponding a combination of the main body and a maximum number of attachments. Then, displaying and non-displaying on each of the plurality of divisional areas is determined. Therefore, a plurality of patterns of configuration images can be displayed with use of one kind of display data.

Further, the display data is adapted to display an overall configuration image of the image forming apparatus having the main body and a maximum number of attachments which can be coupled to the main body, but a part of the display data is not displayed on a divisional area which is determined not to be displayed on the display screen. Accordingly, a configuration image corresponding to the attachment can be partially not displayed on the actual screen. Therefore, switching displaying and non-displaying on each of the divisional areas in accordance with existence and non-existence of the attachment allows a configuration image of the image forming apparatus including the main body without any attachment coupled thereto to be displayed on the screen, or allows configuration images corresponding to a plurality of patterns of configurations having one through a maximum number of attachments coupled to the main body to be displayed on the screen.

Further, in the above-described image forming apparatus, it is preferable that the image forming apparatus further comprises a configuration detecting portion for detecting an attachment which is actually coupled to the main body, and the display determining portion determines displaying and non-displaying on each of the divisional areas in accordance with a detection result provided by the configuration detecting portion.

According to this configuration, an attachment which is actually coupled to the main body is detected, and displaying and non-displaying on each of the divisional areas is determined in accordance with a detection result. Therefore, a configuration image truly simulating an overall configuration of the actual image forming apparatus can be displayed assuredly.

Further, in the above-described image forming apparatus, it is preferable that the image forming apparatus further comprises a mask pattern storage portion for storing a plurality of mask patterns each presenting displaying and non-displaying on each of the divisional areas in accordance with a configuration pattern of the main body and the attachment of the image forming apparatus, and the display determining portion selects a mask pattern corresponding to a configuration pattern which is determined in accordance with the detection result provided by the configuration detecting portion from the plurality of mask patterns stored in the mask pattern storage portion, and determines displaying and non-displaying on each of the divisional areas in accordance with the selected mask pattern.

According to this configuration, the mask pattern storage portion stores a plurality of mask patterns each presenting displaying and non-displaying on each of the divisional areas in accordance with a configuration pattern of the main body and the attachment of the image forming apparatus. Then, the display determining portion selects a mask pattern corresponds to a configuration pattern which is determined in accordance with the detection result from the plurality of mask patterns stored in the mask pattern storage portion, and displaying and non-displaying on each of the divisional areas is determined in accordance with the selected mask pattern.

Thus, since a plurality of mask patterns each presenting displaying and non-displaying on each divisional area are stored, and a mask pattern corresponding to a configuration pattern of the main body and attachment of the actual image forming apparatus is selected from the plurality of mask patterns, displaying and non-displaying on each divisional area can be easily determined.

Further, in the above-described image forming apparatus, it is preferable that the data storage portion stores as display data the configuration image in a combination of a plurality of individual images simulating respective configurations of the main body and the attachment, and the display area is divided into a plurality of divisional areas corresponding to the individual images to be displayed on the display area.

According to this configuration, each divisional area corresponds to an individual image simulating a configuration of the main body or an individual image simulating an attachment on the display screen. Therefore, displaying and non-displaying on each divisional area can be switched in accordance with existence and non-existence of the attachment in an actual configuration of the image forming apparatus.

Further, in the above-described image forming apparatus, it is preferable that the controller includes: a data accumulating portion for accumulating display data for allowing the image display device to display an image on the display screen; a data transferring portion for transferring the display data stored in the data storage portion to the data accumulating portion and allowing the data storage portion to accumulate the display data; a control instructing portion for instructing the image display device to display the configuration image on the display screen, and determining displaying and non-displaying on each of the divisional areas, and outputting a control instruction signal of instructing displaying and non-displaying on each of the divisional areas; and a display controller for controlling an operation of the image display device in accordance with display data stored in the data accumulating portion and switching displaying and non-displaying on each of the plurality of divisional areas in accordance with the control instruction signal when the control instruction signal outputted from the control instructing portion is inputted.

According to this configuration, the data accumulating portion accumulates display data for allowing the image display device to display an image on the display screen, and the display data stored in the data storage portion is transferred to the data accumulating portion and stored. The control instructing portion instructs the image display device to display the configuration image on the display screen, and determines displaying and non-displaying on each of the divisional areas, and outputs a control instruction signal of instructing displaying and non-displaying on each of the divisional areas. When the control instruction signal outputted from the control instructing portion is inputted, the display controller controls an operation of the display device in accordance with display data accumulated in the data accumulating portion and switches displaying and non-displaying on each of the plurality of divisional areas in accordance with the control instruction signal.

Thus, when an instruction of displaying a configuration image is given, a configuration image is directly displayed on a divisional area which is instructed to display a configuration image, but a configuration image is not displayed on a divisional area which is instructed not to display a configuration image. In other words, since one kind of display data is accumulated in the data accumulating portion, but display data is not displayed on a divisional area which is not necessary to display on the screen, a plurality of patterns of configuration images can be displayed by switching of displaying and non-displaying.

Therefore, if the display data is transferred from the data storage portion and accumulated in the data accumulating portion once, displaying and non-displaying on each of the divisional areas can be switched in accordance with actual existence and non-existence of the attachment by instructing displaying and non-displaying on each divisional area when the system configuration of the image forming apparatus is changed. As a result, a configuration image of the image forming apparatus including only the main body without any attachment coupled thereto or a configuration image corresponding to a plurality of configurations of the image forming apparatus to which one through a maximum number of attachments are coupled to the main body can be displayed on the screen.

Further, in the above-described image forming apparatus, it is preferable that the image forming apparatus further comprises a configuration detecting portion for detecting an attachment actually coupled to the main body, and the control instructing portion creates a control instruction signal of instructing displaying and non-displaying on each of the divisional areas in accordance with a detection result provided by the configuration detecting portion.

According to this configuration, an attachment actually coupled to the main body is detected, and displaying and non-displaying on each of the divisional areas is instructed in accordance with a detection result. Accordingly, a configuration image truly simulating an actual overall configuration of the image forming apparatus can be displayed assuredly.

Further, in the above-described image forming apparatus, it is preferable that the data storage portion stores as display data configuration image of a combination of a plurality of individual images simulating respective configurations of the main body and the attachment, and the display area is divided into a plurality of divisional areas corresponding to the individual images to be displayed on the display area.

According to this configuration, since each of the divisional areas corresponds to an individual image simulating the main body or an individual image simulating an attachment on the display screen, displaying and non-displaying on each divisional area can be switched in accordance with existence and non-existence of an actual configuration of the image forming apparatus.

An image forming apparatus according to another aspect of the present invention comprises: a main body for printing an image formed in accordance with image data onto a medium; an attachment coupled to the main body; a data storage portion for defining a plurality of configuration patterns of the main body and the attachment, and storing as a plurality of display data configuration images simulating overall configurations of combinations of the main body and the attachment arranged in a plurality of configuration patterns; an image display device including a display screen having a display area divided into a plurality of divisional areas for displaying the overall configuration image, the image display device being provided on either one of the main body and the attachment; a data accumulating portion for accumulating display data for allowing the image display device to display an image on the display screen; a display content determining portion for determining a display content displayed on each of the plurality of divisional areas; a data transferring portion for selecting display data including a display content to be displayed on each of the divisional areas from among a plurality of display data stored in the data storage portion in accordance with a determination result provided by the display content determining portion, and transferring the display data of each of the divisional areas to the data accumulating portion, and allowing the data accumulating portion to accumulate the display data; and a display controller for allowing the configuration image to be displayed on the display screen in accordance with the display data accumulated in the data accumulating portion.

According to this configuration, the main body has a function to print an image formed in accordance with image data onto a medium. Further, the attachment is coupled to the main body to, for example, supplement a function of the main body or add another function. In this case, the image forming apparatus is constituted by a system including the main body and the attachment which are associated with each other for operation. The data storage portion defines a plurality of configuration patterns of the main body and the attachment, and stores as a plurality of display data configuration images simulating overall configurations of combinations of the main body and the attachment arranged in a plurality of configuration patterns. On either one of the main body and the attachment, the image display device is provided. The image display device includes a display screen having a display area divided into a plurality of divisional areas for displaying the configuration image. The data accumulating portion accumulates display data for allowing the image display device to display an image on the display screen. A display content displayed on each of the plurality of divisional areas is determined, and display data including a display content to be displayed on each of the divisional areas is selected from a plurality of display data stored in the data storage portion in accordance with a determination result, and the display data of each of the divisional area is transferred to the data accumulating portion and stored. Then, a configuration image is displayed on the display screen in accordance with the display data accumulated in the data accumulating portion.

Thus, since the display data of the configuration are stored for each of the plurality of configuration patterns, and display data of the configuration image are dynamically selected in accordance with an actual configuration pattern of the image forming apparatus, configuration images truly simulating overall configurations of the image forming apparatus in accordance with various configuration patterns can be displayed. Further, even in a case of displaying configuration images in conformity with various configuration patterns of the image forming apparatus, it would be enough to transfer display data to the data accumulating portion once. Therefore, it would not be necessary to perform data transfer many times when displaying a configuration image. Accordingly, a load required from data processing can be reduced, so that data transfer speed necessary for displaying a configuration image can be improved to make the data transfer be more efficient.

Further, in the above-described image forming apparatus, it is preferable that the image forming apparatus further comprises a configuration detecting portion for detecting an attachment actually coupled to the main body, and the display content determining portion determines a display content displayed on each of the divisional areas in accordance with the detection result provided by the configuration detecting portion.

According to this configuration, an attachment actually coupled to the main body is detected, and a display content to be displayed on each of the divisional areas is determined in accordance with a detection result. Accordingly, a configuration image truly simulating an actual overall configuration of the image forming apparatus can be displayed.

Further, in the above-described image forming apparatus, it is preferable that the data storage portion stores as display data a configuration image in a combination of a plurality of individual images simulating respective configurations of the main body and the attachment, and the display area is divided into a plurality of divisional areas along borders of the individual images to be displayed on the display area.

According to this configuration, since each divisional area corresponds to an individual image simulating a configuration of the main body or an individual image simulating a configuration of the attachment on the display screen, display data including a display content to be displayed can be selected for each divisional area in accordance with existence and non-existence of the attachment in an actual configuration of the image forming apparatus.

Further, in the above-described image forming apparatus, it is preferable that the display controller selects display data for each of the divisional areas, and extracts an individual image of a part of the display data corresponding the divisional area and synthesizes the individual images to allow the configuration image to be displayed on the display screen.

According to this configuration, display data is selected from each of the divisional areas, and individual images of parts of the display data corresponding to the selected divisional areas are extracted and synthesized. Accordingly, an overall configuration image of the image forming apparatus can be displayed on the display screen.

An image forming apparatus according to yet another aspect of the present invention comprises: a main body for printing an image formed in accordance with image data onto a medium; an image display device including a display screen having a display area divided into a plurality of divisional areas, the image display device being provided on the main body; a data storage portion for storing a plurality of individual display data corresponding respectively to the plurality of the divisional areas; and a display controller for allowing an image to be displayed on each of the divisional areas in accordance with the plurality of individual display data stored in the data storage portion to allow a configuration image simulating a configuration of the main body to be displayed on the display screen in a state such that the plurality of divisional areas are synthesized.

According to this configuration, the main body has a function to print an image formed in accordance with image data onto a medium. On the main body, the image display device is provided, and the image display device includes a display screen having a display area divided into a plurality of divisional areas. The data storage portion stores a plurality of individual display data corresponding respectively to the plurality of the divisional areas. An image is displayed on each divisional area in accordance with the plurality of individual display data stored in the data storage portion to allow a configuration image simulating a configuration of the main body to be displayed on the display screen in a state such that the plurality of divisional areas are synthesized.

Thus, since each individual display data corresponds respectively to divisional areas defined on the display screen, and an image is displayed on each of the plurality of divisional areas, they are synthesized as a result, and a configuration image of the main body is displayed. Therefore, it would not be necessary to construct individual display data for each component, such as the main body, of the image forming apparatus, and it would be enough to construct individual display data on each divisional area of the display screen. Consequently, construction, maintenance, and management of data can be made in an easier manner.

Further, in the above-described image forming apparatus, it is preferable that the image forming apparatus further comprises an attachment coupled to the main body, and the image display device is provided on either one of the main body and the attachment, and the display controller allows an image to be displayed on each of the divisional areas in accordance with the plurality of individual display data stored in the data storage portion to allow a configuration image simulating an overall configuration of a combination of the main body and the attachment to be displayed on the display screen in a state such that the plurality of divisional areas are synthesized.

According to this configuration, the attachment is coupled to the main body to, for example, supplement the function of the main body or add another function. In this case, the image forming apparatus is constituted by a system including the main body and the attachment associated with each other for operation. On any one of the main body and the attachment, the image display device is provided. The image display device includes a display screen having a display area divided into a plurality of divisional areas. Displaying images on divisional areas in accordance with the plurality of individual display data stored in the data storage portion allows a configuration image simulating an overall configuration of a combination of the main body and the attachment to be displayed on the display screen in a state such that the plurality of divisional areas are synthesized.

Thus, since each individual display data corresponds respectively to divisional areas defined on the display screen, and an image is displayed on each of the plurality of divisional areas, they are synthesized as a result, and an overall configuration image of a combination of the main body and the attachment is displayed. Therefore, it would not be necessary to construct individual display data for each component, such as the main body and attachment, of the image forming apparatus, and it would be enough to construct individual display data on each divisional area of the display screen. Consequently, construction, maintenance, and management of data can be made in an easier manner.

Further, in the above-described image forming apparatus, it is preferable that the image forming apparatus further comprises: an association information storing portion for defining a plurality of configuration patterns of the main body and the attachment and storing association information associating each of the divisional areas and respective individual display data each of the plurality of configuration patterns; and a configuration detecting portion for detecting a configuration pattern of the attachment actually coupled to the main body, and the display controller reads out the association information stored in the association information storing portion in accordance with a configuration pattern detected by the configuration detecting portion and allows an image to be displayed on each of the divisional areas in accordance with individual display data associated with each of the divisional areas by the association information which is read out.

According to this configuration, even when an overall configuration of the image forming apparatus changes in accordance with a difference in a configuration pattern, associating the divisional areas and the individual display data in accordance with a respective allows an overall configuration image of the image forming apparatus to be displayed in accordance with the configuration pattern.

Further, in the above-described image forming apparatus, it is preferable that the data storage portion stores the plurality of individual display data in a manner such that all of the display data have the same storage capacity.

According to this configuration, since the plurality of individual display data are stored in a manner such that all of the individual display data have the same storage capacity, reserving and designation of the memory area can be easily performed when the individual display data is stored in a device such as a physical memory and the like.

This application is based on Japanese Patent application serial Nos. 2007-108216, 2007-108217, 2007-108218, and 2007-108219 filed in Japan Patent Office on Apr. 17, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus, comprising:
a main body for printing an image formed in accordance with image data onto a medium;
at least one attachment coupled to the main body;
a data storage portion for storing only one kind of display data for simulating an overall configuration image of the image forming apparatus in which a maximum number of the attachments are coupled to the main body;
an image display device including a display screen having a display area divided into a plurality of divisional areas in correspondence to a configuration pattern of the main body and the at least one attachment for displaying the overall configuration image of the image forming apparatus in which the maximum number of the attachments are coupled to the main body, the image display device being provided on either one of the main body and the attachment;
a configuration detecting portion for detecting the at least one attachment that is actually coupled to the main body;
a mask pattern storage portion for storing a plurality of mask patterns each representing displaying and non-displaying on each of the divisional areas in accordance with a configuration pattern of the main body and the at least one attachment; and
a controller for determining displaying and non-displaying on each of the plurality of divisional areas, and controlling the display device to allow the one configuration image to be displayed on a divisional area which is determined to be displayed, and to allow the one configuration image not to be displayed on a divisional area which is determined not to be displayed, wherein
the controller includes:
a display determining portion for selecting a mask pattern corresponding to a configuration pattern that is determined in accordance with a detection result provided by the configuration detecting portion from the plurality of mask patterns stored in the mask pattern storage portion, and determining displaying and non-displaying on each of the divisional areas in accordance with the selected mask pattern; and
a display controller for controlling the image display device to allow display of a necessary element in the overall configuration image corresponding to a divisional area that is determined to be displayed by the display determining portion, and to allow an unnecessary element in the one configuration image corresponding to a divisional area that is determined not to be displayed by the display determining portion to be masked by blank data.

2. The image forming apparatus according to claim 1, wherein:
the data storage portion stores only the overall configuration image in a combination of a plurality of individual images simulating respective configurations of the main body and all of the attachments, and
the display area is divided into a plurality of divisional areas corresponding to the individual images to be displayed on the display area.

3. An image forming apparatus, comprising:
a main body for printing an image formed in accordance with image data onto a medium;
at least one attachment coupled to the main body;
a data storage portion for storing only one kind of display data for simulating an overall configuration image of and the image forming apparatus in which a maximum number of the attachments are coupled to the main body;
an image display device including a display screen having a display area divided into a plurality of divisional areas in correspondence to a configuration pattern of the main body and the at least one attachment for displaying the overall configuration image of the image forming apparatus in which the maximum number of the attachments are coupled to the main body, the image display device being provided on either one of the main body and the attachment;

a configuration detecting portion for detecting the at least one attachment that is actually coupled to the main body; and a controller for determining displaying and non-displaying on each of the plurality of divisional areas, and controlling the display device to allow the one configuration image to be displayed on a divisional area which is determined to be displayed, and to allow another part of the configuration image not to be displayed on a divisional area which is determined not to be displayed, wherein the controller includes:

a data accumulating portion for accumulating display data for allowing the image display device to display an image on the display screen;

a data transferring portion for transferring data representing the one configuration image stored in the data storage portion to the data accumulating portion and allowing the data accumulating portion to accumulate the transferred data;

a control instructing portion for instructing the image display device to display the one configuration image on the display screen, and determining displaying and non-displaying on each of the divisional areas, in accordance with a detection result provided by the configuration detecting portion and outputting a control instruction signal of instructing displaying and non-displaying on each of the divisional areas; and a display controller for controlling an operation of the image display device in accordance with the display data accumulated in the data accumulating portion and switching displaying and non-displaying on each of the plurality of divisional areas in accordance with the control instruction signal to display a necessary element in the overall configuration image on the divisional area that is switched to displaying and to overwrite the divisional area that is switched to non-displaying with blank data when the control instruction signal outputted from the control instructing portion is inputted.

4. The image forming apparatus according to claim 3, wherein:

the data storage portion stores the display data for simulating the overall configuration image as a combination of a plurality of individual images simulating the main body and the attachments, and the display area is divided into a plurality of divisional areas corresponding to the individual images to be displayed on the display area.

* * * * *